United States Patent
Schmid et al.

(10) Patent No.: US 12,104,896 B2
(45) Date of Patent: Oct. 1, 2024

(54) INTERFEROMETRIC MEASUREMENT DEVICE AND INTERFEROMETRIC METHOD FOR DETERMINING THE SURFACE TOPOGRAPHY OF A MEASUREMENT OBJECT

(71) Applicant: Polytec GmbH, Waldbronn (DE)

(72) Inventors: Henrik Schmid, Keltern-Ellmendingen (DE); Volker Seyfried, Nussloch (DE)

(73) Assignee: Polytec GmbH, Waldbronn (DE)

( * ) Notice: Subject to any disclaimer, the term of this patent is extended or adjusted under 35 U.S.C. 154(b) by 253 days.

(21) Appl. No.: 17/610,028

(22) PCT Filed: May 26, 2020

(86) PCT No.: PCT/EP2020/064584
§ 371 (c)(1),
(2) Date: Nov. 9, 2021

(87) PCT Pub. No.: WO2020/239770
PCT Pub. Date: Dec. 3, 2020

(65) Prior Publication Data
US 2022/0221272 A1     Jul. 14, 2022

(30) Foreign Application Priority Data
May 29, 2019   (DE) .......................... 102019114405.1

(51) Int. Cl.
*G01B 11/30*      (2006.01)
(52) U.S. Cl.
CPC .................................. *G01B 11/30* (2013.01)

(58) Field of Classification Search
CPC ................ G01B 11/30; G01B 11/2441; G01B 9/02076; G01B 9/02083; G01B 9/0209
See application file for complete search history.

(56) References Cited

U.S. PATENT DOCUMENTS

| 4,594,003 A | 6/1986 | Sommargren |
| 5,112,129 A | 5/1992 | Davidson et al. |

(Continued)

FOREIGN PATENT DOCUMENTS

| EP | 3396306 | 10/2018 |
| JP | 2009087326 A | 4/2009 |
| JP | 2017142078 A | 8/2017 |

OTHER PUBLICATIONS

A. Styk, M. Brzezinski. "Vibration amplitude recovery from time averaged interferograms using the directional spatial carrier phase shifting method" SPIE, PO Box 10. Bellingham WA 9822 7-0010, USA, vol. 8082, 12 pages, May 27, 2011.

(Continued)

*Primary Examiner* — Jonathan M Hansen
(74) *Attorney, Agent, or Firm* — Volpe Koenig

(57) ABSTRACT

The invention relates to an interferometric measurement device and to an interferometric method for determining the surface topography of a measurement object (1). The essence of the invention is that the light intensities $I^q(z_i)$ of at least one other detector element q of the multi-element detector (6) are also used besides the light intensities $I^p(z_i)$ of this detector element to determine the value $z^p$ associated with a detector element p (6b) of the measurement device.

19 Claims, 22 Drawing Sheets

(56) References Cited

U.S. PATENT DOCUMENTS

| | | | | |
|---|---|---|---|---|
| 5,953,124 A * | 9/1999 | Deck | ................. | G01B 9/02083 |
| | | | | 356/497 |
| 6,028,670 A * | 2/2000 | Deck | ................. | G01B 9/02083 |
| | | | | 356/497 |
| 8,072,611 B2 | 12/2011 | DeGroot | | |
| 8,902,431 B2 | 12/2014 | Liesner et al. | | |
| 8,970,850 B2 | 3/2015 | Yan et al. | | |
| 2014/0168660 A1* | 6/2014 | Yan | ................... | G01B 9/02064 |
| | | | | 356/511 |
| 2015/0002852 A1* | 1/2015 | de Groot | .............. | G01B 9/0209 |
| | | | | 356/450 |
| 2019/0049236 A1* | 2/2019 | Ohba | ................... | G02B 27/123 |

OTHER PUBLICATIONS

Garbusi Eugenio et al. "Single frame interferogram evaluation", Applied Optics, US, vol. 47, No. 12, 7 pages, Apr. 20, 2008 (Apr. 20, 2008).

Dong, Chen et al., "Real-Time Scanner Error Correction in White Light Interferometry" Proceedings of SPIE, IEEE, US, vol. 9276, pp. 927601-927601, Nov. 13, 2014 (Nov. 13, 2014).

* cited by examiner

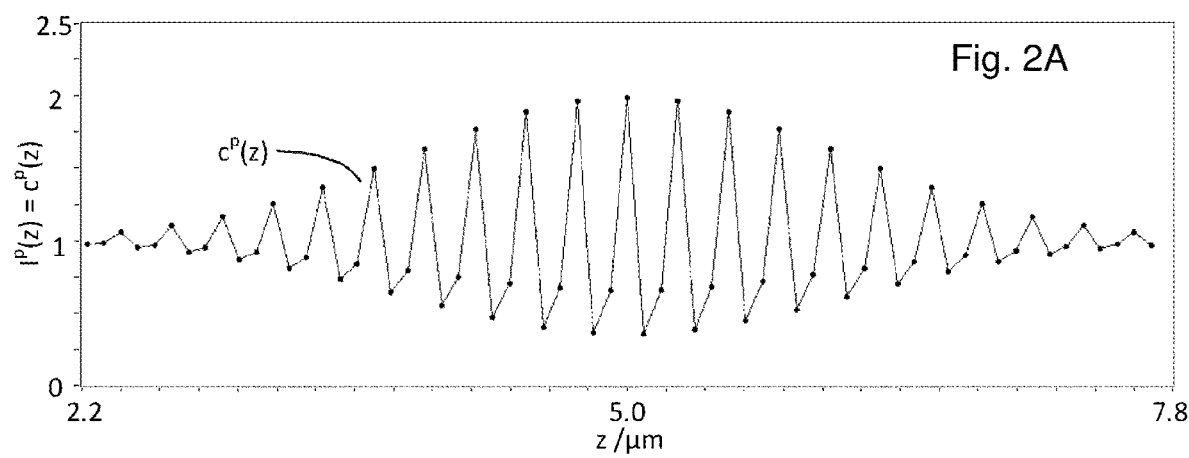
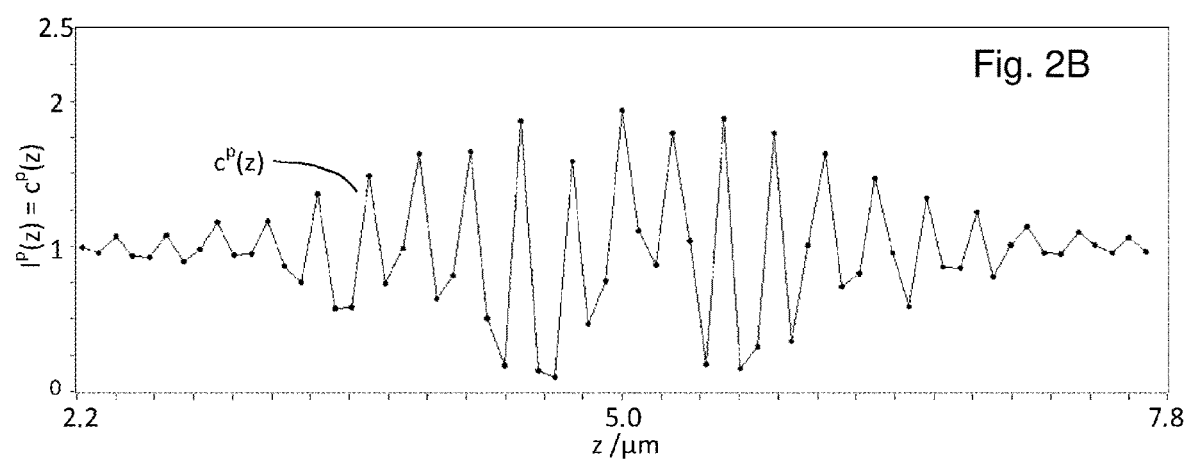

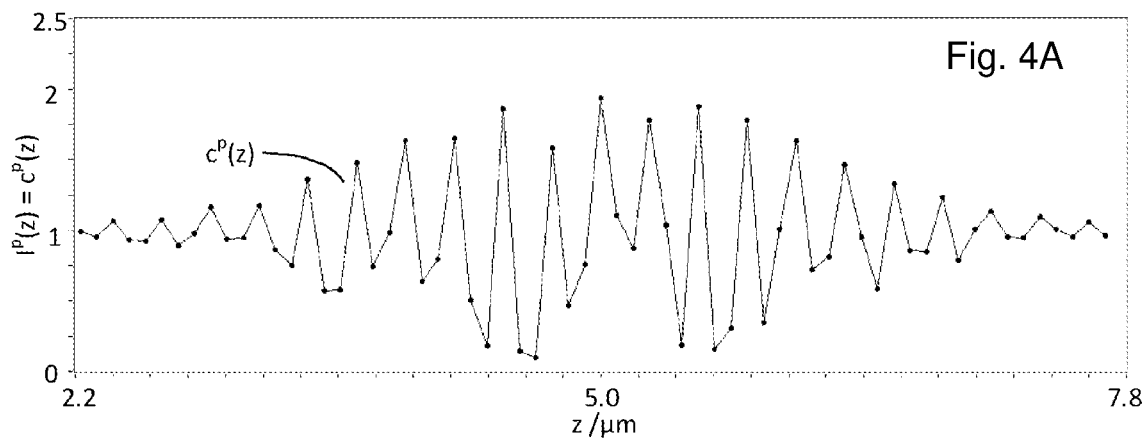
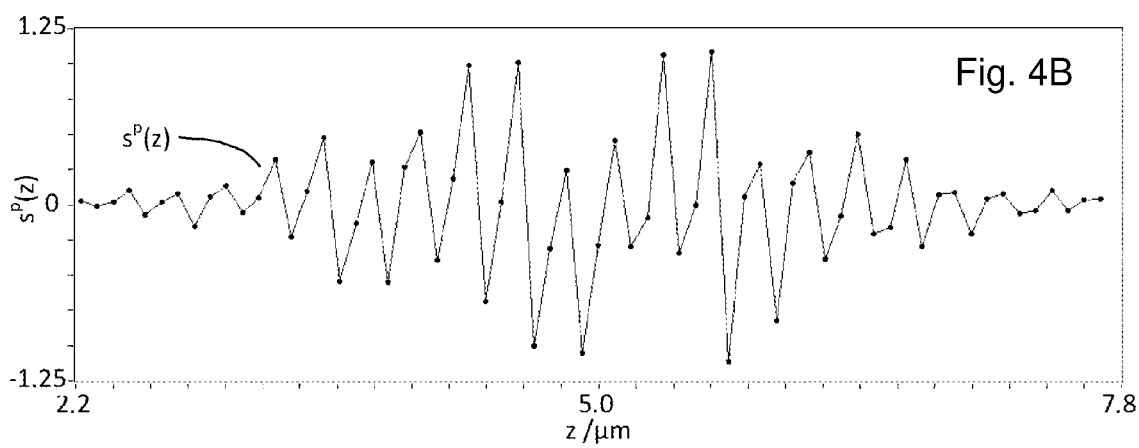
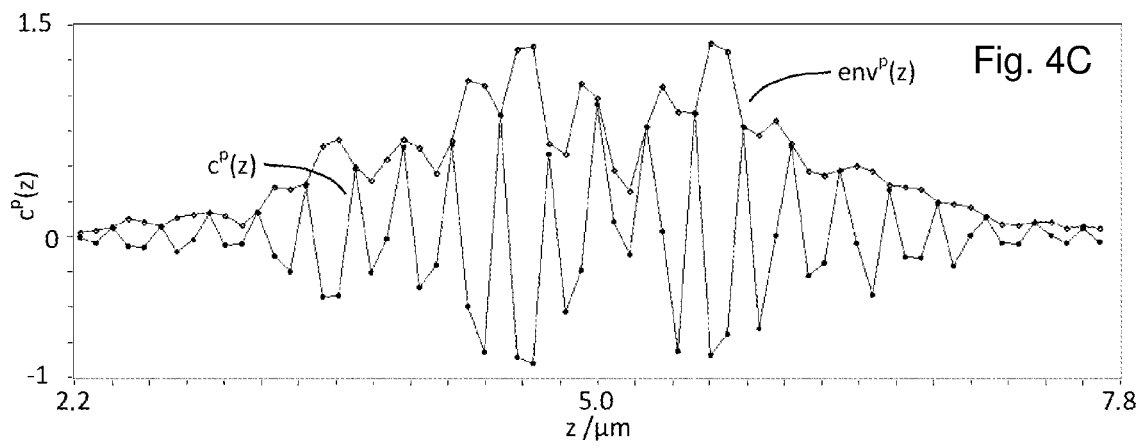

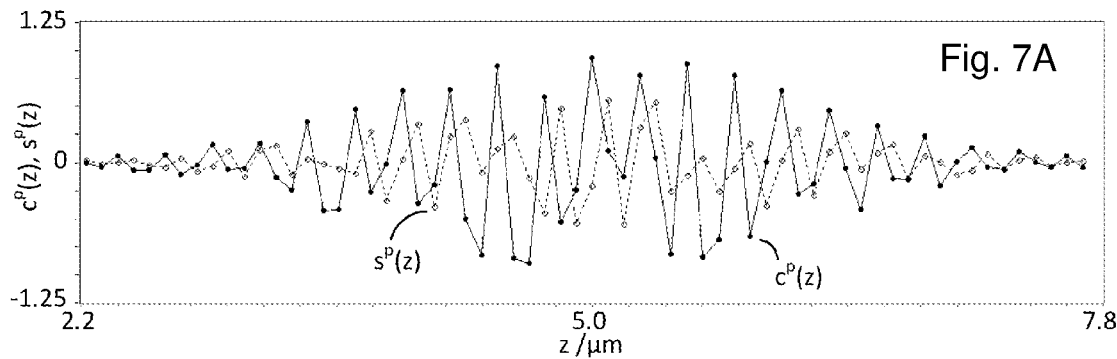
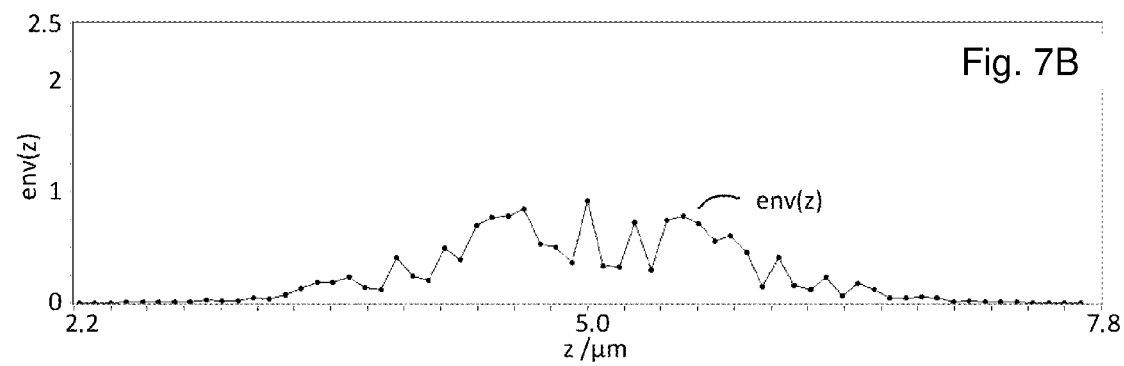
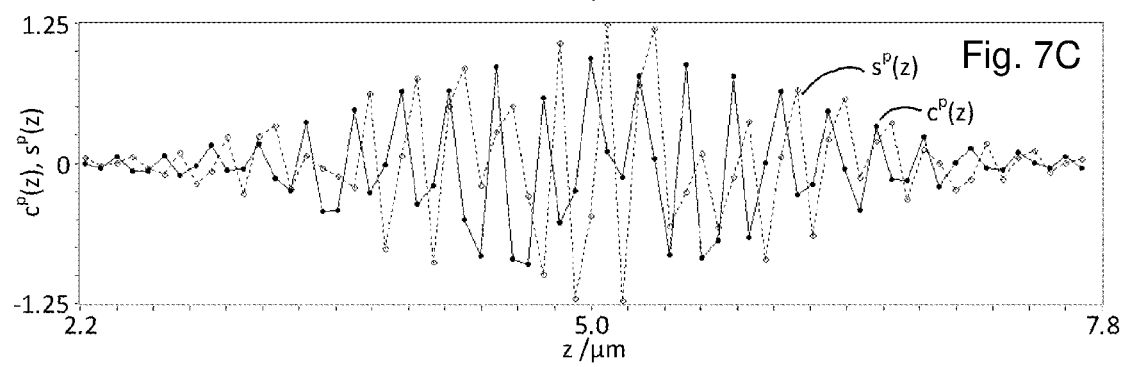
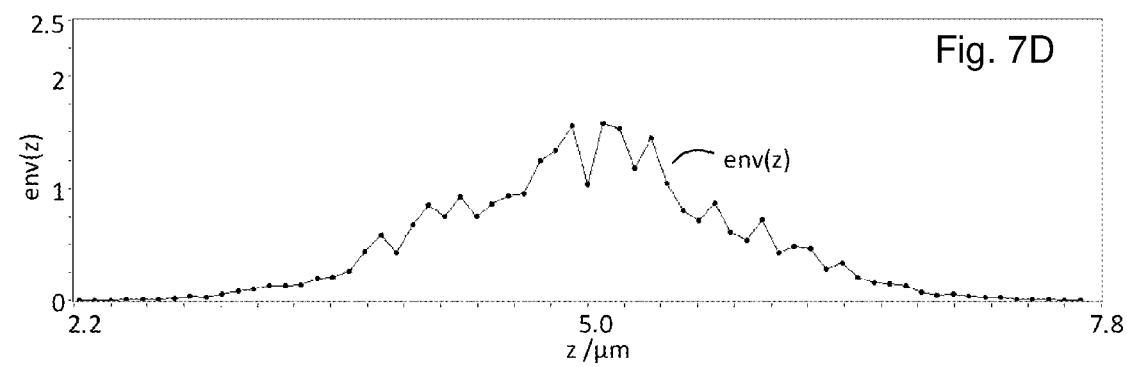

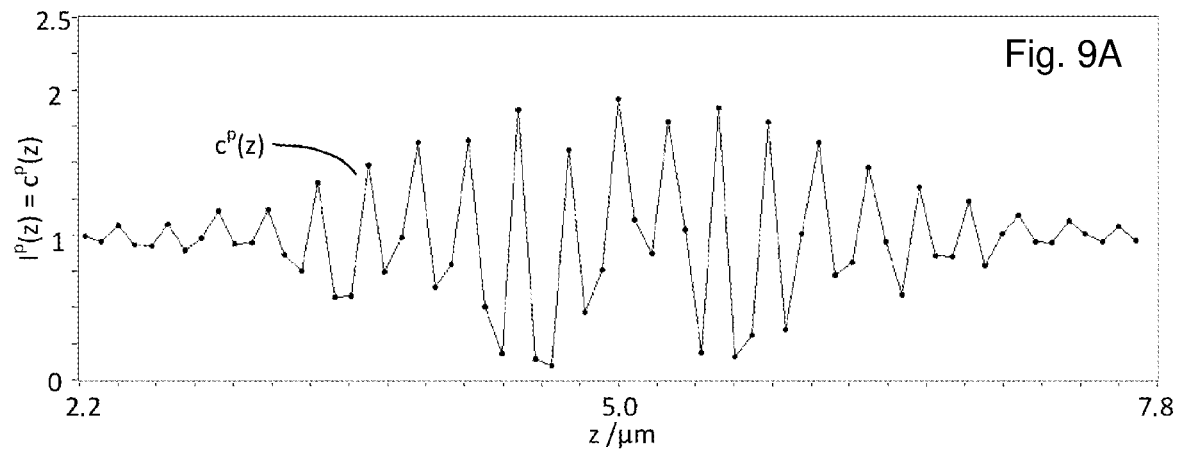
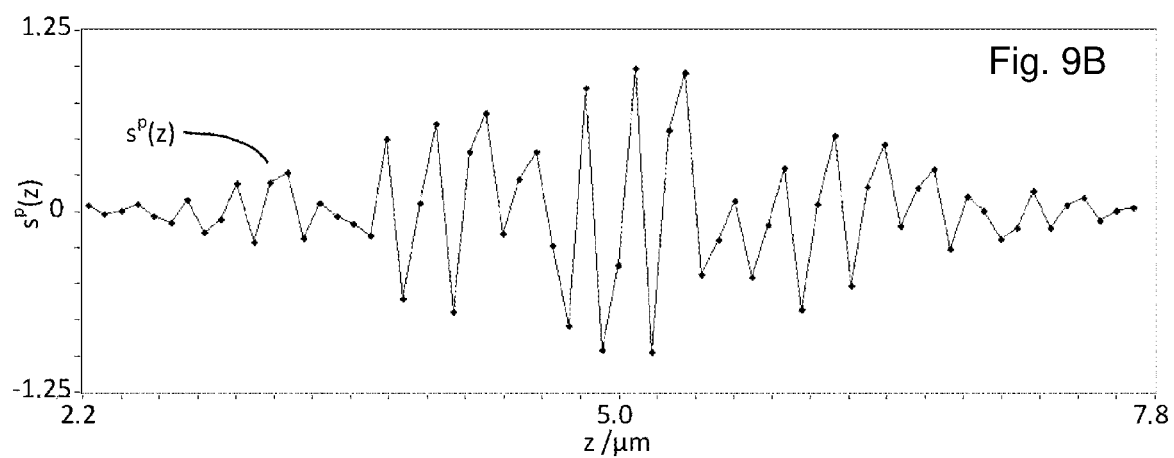
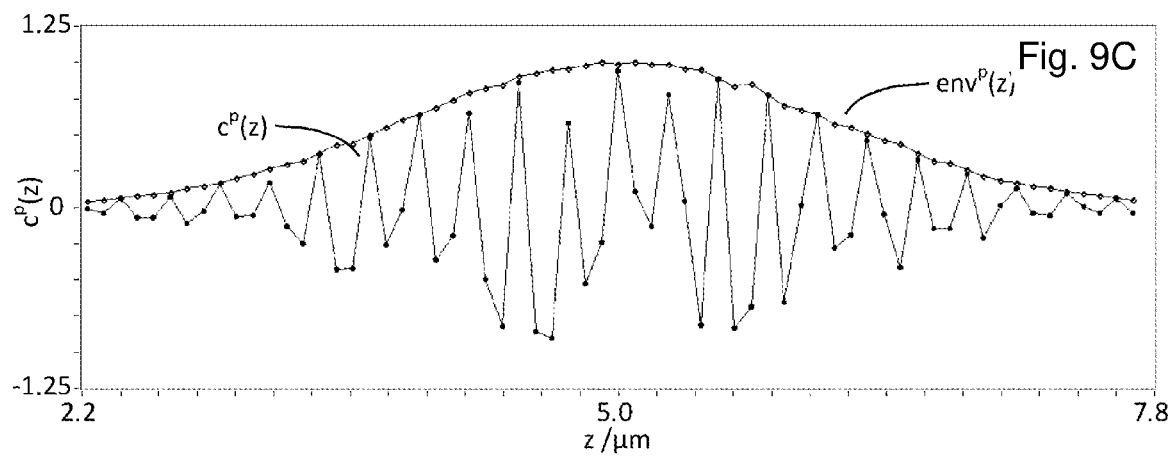

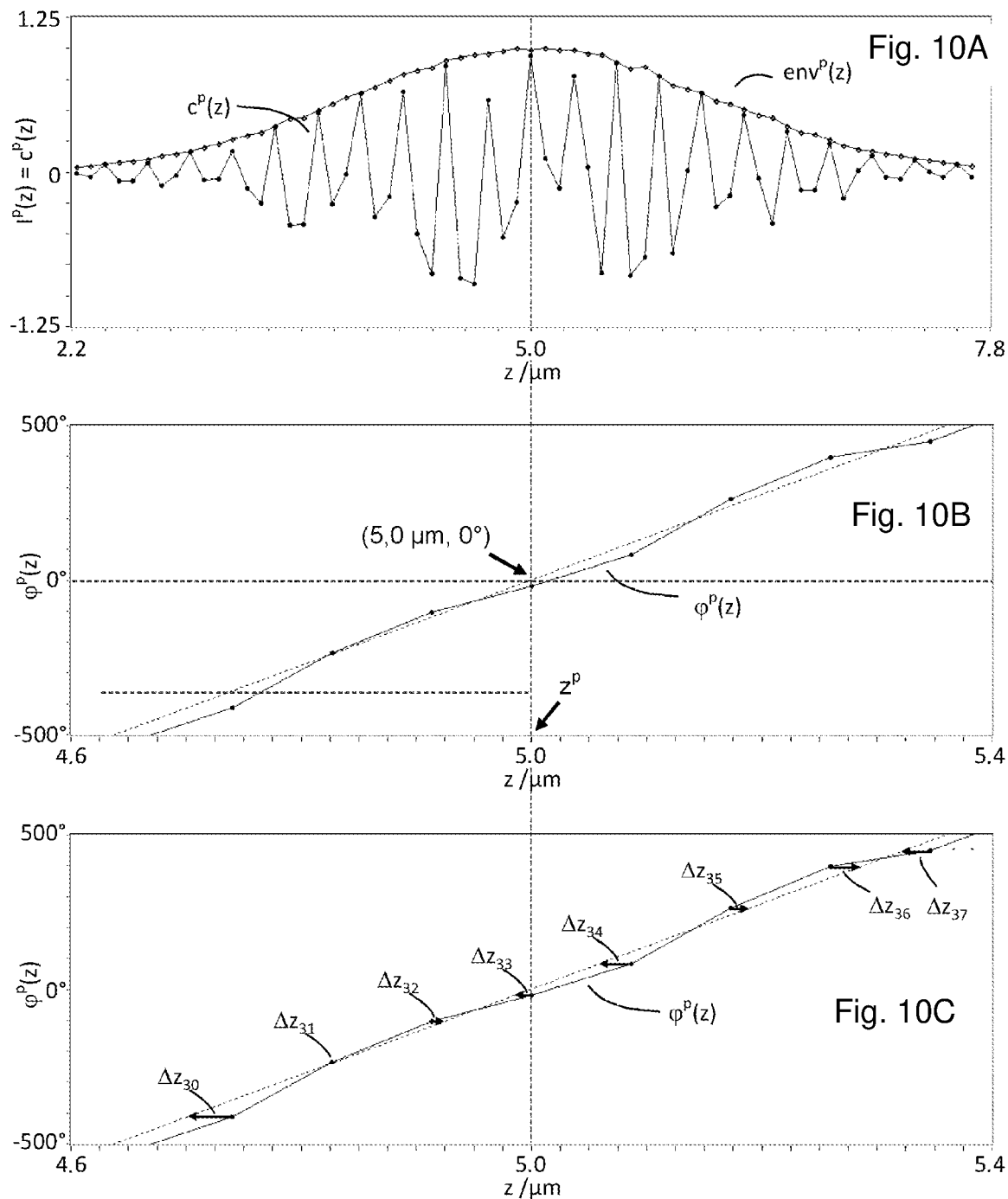

INTERFEROMETRIC MEASUREMENT DEVICE AND INTERFEROMETRIC METHOD FOR DETERMINING THE SURFACE TOPOGRAPHY OF A MEASUREMENT OBJECT

TECHNICAL FIELD

The invention relates to an interferometric measuring device and an interferometric method for determining the surface topography of a measurement object.

BACKGROUND

Interferometric measuring devices for determining the surface topography of measurement objects are known; in these measuring devices, some of the light from a light source is directed at the surface of the measurement object, reflected from there as measuring light and subsequently brought together with another portion of the light from the light source, which serves as a reference light, by means of suitable interferometer optical unit such that an interferogram is generated by the interference of measuring light and reference light, the fringe structure of said interferogram allowing conclusions to be drawn about the surface topography of the measurement object. In metrology, the surface topography denotes the description of the geometric nature of the examined surface, in particular the form of one-dimensional or two-dimensional surface profiles.

The prior art contains a multiplicity of configurations of such interferometric measuring methods. Many of these include changing the OPD (optical path length difference) present between the optical path of the measuring light and the optical path of the reference light when the interferograms are recorded. As a result, it is possible in each case to record distinct interferograms for different path length differences OPD. Thus, an intensity curve arises as a function of the set OPD for each individual point in the interferogram. Such an intensity curve, which is sampled for different OPD values, is usually referred to as a "correlogram" for the associated point. Usually, each point in the interferogram has assigned an associated point on the surface of the measurement object, for example by way of optical imaging, and so the corresponding correlogram can also be assigned to a certain measurement point on the measurement object. With the aid of the correlogram belonging to the measurement point, the respective difference between the optical path lengths of the measuring light and reference light is ascertained during the subsequent evaluation and the surface topography of the measurement object is ascertained therefrom.

The surface topography of a measurement object is usually specified by the respective height values $h^p$ of a multiplicity of surface points p, that is to say consequently by the relative spatial position thereof, relative to a known reference surface, which is usually a plane. If available in this form, this can easily be specified relative to any other reference surfaces as well, provided a known spatial relationship to the first reference surface is available for these other reference surfaces.

Therefore, for the sake of simplicity, the reference surface in interferometric measuring devices is frequently assumed to be the surface for which the optical path length difference OPD between measuring arm and reference arm equals zero in a specified reference state of the interferometer. In many cases, this reference surface is a plane that is optically conjugate to a reference surface of the interferometer, which is usually a mirror, and is frequently but not always represented by a plane in the object space of the measurement object. On account of what was stated above it is possible, without loss of generality, to use this surface throughout as a reference surface for the surface topography for all further considerations, since a conversion to other reference surfaces is easily possible.

The OPD for each measurement point p on the measurement object is usually $-2*n*h^p$ in the reference state of the interferometer, i.e., it just corresponds to two times the negative height value of the associated measurement point p on account of the outward and return travel of the light, which is optionally corrected by the refractive index n of the material between reference surface and measurement surface; however, for the sake of simplicity, said refractive index is assumed to be 1 without loss of generality in the text which follows since the description for other values, where the formula has been slightly modified, is obvious to a person skilled in the art.

Conventional interferometric measuring methods for determining the surface topography of measurement objects include, firstly, phase-shifting interferometry (PSI) and, secondly, low-coherence interferometry, in particular scanning white light interferometry (WLI).

In any case, for all relevant measurement points p on the measurement object, the associated intensities $I^p(z_1)$, $I^p(z_2), \ldots, I^p(z_n)$ in the interferograms are recorded for different OPDs which have been changed by $z_1, z_2, \ldots, z_n$ in relation to the reference state of the interferometer, and so the associated correlogram $c^p = (c^p(1), c^p(2), \ldots, c^p(n))$ is obtained for each measurement point p, with the measured luminous intensity at the i-th point of the correlogram being $c^p(i) = I^p(z_i)$ in each case.

The OPD is preferably changed in predetermined fashion, usually in such a way that the $z_1, z_2, \ldots, z_n$ are equidistant with a known spacing $\Delta z$, while the correlograms are recorded. By way of example, the length of the measuring arm or of the reference arm of the interferometer is changed to this end, either mechanically or by the introduction of material with a different refractive index. In some cases, the measurement object is also displaced relative to the interferometer or the interferometer is also displaced relative to the measurement object, which likewise substantially equates to a change in the measuring arm length. The change in length is optionally continuous or incremental; all that is important is that the respective OPD changes are known as precisely as possible since the accuracy of the further evaluation, and hence the accuracy of the determined surface topography, substantially depends on the accurate knowledge of the respective OPD changes. This is also advantageous in the case of the invention described below.

In the case of phase-shifting interferometry (PSI) the phase difference PD is varied between the measuring light and the reference light and the correlograms are recorded as a function of the set phase difference. As a rule, the phase variation is attained, as described, by a change in the optical path lengths. However, it can also be attained by changing the wavelength of the utilized illumination light, as described in U.S. Pat. No. 4,594,003. All observations implemented below—even in the following presentation of the invention—can easily be converted to the latter case; therefore, the further description is restricted for the sake of a simpler presentation but without loss of generality to the more conventional case of the phase variation brought about by changing optical path lengths. What is achieved by using illumination light with a sufficiently long coherence length or by sampling only a few periods of the interference signal is that the intensity of the measuring light changes in sinusoidal fashion with the set phase. By determining the phase angle of the recorded sinusoidal signal as a function of the set path length for different measurement points it is possible to ascertain the differences of the OPDs between various measurement points, and hence ultimately the surface topography of the measurement object, in relation to the reference surface.

The OPD is likewise varied during the measurement in the case of a low-coherence interferometry, in particular scanning white light interferometry. However, since low-coherent light, i.e., spectrally broad light, is used in this case, the correlograms only exhibit a modulation if measuring light and reference light run along approximately the same optical path length, i.e., if the path length difference is small. By contrast, the modulation disappears if the OPD is greater than the coherence length of the utilized light.

Typically, the general functional correlogram curve c(OPD) as a function of the set OPD can be described by a sinusoidal modulation with a slowly changing envelope, which tends to zero for OPD values with a large magnitude:

$$c(OPD) = A + B*env(OPD)*\cos(\varphi(OPD))$$

Here, env(OPD) denotes the slowly changing envelope which for example may have the shape of a Gaussian curve env(OPD)=exp($-a*OPD^2$), and $\varphi$(OPD) denotes a phase that changes as a function of the OPD, $\varphi$(OPD)=$2\pi/\lambda$*OPD in the simplest case, where $\lambda$ is the effective wavelength of the illumination light and $2\pi/\lambda$ can be interpreted as a carrier frequency of the modulation. The constants A and B describe the offset of the signal and the associated modulation amplitude, respectively, wherein both can be influenced inter alia by the reflectivity of the measurement object at the measurement point. For the following observations—even in the following presentation of the invention—both consonants have no essential relevance but make the description substantially more complicated, and so A=0 and B=1 are assumed below for the sake of simplicity of the representation without loss of generality, wherein the measurement signals can easily be brought into this form where necessary, for example by virtue of the mean value being subtracted and the signal being normalized in a suitable fashion.

In this respect, the general functional correlogram curve c(OPD) is assumed below to be $$c(OPD) = env(OPD)*\cos(\varphi(OPD)) \text{ without loss of generality.}$$

Accordingly, to simplify the presentation and likewise without loss of generality, the luminous intensities $I^p(z_i)$=$c^p$(i)=$c(z_i-2*h^p)$ are assumed without offset below; this can be realized by a simple subtraction of the offset of the respective correlogram, wherein this offset is taken most easily in the edge regions of the correlogram where there is no or hardly any interference or is ascertained in another simple manner, for example by subtracting the mean value ($I^p(z_1)$+ $I^p(z_2)$+ . . . +$I^p(z_n)$)/n of the luminous intensities of the correlogram, it however also being possible to resort to more sophisticated options when necessary, in the case of which, for example, the phase angle of the individual points is also taken into account. It should be observed that removing the offset from the luminous intensities, just like resealing or normalization of same, represents a transformation of the n-dimensional luminous intensity vectors ($I^p(z_1)$, $I^p(z_2)$, . . . , $I^p(z_n)$) given by the $I^p(z_i)$ and should also be understood as such within the meaning of the following description and, in particular, the patent claims.

Usually, the assumption is made to a good approximation that the correlogram curve has the specified general functional form for all measurement points following the subtraction of the offset and normalization. In practice, there may be relatively small deviations therefrom, for example as a result of different material dispersion values along the path of the light to the various measurement points and the associated reference points. Relevant procedures are known for taking these effects into account and correcting their impact on the measurement results, for example measurement of same or of effects emerging therefrom with the aid of a known measurement object, for example a precise plane mirror, and the suitable consideration of same when evaluating the measurements of measurement objects to be measured. Naturally, if required, such measures can also be implemented in conjunction with the procedure according to the invention described below.

Typically, the assumption made in the so-called "envelope evaluation" is that the maximum of the envelope is attained when the optical paths in the measuring arm and reference arm have equal length, i.e., the OPD has a value of zero. Accordingly, the envelope maximum is determined for each correlogram by ascertaining the value $z^p$ for the change in OPD in relation to the reference state of the interferometer, at which value the maximum of the correlogram envelope is present. As per what was stated above, the associated OPD is zero at that point, i.e., $z^p-2*h^p=0$, and the height value $h^p$ of the measurement point p can easily be determined therefrom. Should the OPD at the location of the envelope maximum differ from zero in a situation deviating from the usual case, the procedure would nevertheless be the same although the right-hand side of the equation above would contain a non-zero value; however, the height value $h^p$ could nevertheless be ascertained as above. In any case, the relative spatial position of the measurement points p and hence the surface topography of the measurement object in comparison with the reference surface is ultimately obtained from the multiplicity of ascertained height values $h^p$.

There are various procedures for determining the positions of the envelope maxima. A frequently utilized approach consists of initially ascertaining the envelope itself from the correlograms whose envelopes are of course initially modulated in sinusoidal form. To this end, a Hilbert transform, for example, is used to generate a synthetic correlogram s(OPD)=env(OPD)*sin($\varphi$(OPD)), which has been phase-shifted through 90° in terms of the carrier frequency, from the correlogram c(OPD)=env(OPD)*cos($\varphi$(OPD)), the two correlograms c(OPD) and s(OPD) are squared and added, as a result of which the sought-after envelope env(OPD) is obtained after taking the square root. Alternatively, the envelope env(OPD) can also be determined by piecewise fitting of sine functions to the correlogram and pointwise evaluation of the corresponding amplitudes. The position of the maximum of the envelope is then usually determined by fitting a suitable curve to the previously determined envelope env(OPD).

An alternative approach for determining the position of the envelope maximum initially uses a Fourier transform of the correlogram and then determines a linear gradient of the phase, which has been plotted against spatial frequency, at the location of the carrier frequency in Fourier space, from which it is likewise possible to determine the position of the envelope maximum.

Once the positions of the respective envelope maxima have been ascertained, the surface topography of the measurement object can already be determined quite accurately therefrom in many cases; this is implemented in particular in the case of measurement objects with quite a rough surface.

In certain cases, particularly in the case of measurement objects with quite a smooth surface, the accuracy of the determination of the surface topography can be significantly increased with the aid of what is known as the "phase evaluation," by virtue of also using for the evaluation the sinusoidal modulation of the correlogram in the vicinity of the envelope maximum in addition to the evaluation of the position of the envelope maximum. In this case, use is no longer made of the position of the envelope maximum, which is still determined first, as a reference point with an explicitly and/or implicitly specified value for the OPD or PD; instead, use is made of the position which has a certain phase angle of the sinusoidal oscillation, which is closest to the envelope maximum, for example the position of its closest zero with a negative gradient, and which can be determined much more accurately. A much more precisely determined surface topography is obtained if the OPD differences of the positions of different measurement points determined thus are compared than if only the positions of the envelope maxima are used. For the practical implementation, it is sufficient in many cases to simply determine the phase angle of the sinusoidal modulation at the ascertained position of the envelope maximum. From this, the associated position for any phase angles of the sinusoidal modulation in the vicinity of the envelope maximum emerges with a sufficient accuracy if the change in the OPD over the correlogram measurements is known.

At this point it is expedient to refer to the fact that the evaluation methods of correlograms in the case of low-coherence interferometry and in the case of phase-shifting interferometry are closely related to one another. While the general functional curve of a correlogram in the case of low-coherence interferometry as described is of the type $$c(OPD) = env(OPD) * \cos(\varphi(OPD)),$$

the corresponding correlograms in phase-shifting interferometry have a constant envelope env(OPD)=const and a phase $\varphi(OPD)=2\pi/\lambda*OPD$ proportional to the OPD, where once again $\lambda$ is the wavelength of the illumination light. Thus, they are of the type $$c(OPD) = const * \cos(2\pi/\lambda * OPD),$$

which ultimately only represents a special case of the correlograms of low-coherence interferometry, specifically the special case where the finite coherence length for the implemented measurement is now so long that it no longer needs to be taken into account. This allows most of the deliberations or statements made below in conjunction with low-coherence interferometers to be transferred immediately to phase-shift interferometers, without it being necessary to always refer thereto in detail.

The described procedures and considerations are sufficiently well known and are used in diverse ways in many types of interferometers for the purposes of determining surface topographies.

Ultimately, all types of known interferometers can be used for this purpose and, in particular, for realizing the invention described below; however, Michelson interferometers, Mach-Zehnder interferometers, Mirau interferometers, Linnik interferometers and Fizeau interferometers should be highlighted in particular, although other interferometer types are also used.

In order to be able to accurately determine surface topographies with the aid of such interferometers and the described procedures, the known prior art considers the most precise possible control of the OPD changes, which are set or occur while the correlograms are recorded, to be essential. Even small deviations of the real OPD changes from the expected or set OPD changes regularly lead to large deviations of the ascertained surface topographies from the real surface topographies.

This fact is well known; therefore, suitable measures for avoiding unwanted and uncontrolled influences on the OPD during the measurements and, should this not be possible, for at least determining said influences to the best possible extent and taking these into account during the evaluation, are regularly taken up when using interferometers for this purpose.

Accordingly, the utilized interferometers are generally constructed and set up so that they are influenced as little as possible by ambient vibrations since, as a rule, such vibrations naturally have a different influence on the measuring arm and on reference arm of the interferometer, as a result of which unknown and uncontrolled OPD changes arise. Usually, vibration-isolated or even active vibration-compensated tables are used as a base platform for the construction of corresponding interferometers. Even air turbulence with the accompanying variations of the refractive index in the measuring arm and reference arm disturbs the highly precise measurements so much that this has to be suppressed, for example by virtue of keeping the air temperature in the interferometer as constant as possible and/or guiding the airflow to be as laminar as possible; in extreme cases, the interferometers are sometimes even operated under vacuum conditions. The positioning and displacement units, with the aid of which the OPD is changed during the measurement, and the associated guiding and fixation elements are of particular importance. Since inaccuracies at this point have a significant influence on the measurement accuracy of the overall system, complicated and expensive components are used here as a rule.

Nevertheless, even these measures are insufficient in some cases for stabilizing the OPD sufficiently well. In this case, further measuring devices are integrated into the overall system in addition to the actual interferometer and the primary object of said further measuring devices is to measure, as precise as possible, the OPD variations actually occurring during the measurement so that the influences thereof can then be taken into account when evaluating the correlograms. A comprehensive presentation of the measuring devices usable to this end and of possible procedures for suitably taking account of the ascertained results for the evaluation of the correlograms are found, for example, in patent document U.S. Pat. No. 8,902,431.

All the described measures for avoiding and/or determining unwanted or uncontrolled influences on the OPD during interferometric measurements are complex, complicated and/or expensive.

SUMMARY

The present invention is therefore based on the object of specifying an interferometric measuring device and an associated method which are sufficiently robust in relation to OPD variations so that it is possible to largely dispense with the above-described complicated measures for avoiding disturbing influences on the OPD, wherein the disturbing OPD variations neither need be ascertained nor be taken into account during the evaluation method in this case.

This object is achieved by a method and by a device having one or more of the features described herein. Advantageous configurations are found in the dependent claims.

The method according to the invention for determining the surface topography of a measurement object by interferometry includes the following method steps:

producing illumination light and reference light by means of at least one light source and illuminating the measurement object with the illumination light, bringing together the illumination light which has been reflected by the measurement object as measuring light and the reference light, with an interference pattern being produced in a detection region, changing the optical path length difference and/or the phase difference between the measuring light and the reference light, capturing luminous intensities $I^p(z_i)$ of the interference pattern on a multiplicity of detector elements p of a multielement detector in the detection region for at least two optical path length differences or phase differences which have been changed by different amounts $z_i$, determining that amount $z^p$ for the change in the optical path length difference or phase difference for a multiplicity of detector elements p of the multielement detector, for which amount the optical path length difference and/or the phase difference between the measuring light and the reference light in each case reaches an explicitly and/or implicitly specified value for the relevant detector element p, and ascertaining the surface topography of the measurement object from the amounts $z^p$ determined for the various elements p of the multielement detector.

It is essential that in order to determine the value $z_p$ assigned to the detector element p the luminous intensities $I^q(z_i)$ of at least one other detector element q of the multielement detector are also used in addition to the luminous intensities $I^p(z_i)$.

Consequently, the luminous intensities $I^p(z_i)$ and $I^q(z_i)$ are determined by means of at least two different detector elements p and q. Points that differ in space on the measurement object and/or an optical surface that is conjugate to the multielement detector, preferably on an optically conjugate plane, are assigned to these detector elements p and q by way of optical imaging. This surface that is optically conjugate to the multielement detector is preferably a reference surface of the interferometer, a surface in the space of the measurement object, an intermediate image surface of the optical imaging, a pupil and/or an aperture plane of the optical imaging.

In the method according to the invention, the luminous intensities $I^p(z_i)$ of the interference pattern are captured on a multiplicity of detector elements p of a multielement detector in the detection region for at least two optical path length differences or phase differences which have been changed by different amounts $z_i$. It is advantageous to carry out the capture for a relatively large number of optical path length differences or phase differences which have been changed by different amounts $z_i$, in particular for at least 3, preferably at least 10, particularly preferably at least 20 different $z_i$. Typically, a smaller number of measurement points is sufficient for PSI methods in comparison with WLI methods. Therefore, if the method according to the invention is configured as a WLI method, it is advantageous to carry out the capture for a larger number of optical path length differences or phase differences which have been changed by different amounts $z_i$, in particular for at least 5, preferably at least 20, particularly preferably at least 50 different $z_i$.

The scope of the invention includes the use of analogous variables for the variables used to describe the method according to the invention, which analogous variables—optionally together with further variables or parameters—contain the information of the specified variable and consequently can be converted where necessary. This applies in particular to the variable z and the amount $z^p$ assigned to a detector element. Thus, if a constant change speed for the change in the optical path length difference and/or phase difference is for example known, it is likewise possible to specify a time of the measurement $t^p$, which can be converted into the amount $z^p$ where necessary. This likewise applies to the device according to the invention, described below, and to the advantageous configurations of the method according to the invention and the device according to the invention.

The device according to the invention, described below, is preferably designed to carry out the method according to the invention, in particular a preferred embodiment thereof. The method according to the invention is preferably designed to be carried out by means of the device according to the invention, described below, in particular by a preferred embodiment thereof, such as the advantageous configurations described below:

The interferometric measuring device according to the invention for determining the surface topography of a measurement object includes the following features:

The interferometric measuring device according to the invention comprises at least one light source, for example a laser, an LED, a superluminescent diode, an incandescent lamp, a gas discharge lamp, an arc lamp, a plasma radiation source, etc. Some of the light from the light source is used to illuminate the measurement object, preferably by means of a suitable illumination optical unit, very particularly preferably by using an illumination optical unit which images the light source into an aperture plane of an objective, for example a Köhler-type illumination optical unit. Some of the light from the light source is used to produce reference light, preferably by virtue of the light from the light source being split with the aid of a beam splitter, for example a neutral splitter or a polarization splitter, into a first portion which serves to illuminate the measurement object and into a second portion which serves as a reference light.

The illumination light which has been reflected by reflection or scattering from the measurement object as measuring light is brought together with the reference light with the aid of an interferometer optical unit, preferably by virtue of measuring light and reference light being unified by a beam splitter, but at least by virtue of measuring light and reference light being steered to a common detection region where an interference pattern arises from the interference of the measuring light and reference light. Such interferometric measuring devices are sufficiently well known and are used in diverse ways. Thus, all types of the known interferometers can ultimately be used for the implementation of the present invention; in particular, Michelson interferometers, Mach-Zehnder interferometers, Mirau interferometers, Linnik interferometers and Fizeau interferometers should be highlighted in this case. However, the present invention is not restricted to these interferometer types; any other interferometer type can also be used in advantageous fashion without restriction within the scope of the present invention. Consequently, the interferometer optical unit preferably comprises one or more optical elements from the list of optical lenses, beam splitters, filters, stops, mirrors, polarization filters, retardation plates and other elements that influence the polarization of light.

The interferometric measuring device according to the invention furthermore comprises at least one adjustment unit, by means of which it is possible to change the optical path length difference OPD or the phase difference PD between the measuring light and the reference light by an amount z. To this end, the optical path length of the measuring light or of the reference light or the optical path length of both is alternatively changed. To change the optical path length of the measuring light it is possible, for example, to move the measurement object relative to the interferometric measuring device or, in order to obtain the same effect, the interferometric measuring device can be moved relative to the measurement object. It is also possible to change the optical paths of the illumination light and/or of the measuring light in such a way that the OPD and/or the PD changes. To this end, it is possible for example to use movable mirrors, movable lenses or other movable beam guiding elements. It is also possible to introduce elements into the beam path of the measuring light, which elements change the optical path length by changing the optical refractive index. By way of example, such elements can be different plane plates made of an optical material or, should a continuous change in the optical path be desired, they could also be wedge plates made of an optical material that are displaceable relative to one another. Likewise, optical elements such as, e.g., LCD elements, Pockels cells, etc., are also conceivable, in the case of which the refractive index changes when voltages are applied.

The same multiplicity of options exists and is preferably likewise used to change the optical path length of the reference light. Use is particularly preferably made of an arrangement in which the reference light is reflected or scattered by a reference surface, very particular preferably by a reference mirror, wherein this reference surface can be moved such that the optical path length of the reference light changes as a result.

To change the optical path length of the measuring light and/or reference light it is possible within the scope of what is described to particularly advantageously use mechanical adjustment units for moving components. In particular, suitable to this end are motor-driven spindles with stepper motors or DC motors with or without encoder and tachometer, linear units, piezo-driven adjustment devices or walk drive motors and many other drive units. Particularly preferably, the utilized adjustment units comprise an independent measuring system, or a measuring system is provided, so that it is possible to control or determine the respective position of the adjustment unit, and hence the change in the optical path length difference OPD and/or the phase difference PD as precisely as possible. Closed-loop and open-loop control systems, for example PID controllers, for accurate positioning or for attaining best possible synchronization of the adjustment unit are also very advantageous. In simple embodiments knowledge of the start point and end point of the adjustment unit is also sufficient, in the case of a somewhat uniform adjustment speed, to be able to deduce the points in time at which the OPD change and/or the PD change in each case reaches a certain desired, explicitly and/or implicitly specified value, or to be able to deduce the amount z of the change of OPD and/or PD present at certain adjustment times.

If it is only the phase difference PD between the measuring light and the reference light that should be changed, and not the optical path length difference OPD, then it is preferably the wavelength of the light from the light source that is changed; by way of example, this can be implemented in some light sources such as laser diodes or LEDs by changing the operating temperature and/or by changing the applied current or, for example in the case of lasers, by changes in the laser cavity such as, e.g., by changes in the length or by taking influence by means of spectral filtering elements. Such light sources whose wavelengths are changeable are commercially available in many different embodiments. In the case of broadband light sources, the wavelength can ultimately also be influenced by the use of changeable spectral filters.

Independently of which of the diverse options for adjusting the optical path length difference and/or the phase difference between the measuring light and the reference light is used, it is important to control or at least know the amount z through which the OPD or the PD is changed in each case. To this end, a relationship is preferably established between the adjustment parameter or the adjustment parameters of the adjustment unit and the associated change in the OPD or in the PD. As a rule, this is very simple if the system parameters are known; by way of example, if a piezo-driven retro-reflecting mirror is used in the reference arm as an adjustment element for the optical path length of the reference light, this reference is given firstly by the calibration of the piezo-adjuster, with the aid of which the applied voltage U is preferably converted into a displacement path w(U) of the mirror, and secondly by the knowledge that a displacement w(U) of the mirror changes the optical path of the reference light by 2*W(U) on account of the influence both on the outward path and on the return path, or by 2*n*w(U) if it is not possible to ignore the refractive index n of the passed medium such as, e.g., air. Since such deliberations are also very easily implementable in most other cases and a person skilled in the art is also well aware thereof, further explanations thereof are dispensed with here without loss of generality. In cases where the relationship between the adjustment parameter or the adjustment parameters of the adjustment unit and the amount z of the change of the OPD or the PD cannot be established as easily or cannot be established sufficiently accurately, an additional measuring system is preferably provided, by means of which the amount z of the change of OPD or PD is measured and/or controlled directly, for example by way of a suitable length or speed measuring system.

In many cases the assumption is made that the amount z through which the optical path length difference OPD or the phase difference PD is changed between the measuring light and the reference light by way of the adjustment unit is known, in each case with a certain accuracy and in many cases with a sufficient accuracy.

However, it should be observed that this accuracy with which the amount z of the OPD or PD change is known in the case of actually carried out measurements is always only finite. That is to say that although knowledge about this amount z is available, the known value never completely corresponds to the value actually present. Nevertheless and just like in the prior art, this value of z only present with finite accuracy is used for the evaluation within the scope of the present invention, at least for as long as no better value is known. However, the device according to the invention and the method according to the invention differ from the prior art in that the evaluation according to the invention is significantly less sensitive and more robust in relation to the unavoidable deviations of the real values of z from the known values of z, as will still be explained in more detail below.

The interferometric measuring device according to the invention further comprises at least one multielement detector with a multiplicity of detector elements p, which is designed to capture the luminous intensities $I^p(z_i)$ of the interference pattern on the detector elements p in the detection region for at least two optical path length differences or phase differences which have been changed by different amounts $z_i$. In particular cameras, preferably CCD or CMOS cameras, are suitable to this end. It is also possible to advantageously use photodiode arrays or photodiode lines, especially in cases where a high speed is more important than a large number of detector elements. It is important that the detector elements each capture the luminous intensities incident thereon at points in times when the respective amount $z_i$, by means of which the optical path length difference or the phase difference is changed in relation to the reference state of the interferometer, is known as accurately as possible. To this end, the adjustment unit is preferably initially positioned in each case and a trigger signal is subsequently made available to the multielement detector, for example from the adjustment unit or a control unit controlling the latter. However, it is also possible, for example, for the adjustment unit to move continuously in an advantageous configuration and for said adjustment unit, its control unit or a measuring system assigned to the movement of the adjustment unit to transmit, at points in times at which said adjustment unit passes through defined points, trigger signals which trigger the image recording to the multielement detector. Alternatively, it is also conceivable for the multielement detector to control its image recording itself or for the latter to be controlled by a third unit, wherein, in this case, the signals of the multielement detector or of the third unit are used to read out the positions of the adjustment unit at corresponding points in time, either directly or else by way of a suitable measurement system. There also are a multiplicity of further options available for being able to realize synchronization between image recording and adjustment position, all of which can be used within the scope of the device according to the invention. All that is important is that the luminous intensities captured by the multielement detector are able to be assigned as accurately as possible to the respectively assigned amount $z_i$, through which the optical path length difference or the phase difference was changed in relation to the reference state of the interferometer. To attain a resolution that is as good as possible when determining the surface topography of the measurement object, the multielement detector preferably has a large number of detector elements, particularly advantageously more than 100, preferably more than 10 000, even more preferably more than 100 000 detector elements.

At this point, attention should be drawn to the fact that in most cases an associated point on the surface of the measurement object is assigned to each detector element p of the multielement detector by way of optical imaging by means of the interferometer optical unit; this associated point is also referred to as p for reasons of simplicity in this case and generally does not lead to mix-ups. If this assignment is present, it is then possible to ascertain the height value $h^p$ of the point p on the surface of the measurement object from that amount $z^p$ for the change of the optical path length difference or phase difference in relation to the reference state of the interferometer, for which amount the optical path length difference or the phase difference between the measuring light and the reference light has reached the specified value for the detector element p. If such a direct assignment between detector element p of the multielement detector and an associated point on the measurement object surface is not available because the detector element is not imaged onto the measurement object by the interferometer optical unit but at a different point, for example into the pupil of the imaging optical unit, the procedure according to the invention can nevertheless be used in exactly the same way; however, the surface topography in that case is not determined by a direct assignment of the value $z^p$ for the detector element p to a height value $h^p$ of the associated measurement object point p. Instead, the surface topography is carried out in this case by a transformation of the ascertained height or phase profile $h^p$, in the surface optically conjugate to the detector elements, onto the measurement object, the corresponding procedure being known to a person skilled in the art and therefore not being explained in more detail here. The procedure according to the invention can also be used in the same way in this case as in the evidently clearer case, in which a measurement object point p is directly assigned to each detector element p.

The interferometric measuring device according to the invention moreover comprises at least one evaluation unit which is connected to the multielement detector. Particularly advantageously, the evaluation unit is additionally connected to the adjustment unit, to the control unit thereof and/or to a measuring system assigned to the adjustment unit or to a movement of the adjustment unit, as a result of which the evaluation unit can be provided with information about the changes carried out by the adjustment unit. The evaluation unit is preferably a computer, a computer module, a microprocessor, a DSP, an FPGA, etc. What is essential is that the evaluation unit is configured to determine, for a multiplicity of detector elements p of the multi-element detector, that amount $z^p$ for the change in the optical path length difference or phase difference in relation to the reference state of the interferometer, for which amount the optical path length difference or phase difference between the measuring light and the reference light reaches a specified value, and to ascertain the surface topography of the measurement object therefrom.

To this end, the luminous intensities $I^p(z_i)$ of the interference pattern captured by the detector elements p of the multielement detector are transferred to the evaluation unit for a multiplicity of adjustment positions of the adjustment unit, but at least for two adjustment positions. As a result, the evaluation unit has available the corresponding correlograms $c^p=(c^p(1), c^p(2), \ldots, c^p(n))=(I^p(z_1), I^p(z_2), \ldots, I^p(z_n))$ for a multiplicity of optical path length differences or phase differences between the measuring light and the reference light, which have been altered by different amounts $z_1, z_2, \ldots, z_n$ in relation to the reference state of the interferometer.

Usually, according to the described procedure as per the prior art, these correlograms are used to determine those amounts $z^p$ for the change in the optical path length difference or the phase difference in relation to the reference state of the interferometer, for which amounts the optical path length difference or the phase difference between the measuring light and the reference value reaches the specified value—in particular, the preferred specified value of zero—, and from this the surface topography of the measurement object is ascertained.

The specified value can be specified explicitly or implicitly, as described below.

The specified value is preferably specified as a constant value, the value of zero being particularly preferably specified as described above. The scope of the invention includes the case where a different value is specified for each detector element p. The same value, in particular a value of zero, is preferably specified for a multiplicity of detector elements, particularly preferably for all detector elements.

Consequently, the scope of the invention includes the case where a constant value such as, e.g., "zero" (for the path length difference) or "0°" (for the phase difference) is explicitly specified, with the $z^p$ being ascertained such that this value is precisely reached at $z=z^p$. The scope of the invention likewise includes the case where the value is specified implicitly, in particular by virtue of the specification being implemented such that a certain point in the correlogram is reached at $z=z^p$, preferably an envelope maximum or any other prominent point in the correlogram and/or a certain phase angle of the correlogram in the vicinity of the envelope maximum or any other prominent point in the correlogram. Even such an implicit specification specifies a value of the optical path length difference or phase angle—even if the latter is not explicitly known at the time of the stipulation or only ascertained subsequently.

The evaluation unit requires information about the amounts $z_i$, through which the optical path length difference or the phase difference has changed in relation to the reference state of the interferometer while the luminous intensities $I^p(z_i)$ were captured. This is usually available in the evaluation unit, for example either as a result of the amounts $z_i$ being known due to a specified control of the adjustment unit of the interferometric device, or else as a result of the adjustment unit and/or a measuring system assigned thereto transmitting this information to the evaluation unit by way of a suitable data line or trigger line. Even in the case where the adjustment unit and/or a measuring system assigned thereto uses a trigger line to trigger the recording of data by the multielement detector, this information can be made available to the evaluation unit, for example by virtue of the configuration of the trigger times as a function of the adjustment position of the adjustment unit being rendered known to the evaluation unit or being defined by the latter. In addition to the above-described implementations there are a multiplicity of options in relation to how the evaluation unit can receive the information about the amounts $z_1, z_2, \ldots, z_n$ belonging to the correlograms $c^p = (c^p(1), c^p(2), \ldots, c^p(n)) = (I^p(z_1), I^p(z_2), \ldots, I^p(z_n))$, all of which can also be used advantageously within the scope of the present invention.

It should be noted that, at least when procedures according to the prior art are used, knowledge that is as accurate as possible in relation to the amounts $z_1, z_2, \ldots, z_n$ is essential for the quality of the results during the further evaluation. This is because the known procedures assume that amounts $z_1, z_2, \ldots, z_n$ known to the evaluation unit are also the real values thereof and use said amounts for the further calculation. By way of example, this leads to problems, in particular, if a Fourier or Hilbert transform is used in conjunction with the determination of the envelope and/or the envelope maximum and/or the phase of a correlogram. Although there are mathematical methods which allow such transformations to also be carried out for signal curves sampled at non-equidistant sampling points, these also lead to incorrect results, just like the conventional transformations, if the assumed sampling points of the signal curves to be transformed do not correspond to the real sampling points. Similar problems also arise in the case of all other known procedures for determining envelopes, envelope maxima and/or phase angles of correlograms if the assumed sampling points do not correspond to the real ones, independently of whether or not they are equidistant. By way of example, fitting of curves, in particular sinusoidal curves, to signal curves of correlograms leads to great deviations if the sampling points, at which the fit function and its deviation from the measurement data are naturally calculated, are not the right ones.

Naturally, it is also advantageous for the procedure according to the invention if the amounts $z_1, z_2, \ldots, z_n$ are known as accurately as possible; however, the procedure according to the invention is significantly more robust in relation to deviations of the known values for the $z_i$ from the associated real, but unknown values of the $z_i$.

By way of example, such deviations can occur as a result of the fact that (i) the length of measuring arm and/or reference arm of the interferometer is influenced in uncontrolled fashion during the measurements on account of vibrations or movements, that (ii) changes in the density and/or the refractive index of at least one medium in the measuring arm and/or reference arm through which light passes influence the measurements in uncontrolled fashion or that (iii) inaccuracies and/or errors occur when determining the amount $z_i$.

In the interferometric measuring device according to the invention, the evaluation unit now is designed in such a way that it also uses the luminous intensities $I^q(z_i)$ of at least one other detector element q of the multielement detector in addition to the light intensities $I^p(z_i)$ on the detector element p in order to determine the value $z^p$ assigned to the detector element p.

The advantage thereof already becomes clear on the basis of a very simple but nevertheless relevant consideration: in most cases, the height values $h^p$ and $h^q$ of directly adjacent surface points p and q of the measurement object are not exactly the same but very similar.

Accordingly, there is hardly any difference between the associated correlograms $c^p = (I^p(z_1), I^p(z_2), \ldots, I^p(z_n))$ and $c^q = (I^q(z_1), I^q(z_2), \ldots, I^q(z_n))$. The individual values $c^p(i)$ and $c^q(i)$ thereof can be represented using the general functional correlogram curve c(OPD) as $c^p(i) = c(z_i - 2 \ast h^p)$ and $c_q(i) = c(z_i - 2 \ast h^q)$, respectively. Since $h^p$ and $h^q$ only differ slightly, $h^q$ can be represented in the form $h^q = h^p + \Delta$, where $\Delta$ is very small. Hence $c^q(i) = (z_i - 2 \ast h^q) = c(z_i - 2 \ast h^p - 2 \ast \Delta) \approx c(z_i - 2 \ast h^p) - 2 \ast \Delta \ast c'(z_i - 2 \ast h^p)$, where $c'(z_i - 2 \ast h^p)$ is the derivative of the general functional correlogram curve c(OPD) at the point $z_i - 2 \ast h^p$. This means that forming the difference between the two correlograms $c^q$ and $c^p$ allows, apart from a simple scaling factor, the derivative of the correlogram for the measuring point p to be immediately calculated at exactly the points $z_i - 2 \ast h^p$ at which the correlogram itself was also recorded.

Now, in the case of the typical general functional correlogram curve $c(OPD) = env(OPD) \ast \cos(\varphi(OPD))$ of low-coherence interferometry, it is possible to assume to a good approximation that the envelope changes much slower than the sinusoidal modulation, meaning that in the case of the derivative formed according to the product rule and chain rule, $$c'(OPD) = env'(OPD) \ast \cos(\varphi(OPD)) - env(OPD) \ast \sin(\varphi(OPD)) \ast \varphi'(OPD),$$

the first term can be neglected, which is why under the realistic assumption that φ(OPD) depends approximately linearly on the OPD, φ'(OPD) is a constant and so the derivative c'(OPD) is proportional to the synthetic correlogram phase-shifted by 90° in terms of the carrier frequency, $$s(OPD) = env(OPD) * \sin(\varphi(OPD)).$$

The corresponding statement naturally applies not only to low-coherence interferometry but, in particular, to phase-shifting interferometry as well, since in this case the conditions env'(OPD)=0 and the constancy of φ'(OPD), which are only approximately valid for low-coherence interferometry, even apply exactly.

In conclusion, this now means that by simply forming the difference between the correlograms $c^p$ and $c^q$ it is possible apart from a scaling factor f to obtain the synthetic correlogram phase-shifted through 90° in relation to the correlogram $c^p$ in terms of the carrier frequency, $$s^p = (s^p(1), s^p(2), \ldots, s^p(n)) = f^*(Q^p(z_1), Q^p(z_2), \ldots,$$

$$Q^p(z_n) = f^*(I^q(z_1) \cdot I^p(z_1), (I^q(z_2) \cdot I^p(z_2), \ldots, (I^q(z_n) \cdot I^p(z_n),$$

where $Q^p(z_i)=I^q(z_i)-I^p(z_i)$, as described, represents a signal phase-shifted in terms of its modulation in relation to the luminous intensities $I^p(z_i)$. This synthetic correlogram $s^p$ shifted in terms of its carrier frequency is sampled at exactly the same points $z_i$ at which the original correlogram $c^p$ was also sampled, with no knowledge about the values $z_i$ being used to generate this synthetic correlogram. As a result, the synthetic correlogram $s_p$ belonging to the correlogram $c_p$ is generated independently of the accurate knowledge of the real values of the parameters $z_i$ by means of the procedure according to the invention, rendering the evaluation substantially more robust in relation to all types of disturbance in comparison with the previously known methods.

In particular, it is advantageous to use a direction or tangential vector, determined as described further below, to determine a phase-shifted signal $Q^p(z_1), Q^p(z_2), \ldots, Q^p(z_n)$ for the luminous intensities $I^p(z_1), I^p(z_2), \ldots, I^p(z_n)$ or to determine a corresponding associated phase-shifted signal for the vectors that emerged from the $I^p(z_1), I^p(z_2), \ldots, I^p(z_n)$ by projection and/or transformation.

Using the luminous intensities $I^p(z_1), I^p(z_2), \ldots, I^p(z_n)$ and the phase-shifted signals $Q^p(z_1), Q^p(z_2), \ldots, Q^p(z_n)$ it is consequently possible to carry out further steps known from the prior art, in particular determining an envelope and/or phase angle of the signal curve given by the luminous intensities. It is consequently advantageous to use the luminous intensities $I^p(z_1), I^p(z_2), \ldots, I^p(z_n)$ together with the phase-shifted signals $Q^p(z_1), Q^p(z_2), \ldots, Q^p(z_n)$ in order to ascertain an envelope and/or a phase angle of the signal curve given by the luminous intensities $I^p(z_1), I^p(z_2), \ldots, I^p(z_n)$ or to carry out something accordingly for the vectors that emerged from the $I^p(z_1), I^p(z_2), \ldots, I^p(z_n)$ by projection and/or transformation and for the associated phase-shifted signals. In particular, it is advantageous to use the determined phase angle and/or envelope to determine that amount $z^p$ for the change in the optical path length difference or phase difference for the element p of the multielement detector, for which amount the optical path length difference or the phase difference between the measuring light and the reference light reaches an explicitly and/or implicitly specified value.

The scaling factor f is preferably still determined for the further evaluation so that the correlogram $s^p$ obtains the same scaling as the correlogram $c^p$. To this end, there are a number of options; a relatively simple option consists of optimizing the factor f in such a way that $(c^p)^2+(s^p)^2$, which naturally yields the square of the envelope of the correlogram, is provided with a curve that is as flat as possible—to this end, $c_p$ must naturally be the correlogram which has had its offset removed, wherein the offset in the simplest cases is taken from the edge regions of the correlogram at which there is of course no or hardly any interference, or alternatively the offset is determined by suitable averaging of the individual correlogram values. Instead of optimizing the factor f by virtue of providing the square of the correlogram envelope with a curve that is as flat as possible, a corresponding process is naturally also possible for the square root thereof, which yields the envelope itself, or any other suitable function thereof. Provided that the present case is not so simple that the optimal value off can be determined directly from the available data, e.g., by way of a formula, use in this respect is advantageously made of any mathematical optimization method, for instance the gradient method, for determining the parameter f such that a specified assessment function b(f), which assesses the deviation from a flat curve in a suitable manner, becomes minimal. An advantageous example of such an assessment function is the sum $$b(f) = \sum_{i=2}^{n} \left( (I^p(z_i)^2 + f^*(Q^p(z_i))^2) - (I^p(z_{i-1})^2 + (f^*Q^p(z_{i-1}))^2) \right)^2,$$

with the aid of which the deviation of the square of the envelope for each point i of the correlogram from the previous point i−1 is determined by forming a difference, this deviation is then squared and subsequently summed over all points. This b(f) becomes minimal for the optimal factor f. It should be observed here that the $I^p(z_i)$ to this end are the luminous intensities of the correlogram at the point p, corrected for the offset as described above. It is even simpler to use only the points in the vicinity of the correlogram maximum for the purposes of determining the factor f and to assume that $(c^p)^2+(s^p)^2$ must be virtually constant for these points so that the standard deviation of the values $I^p(z_i)^2+(f^*Q^p(z_i))^2$ determined from the points located in the neighborhood of the envelope maximum, or the square root thereof, preferably serves as the assessment function.

A procedure for determining the scaling factor f, preferred in the case of phase-shifting interferometry in particular, also ascertains a value for the offset o of the correlogram $c^p$ at the same time as ascertaining the value for f. To this end, the two parameters f and o are optimized simultaneously by one of the known mathematical optimization methods such that, once again, the square of the envelope $(I^p(z_i)-o)^2+(f^*Q(z_i))^2$ or a function thereof exhibits a curve that is as flat as possible as a function of i or is even as constant as possible in the case of phase-shifting interferometry. To this end, use is preferably once again made, as described above, of a suitable assessment function which assesses deviations from the sought-after flat curve or a constant value.

A further preferred procedure for determining the factor f lies in fitting a realistic envelope function to the envelope which was determined as a function of the factor f, for example a theoretically known function or a function ascertained and/or approximated from the measurement data, and using the sum of the corresponding squares of the deviation ("chi-square") as an assessment function as a function of f.

In addition to the described options for determining the scaling factor f there still are any number of further ones, and the scope of the present invention also includes the use of these provided they supply a sufficiently accurate value for the required scaling factor f.

Consequently, apart from the scaling factor f, the $Q^p(z_i)$ correspond to the synthetic correlograms $s^p$.

If following the ascertainment of the suitable scaling factor f for each correlogram $c^p$ the associated and correctly scaled synthetic correlogram $s^p$, which is shifted in terms of the carrier frequency, was also ascertained, the further evaluation is preferably implemented in a manner corresponding to, or following, the known procedures of the prior art.

It is therefore advantageous to scale the direction vector and/or tangential vector determined as described above and/or the ascertained phase-shifted signal $Q^p(z_1)$, $Q^p(z_2)$, . . . , $Q^p(z_n)$ in such a way that the amplitude and/or the envelope of the carrier frequency thereof corresponds to the amplitude and the envelope, respectively, of the carrier frequency of the luminous intensities $I^p(z_1)$, $I^p(z_2)$, . . . , $I^p(z_n)$.

By way of example, in a preferred embodiment, the two correlograms $c^p$ and $s^p$ are squared again and added and the square root is taken in order to determine the envelope of the correlogram. Then, for example, the position of the envelope maximum can be determined again by fitting a suitable curve thereto. Within the scope of the investigations by the inventors it was found that, particularly if one of the aforementioned interferences is present, the curve of the envelope determined by means of the procedure according to the invention is significantly more flat and more realistic than in the case of the previously known procedures, and the position of the envelope maximum is implemented significantly more precisely.

The more accurate phase evaluation of the correlograms, in which the sinusoidal modulation of the correlogram in the vicinity of the envelope maximum is also used for evaluation purposes in addition to the evaluation of the position of the envelope maximum, also supplies significantly better results using the procedure according to the invention. As a result of the associated point $s^p(i)$ of the correlogram shifted in terms of the carrier frequency by 90° being determined for each correlogram point $c^p(i)$ independently of the knowledge about the amount of the OPD or phase change $z_i$ set by the adjustment unit, but nevertheless being determined at exactly the same position $z_i$, a precise phase value $\varphi^p(z_i)$ is available for each OPD or PD change $z_i$ by means of $\varphi^p(z_i)=\varphi^p(i)=\text{unwrap}(\arctan 2(s^p(i), c^p(i)))$, where arctan 2 is the variant of the arctan function which covers a value range of 360°, i.e., extends over all four quadrants of the unit circle, and unwrap( ) denotes a phase unwrapping carried out after the arctan has been formed, said phase unwrapping preferably being chosen in such a way that, at the position of the previously determined envelope maximum $\varphi^p(z)$, a value located as close as possible to 0° is adopted.

If the phase profile $\varphi^p(z_i)$ is known, the latter, of course, monotonically increasing or decreasing as a function of $z_i$ with a relatively constant gradient, it is possible to once again quite easily determine the value $z^p$ at which the OPD or PD reaches an explicitly and/or implicitly specified value by way of a linear regression (or, when necessary in the case of possibly occurring deviations from the linearity for example on account of dispersion etc., by curve fitting), for example by virtue of $\varphi^p(z)$ assuming an explicitly and/or implicitly specified value there, for example 0° for the closest maximum of the sinusoidal modulation to the envelope maximum or 90° for the closest zero with a negative gradient of the sinusoidal modulation to the envelope maximum.

Advantageously, information about an envelope and/or a phase angle of the function $I^p(z)$ that is dependent on the change z in the optical path length difference and/or the phase difference between the measuring light and the reference light is consequently ascertained in order to determine the value $z^p$ assigned to the multielement detector element p, in particular by virtue of also using the luminous intensities $I^q(z_i)$ of at least one other detector element q of the multielement detector in addition to the luminous intensities $I^p(z_i)$ for the purposes of ascertaining this information.

In this determination of $z^p$, possible inaccuracies in the values $z_i$ used for the evaluation are only incorporated to an insubstantial extent, rendering the method very robust against disturbances and ultimately leading to outstanding results.

For the sake of completeness, reference is made to the fact that the deviations of the points with the coordinates ($z_i$, $\varphi^p(z_i)$) from the profile of the straight regression line or the fit curve are advantageously used to determine corrections $\Delta z_i$ for the $z_i$ and thereby ultimately obtain more accurate $z_i$ values, for example by virtue of the correction values $\Delta z_i$ being determined in such a way in an advantageous embodiment that the points ($z_i+\Delta z_i$, $\varphi^p(z_i)$) come to rest exactly on the straight regression line or the fit curve. Particularly by combining the correction values $\Delta z_i$ obtained for the various detector elements p, for example by suitable averaging methods, optionally averaging methods comprising a suitable weighting, it is possible to correct the available $z_i$ values, which possibly originally deviated significantly from real $z_i$ values on account of disturbances, in such a way that even the known evaluation methods lead to better results. In this respect, the procedure according to the invention can be combined with the previously known procedures in order to obtain better results even in those cases.

In principle, the $z_i$ values now corrected in this way can naturally be also used as a new starting point for the evaluation according to the invention, which can even be extended to an iterative method by repetition. However, the investigations by the inventors have shown that the calculation and the use of corrected $z_i$ values hardly bring noteworthy advantages in conjunction with the procedure according to the invention since the procedure according to the invention is very robust against disturbances in any case, and so it is typically possible to dispense therewith.

Here, reference should once again be made to the fact that the procedure described above was explained using the example of low-coherence interferometry, but this can be transferred very easily to phase-shifting interferometry as well. Naturally, there is no envelope of the correlogram, or the latter is a constant in the case of phase-shifting interferometry; however, this only dispenses with the step of determining the envelope maximum and all approximations required within the scope of low-coherence interferometry even apply exactly. The actual procedure in which the correlograms of different detector elements p and q are combined with one another, however, is fully maintained in terms of all the details and ramifications, and so the procedure according to the invention, in particular as per the described preferred embodiments, also completely covers phase-shifting interferometry in addition to low-coherence interferometry.

At this point, reference should once again be made to the fact that the synthetic correlogram $s^p=(s^p(1), s^p(2), \ldots, s^p(n))$, ascertained as described above and below, represents in the case of low-coherence interferometry a correlogram with the same envelope that has been phase-shifted through 90° in terms of the carrier frequency in relation to the correlogram $c^p$ to a very good approximation, and in most cases also to a usable approximation, but this is not exactly correct. As presented above, this only applies exactly if the envelope env(OPD)—like in the case of phase-shifting interferometry—changes infinitely slowly over the general functional correlogram curve c(OPD) and the derivative φ'(OPD) of the phase is constant. Should this deviation between the synthetic correlogram $s^p$, ascertained as described above, and the actually required correlogram with the same envelope that has been phase-shifted through 90° in terms of the carrier frequency in relation to the correlogram $c^p$ not be negligible, this can be rectified by virtue of ascertaining an appropriately corrected synthetic correlogram in place of the previously determined synthetic correlogram $s^p$, and using said corrected synthetic correlogram instead of $s^p$.

To this end, the equation $$c'(OPD) = env'(OPD)*\cos(\varphi(OPD)) - env(OPD)*\sin(\varphi(OPD))*\varphi'(OPD)$$

is rewritten using $s(OPD)=env(OPD)*\sin(\varphi(OPD))$ to form $$s(OPD) = -(c'(OPD) - env'(OPD)*\cos(\varphi(OPD)))/\varphi'(OPD),$$

and using $c(OPD)=env(OPD)*\cos(\varphi(OPD))$ the following is then obtained:

$$s(OPD) = -(c'(OPD) - env'(OPD)/env(OPD)*c(OPD)))/\varphi'(OPD).$$

This means that a corrected synthetic correlogram can be produced quite easily in place of $s^p$ by virtue of, after determining the derivative vector c'(OPD) (or $(c^p)'$ for the specific point p), the original correlogram c(OPD) (or $c^p$) additionally being subtracted therefrom after said original correlogram was previously multiplied by the factor env'(OPD)/env(OPD), and the difference being divided by φ'(OPD).

The variables env(OPD), env'(OPD) and φ'(OPD) are preferably ascertained from a model of the general functional correlogram profile, which is known on account of the properties of the measuring device or which is determined from measurement data. The relative position of the model relative to the measurement data is easily ascertained, for example from the position of the correlogram envelope ascertained with the aid of the original correlogram $c^p$ and the non-corrected synthetic correlogram $s^p$. Experience has shown that neither the model nor its precise relative position relative to the specific correlograms require a particularly high accuracy—the procedure is extraordinarily robust in relation to all types of deviation, and so the conceivable iterative procedure for determining the corrected synthetic correlogram is only required very rarely in practical terms.

This specifies an advantageous procedure of how a corrected synthetic correlogram that is phase-shifted through 90° in terms of the carrier frequency in relation to the correlogram $c^p$ is obtained with the aid of the original correlogram $c^p$ and a relatively simple model—if the approximations made in the simplest case for determining the synthetic correlogram $s^p$ are too inaccurate in each case—and this synthetic correlogram then is preferably used instead of the insufficiently accurate synthetic correlogram $s^p$ throughout the scope of the procedure according to the invention, as described above and below, without further restrictions.

How the design of the evaluation unit according to the invention can be used to obtain more robust results in comparison with the previously known prior art when determining a surface topography of measurement objects was shown above for the elucidation purposes using only a very simple example.

However, the essential inventive property of the method according to the invention and of the evaluation unit of the device according to the invention, specifically that in order to determine the value $z_p$ assigned to the detector element p it also uses the luminous intensities $I^q(z_i)$ of at least one other detector element q of the multielement detector in addition to the luminous intensities $I^p(z_i)$ on the detector element p, can be advantageously configured and used in a much more far-reaching manner.

In light of what was stated above, it is initially relatively clear that when determining the value $z^p$ assigned to the detector element p there is no need to be restricted to the additional information of a single further detector element q but that there are advantages linked to the use of at least two, advantageously at least three, preferably at least ten and very particular preferably at least twenty detector elements q of the multielement detector to this end.

Advantageously, the at least one other detector element q, whose luminous intensities $I^q(z_i)$ are used to determine the value $z^p$ assigned to the detector element p, is chosen in such a way that it has specified neighborhood properties in relation to the detector element p.

This is because when determining the value $z^p$ assigned to the detector element p it is advantageous not to simply use arbitrary detector elements q and the associated correlograms but to select such detector elements q to this end which have certain advantageous neighborhood properties in relation to the detector element p. By way of example, in many cases such an advantageous neighborhood property is, naturally, a spatial neighborhood between the detector elements p and q or the associated object points, but also the similarity of the respectively associated correlograms can define a neighborhood on the basis of which the points q can advantageously be selected. In this respect, it is advantageous if the at least one detector element q which is used to determine the value $z^p$ assigned to the detector element p is chosen in such a way that it has specified neighborhood properties in view of at least one specified metric in relation to the detector element p.

In particular, it is therefore advantageous that the neighborhood properties are defined at least in part with the aid of a metric, wherein this metric particularly advantageously comprises a spatial distance between the detector elements p and q and/or a spatial distance between points assigned thereto on the measurement object and/or an optical surface conjugate to the multielement detector.

Such a metric for determining the neighborhood of detector elements p and q can comprise the determination of a spatial distance between the detector elements p and q and/or a spatial distance between points assigned thereto on the measurement object and/or an optical surface conjugate to the multielement detector. This is already advantageous inasmuch as spatially neighboring detector elements usually also have assigned object points with similar height values. Moreover, disturbances relating to spatially neighboring detector elements are likewise very similar in many cases. Particularly in the case of disturbances due to changes in the density and/or the refractive index of at least one of the media through which light passes in the measuring arm and/or reference arm, for example as a result of turbulence in the air on account of different temperatures, the disturbances are locally different as a rule, and so these are met to the best possible extent by a corresponding local evaluation by means of detector elements q spatially neighboring the detector element p.

It is advantageous if the correlograms $c^p=(I^p(z_1), I^p(z_2), \ldots, I^p(z_n))$ and $c^q=(I^q(z_1), I^q(z_2), \ldots, I^q(z_n))$ themselves are as similar as possible but naturally not equal. Accordingly, it is advantageous if the metric for determining the neighborhood of detector elements p and q comprises a metric in the n-dimensional vector space of the vectors $(I^p(z_1), I^p(z_2), \ldots, I^p(z_n))$ and $(I^q(z_1), I^q(z_2), \ldots, I^q(z_n))$ or a metric in a vector space of the vectors that emerged therefrom by projection and/or transformation. Such a metric can for example contain determining the length of the difference vector $c^q-c^p$ or the corresponding vectors that projected onto subspaces, wherein the latter case likewise comprises only using those correlogram points which are close to the respective envelope maximum for the neighborhood determination.

Advantageously, the metric for determining the neighborhood of detector elements p and q also uses a distance metric which is based on height values $h^p$ and $h^q$ ascertained using a first rough determination.

In principle, when choosing the detector elements q used to determine the value $z^p$, it is very advantageous in most cases to use such detector elements q for which there is a high similarity of, for example, the correlograms $c^p$ and $c^q$, which are therefore neighboring within the meaning of a neighborhood metric. However, it may be disadvantageous if for example the correlograms $c^p$ and $c^q$ are too similar or even equal since hardly any or no additional information can be obtained in this case. Therefore, when choosing the detector elements q to be used, it may even be advantageous in some cases to exclude those detector elements which should be considered to be neighboring in view of their neighborhood properties.

In principle, there are a number of options for using the correlogram information from a plurality of further detector elements $q_1, q_2 \ldots q_m$ for the purposes of determining the value $z^p$ assigned to the detector element p. The most obvious option simply consists of in each case determining, sequentially as described, distinct values $z^p$ with the aid of the correlograms $c^p$ and $c^{q_j}$ of the detector elements p and $q_j$ and to suitably average these, optionally average these with weighting, in order to obtain the final value for $z^p$.

However, it is more advantageous not to average the values for $z^p$ obtained by means of the different detector elements $q_j$ but instead suitably average the different synthetic correlograms $s^p$ ascertained with the aid of the detector elements $q_j$ in order to use the average synthetic correlogram, resulting therefrom, in combination with the correlogram $c^p$ belonging to the point p to determine the value for $z^p$, for example as described above.

However, it is still much more advantageous to imagine the correlograms $c^p=(c^p(1), c^p(2), \ldots, c^p(n))$ and $c^{q_j}=(c^{q_j}(1), c^{q_j}(2), \ldots, c^{q_j}(n))$ as points or vectors in the n-dimensional vector space and to consider the derivative apart from the factor f, $s^p=(s^p(1), s^p(2), \ldots, s^p(n))$, to be a direction vector which at least locally approximates the principal direction of the point distribution given by the vectors $c^p=(c^p(1), c^p(2), \ldots, c^p(n))$ and $c^{q_j}=(c^{q_j}(1), c^{q_j}(2), \ldots, c^{q_j}(n))$ or $(I^p(z_1), I^p(z_2), \ldots, I^p(z_n))$ and $(I^{q_j}(z_1), I^{q_j}(z_2), \ldots, I^{q_j}(z_n))$.

Even the above-described determination of the synthetic correlogram $s^p$ from the correlogram $c^p$ belonging to the detector element p and only a single further correlograms $c^q$, which belongs to the detector element q, already represents an at least local approximation of a direction vector to a point distribution (albeit consisting of only two points) of correlogram vectors when considered in the n-dimensional vector space in this sense.

Therefore, it is advantageous for the approximation used when determining the value $z^p$ assigned to the detector element p to comprise the determination of a direction vector which, at least locally in the surroundings of the light intensity vector $(I^p(z_1), I^p(z_2), \ldots, I^p(z_n))$ or a vector that emerged therefrom by projection and/or transformation, approximates the principal direction of the point distribution given by the vectors $(I^p(z_1), I^p(z_2), \ldots, I^p(z_n))$ and $(I^{q_j}(z_1), I^{q_j}(z_2), \ldots, I^{q_j}(z_n))$ or the vectors that emerged therefrom by projection and/or transformation.

To be able to carry out the evaluation in the n-dimensional vector space as discussed above, use is preferably made of the actually measured light intensity vectors $(I^p(z_1), I^p(z_2), \ldots, I^p(z_n))$ and $(I^q(z_1), I^q(z_2), \ldots, I^q(z_n))$, or else, advantageously, of said light intensity vectors from which the offset and/or amplitude scaling factor have been removed, as already described multiple times above. If light intensity vectors of the type $(I^p(z_1), I^p(z_2), \ldots, I^p(z_n))$ or correlograms or correlogram vectors of the type $c^p=(c^p(1), c^p(2), \ldots, c^p(n))$—which incidentally are identical—were used or are used above or below or in the patent claims, this preferably means both cases every time—provided nothing else is explicitly stated or this is clearly nonsensical. Additionally, there preferably is a restriction to a subset of the correlogram points of the type $(I^p(z_1), I^p(z_2), \ldots, I^p(z_n))$ or $c^p=(c^p(1), c^p(2), \ldots, c^p(n))$ in all considerations and deliberations, which is advantageous in view of computational complexity, for example. This is also explicitly covered by the description.

In summary, all of this is contained by the reference, made inter alia in the patent claims, to the "luminous intensity vector $(I^p(z_1), I^p(z_2), \ldots, I^p(z_n))$ or a vector that emerged therefrom by projection and/or transformation", wherein the terms "projection and/or transformation" may additionally contain further aspects.

Once again, there are a multiplicity of options for determining the synthetic correlogram $s^p=(s^p(1), s^p(2), \ldots, s^p(n))$ which apart from the described factor f is given as a direction vector that at least locally approximates the principal direction of the point distribution given by the vectors $c^p=(c^p(1), c^p(2), \ldots, c^p(n))$ and $c^{q_j}=(c^{q_j}(1), c^{q_j}(2), \ldots, c^{q_j}(n))$ or $(I^p(z_1), I^p(z_2), \ldots, I^p(z_n))$ and $(I^{q_j}(z_1), I^{q_j}(z_2), \ldots, I^{q_j}(z_n))$. The simplest of these options simply consists in carrying out a fit, advantageously a least-squares fit or a linear regression in the n-dimensional space to the point distribution given by the specified vectors using known mathematical processes and then determining the direction vector therefrom and hence determining the synthetic correlogram $s^p$ apart from the factor f. The factor f can subsequently be determined as already described above, and the sought-after value $z^p$ is then ascertained from the two correlograms $c^p$ and $s^p$ belonging to the detector element p, preferably as likewise already described above.

Another particularly advantageous option for determining the synthetic correlogram $s^p$ as a direction vector which at least locally approximates the point distribution given by the correlogram vectors $c^p$ and $c^{q_j}$ lies in using the known mathematical method of principal component analysis (PCA). In this case, the principal axes of the point distribution given by the vectors $c^p$ and $c^{q_j}$ are ascertained, wherein the direction of the eigenvector belonging to the largest eigenvalue of what is known as the covariance matrix is the sought-after direction vector. As soon as this direction vector is available, the procedure continues as already described above. It should be noted that the principal component analysis need not necessarily be carried out in full as it only needs to be carried out—and is therefore preferably also only carried out—until the sought-after eigenvector is present; this is the case very early in many of the known numerical methods for the PCA since this eigenvector belongs to the largest eigenvalue which is usually determined first.

It is therefore advantageous that the value $z^p$ assigned to the detector element p is ascertained with the aid of an approximation to at least some of the n-dimensional luminous intensity vectors $(I^p(z_1), I^p(z_2), \ldots, I^p(z_n))$ and $(I^q(z_1), I^q(z_2), \ldots, I^q(z_n))$ given by way of the $I^p(z_i)$ and $I^q(z_i)$ or the vectors that emerged therefrom by projection and/or transformation.

However, it is very particularly advantageous to not only be restricted to the at least local approximation of a direction vector to the point distribution given by the vectors $c^p=(c^p(1), c^p(2), \ldots, c^p(n))$ and $c^{q_j}=(1), c^{q_j}(2), \ldots, c^{q_j}(n))$ or $(I^p(z_1), I^p(z_2), \ldots, I^p(z_n))$ and $(I^{q_j}(z_1), I^{q_j}(z_2), \ldots, I^{q_j}(z_n))$ but instead to implement, at least locally, the approximation of a suitable lower dimensional submanifold of the n-dimensional vector space to this point distribution, for example an at most three-dimensional submanifold, preferably an at most two-dimensional submanifold and very particular preferably a one-dimensional submanifold, i.e., a one dimensionally parameterized curve in the associated high dimensional vector space.

The fact that this is possible can be seen particularly easily using the example of phase-shifting interferometry if, exceptionally, the additional assumption is made to this end that the correlograms $c^p=(c^p(1), c^p(2), \ldots, c^p(n))$ and $c^{q_j}=(c^{q_j}(1), c^{q_j}(2), \ldots, c^{q_j}(n))$ to be evaluated are available without offset and normalized fashion, as described above.

Then, for example, the correlogram $c^p=(c^p(1), c^p(2), \ldots, c^p(n))$ is given by $c^p(i)=\cos(2\pi/\lambda*(z_i-2*h^p))$, which can be represented as $c^p(i)=\cos(2\pi/\lambda*z_i)*\cos(2\pi/\lambda*2*h^p)+\sin(2\pi/\lambda*z_i)*\sin(2\pi/\lambda*2*h^p)$ according to the addition theorem. If this is now represented in vector notation in the form $c^p=(c^p(1), c^p(2), \ldots, c^p(n))=\cos(2\pi/\lambda*2*h^p)*v+\sin(2\pi/\lambda*2*h^p)*w$ with the vectors $v=(\cos(2\pi/\lambda*z_1), \cos(2\pi/\lambda*z_2), \ldots, \cos(2\pi/\lambda*z_n))$ and $w=(\sin(2\pi/\lambda*z_1), \sin(2\pi/\lambda*z_2), \ldots, \sin(2\pi/\lambda*z_n))$, it is easy to identify that all possible $c^p$ vectors and $c^{q_j}$ vectors are always located on an ellipse, i.e., on a one-dimensionally parameterized curve in the n-dimensional space, which itself is situated completely on a two-dimensional submanifold, a plane in the specific case. This applies independently of the values $z_i$; however, the accurate relative position and form of this ellipse depends by all means on the values of the $z_i$.

This now provides various evaluation options:

The simplest option lies in fitting an ellipse to the points defined by the measured correlograms $c^p$ and $c^{q_j}$ actually in the n-dimensional space, projecting the correlogram vector $c^p$ on this ellipse and obtaining the synthetic correlogram vector $s^p$ by differentiating the one-dimensional differentiable submanifold of the n-dimensional space, given by the ellipse, as a tangential vector of this submanifold at the location of the projected correlogram vector $c^p$. In this case, the differentiation can be carried out very easily since the ellipse as a one-dimensional submanifold of the n-dimensional space can also be represented as a one-dimensionally parameterized curve in this vector space. After determining the tangential vector and determining its scaling factor as described above, the further evaluation is preferably undertaken as described above with the aid of $s^p$.

Therefore, it is advantageous to determine a tangential vector at the differentiable manifold M by differentiating the latter.

If removing the offset and/or scaling of the correlograms $c^p=(c^p(1), c^p(2), \ldots, c^p(n))$ and $c^{q_j}=(1), c^{q_j}(2), \ldots, c^{q_j}(n))$ to be evaluated is dispensed with as assumed above, which is less advantageous but nevertheless possible, a two-dimensional or even a three-dimensional differentiable submanifold of the n-dimensional space is obtained instead of the ellipse. In this case, too, the correlogram vector $c^p$ is preferably projected on the submanifold and the synthetic correlogram vector $s^p$ is obtained by differentiation at the point of the projected correlogram vector $c^p$ such that it is subsequently possible to proceed as described above.

Therefore, it is particularly advantageous that the approximation comprises the fit of a differentiable submanifold M, in particular a lower dimensional differentiable submanifold, at least to the point distribution from the points $(I^p(z_1), I^p(z_2), \ldots, I^p(z_n))$ and $I^q(z_1), I^q(z_2), \ldots, I^q(z_n))$ in the n-dimensional vector space or in a vector space of the vectors that emerged therefrom by projection and/or transformation, in particular that the differentiable submanifold is at most a three-dimensional submanifold, in particular at most a two-dimensional submanifold, of the associated vector space.

The described procedure is also implementable for correlograms $c^p$ and $c^{q_j}$ obtained by means of low-coherence interferometry. This no longer leads to an ellipse anymore if, like previously in the case of phase-shifting interferometry, offset-free and normalized correlograms are used again for the evaluation; instead, this yields a different one-dimensionally parameterized curve or a one-dimensional differentiable submanifold which is similar to an elliptical spiral but which, in contrast to the ellipse, is no longer closed on account of the changing envelope. Nevertheless, it is also possible in this case to continue just like in the case of phase-shifting interferometry, even though the determination of the curve to be fitted is more complicated and optionally requires a model of the envelope and the relative position of the modulation in relation to the envelope, wherein this information can optionally also be ascertained from measurement data. If the removal of offset and/or scaling from the correlograms $c^p$ and $c^{q_j}$ to be evaluated is once again dispensed with, the procedure accordingly becomes even more complicated but, nevertheless, it is able to be implementable in principle.

Therefore, in an advantageous embodiment, the approximation to the n-dimensional luminous intensity vectors $(I^p(z_1), I^p(z_2), \ldots, I^p(z_n))$ and $(I^p(z_1), I^q(z_2), \ldots, I^q(z_n))$ or the vectors that emerged therefrom by projection and/or transformation is described by a one-dimensionally parameterized curve in the associated vector space.

In particular, it is advantageous that the approximation to the luminous intensity vectors $(I^p(z_1), I^p(z_2), \ldots, I^p(z_n))$ and $(I^q(z_1), I^q(z_2), \ldots, I^q(z_n))$ or the vectors that emerged therefrom by projection and/or transformation is, at least locally, a linear approximation. Consequently, this relates to an approximation to a straight line, plane or any other linear subspace of the vector space which has a lower dimension than the latter itself.

However, there is a significantly more advantageous procedure for evaluating the points in the n-dimensional space which are defined by way of the measured, advantageously offset-corrected and normalized correlograms $c^p$ and $c^q$, which procedure is applicable both to low-coherence interferometry and to phase-shifting interferometry. This procedure is described below for low-coherence interferometry only since, as can be seen very easily, the application is also implementable in the special case of phase-shifting interferometry. For this evaluation, the assumption is once again made that the envelope of the correlograms changes significantly more slowly than their modulation. In this assumption and to a first approximation, the spiral also closes in the low-coherence case and the one-dimensional curve defined by the correlograms in the n-dimensional space is located to first approximation in a two-dimensional subspace, i.e., a plane where it is approximately represented by an ellipse (all of this applies exactly to PSI in any case). Now, this two-dimensional plane in the n-dimensional space is determined and parameterized by a plane fit or a two-dimensional regression, by a principal component analysis or by parts thereof, etc. Then, the points defined by the correlograms $c^p$ and $c^q$ are projected onto this plane, where they are still described by an ellipse. This ellipse is now determined within this projection plane by way of a two-dimensional fit or comparable methods so that it is possible to subsequently define an associated affine map which maps the ellipse to an associated circle. Should the projection plane have been determined with the aid of a principal component analysis, the corresponding affine map is advantageously determined directly with the aid of the two largest eigenvalues or the associated eigenvectors of the PCA covariance matrix in an alternative configuration. With the aid of the affine map now present it is now possible to likewise transform all points that belong to the projected correlogram vectors $c^p$ and $c^q$. After this transformation was carried out, the spatial angle between two projected points which belong to different correlograms $c^p$ and $c^q$ and which were subject to an affine map corresponds to the phase difference between the sinusoidal modulations of the associated correlograms and can consequently be used to evaluate the phase of the correlograms.

It is therefore advantageous that the determination of the direction vector comprises a principal component analysis (PCA) or parts thereof, an eigenvalue determination, a linear regression or any other optimization method for minimizing the deviation of a straight line defined by the direction vector and/or a foot suitable therefor to point distribution given the vectors $(I^p(z_1), I^p(z_2), \ldots, I^p(z_n))$ and $(I^p(z_1), I^p(z_2), \ldots, I^q(z_n))$ or the vectors that emerged therefrom by projection and/or transformation.

The distance of the points belonging to the correlogram vectors $c^p$ and $c^q$ from the projection plane is preferably used for the envelope evaluation, said distance adopting more or less discrete but clearly distinguishable values for all correlograms, depending on whether a correlogram has the identical phase angle or a phase angle shifted through k*360° (k integer). From this, results that are comparable to the evaluation described previously are obtained, both for the envelope evaluation and for the phase evaluation, and these are likewise correspondingly robust in relation to disturbances. However, the advantage of the procedure described last consists in the fact that the sought-after values $z^p$ are obtained simultaneously for a multiplicity of correlograms $c^p$, significantly reducing the computational outlay.

BRIEF DESCRIPTION OF THE DRAWINGS

Further advantageous features and configurations are explained below on the basis of exemplary embodiments and the figures. In this case:

FIGS. 2A, 2B, 3A-3C, 4A-4C, 5, 6A-6C, 7A-7D, 8A, 8B, 9A-9C, 10A-10C, and 11 show illustrations for explaining exemplary embodiments of methods according to the invention to be carried out by means of the device as per FIG. 1;

DETAILED DESCRIPTION

The figures show schematic illustrations that are not true to scale. In the figures, the same reference signs denote the same elements of elements with the same effect.

Figure 1:
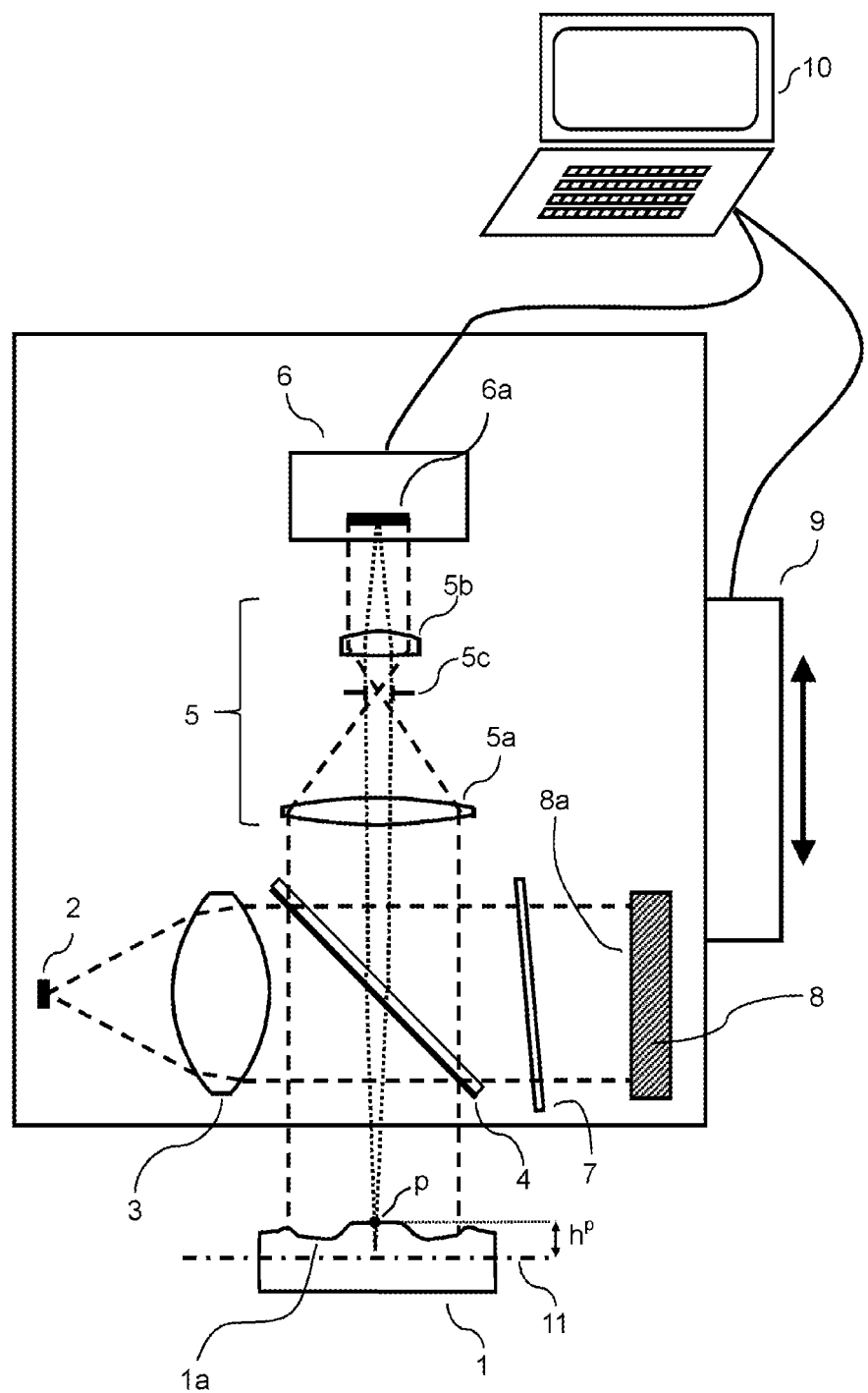
FIG. 1 shows a first exemplary embodiment of a device according to the invention with a Michelson interferometer.

FIG. 1 shows a first exemplary embodiment of a device according to the invention with a Michelson interferometer. The device serves to determine the surface topography of a measurement surface $1a$ of a measurement object 1 by means of interferometry.

The device comprises a light source 2, embodied as an LED in the present case, with a broadband light spectrum, in this case in the wavelength range of 490 nm to 550 nm with a maximum at 520 nm.

Via a condenser 3, the light from the light source reaches a semi-transparent mirror 4, by means of which approximately 50% of the luminous intensity is guided as illumination light to the measurement surface $1a$ of the measurement object 1. The illumination light reflected by the measurement surface $1a$ as measuring light partly passes through the semi-transparent mirror 4 and is imaged by means of an imaging optical unit 5, embodied in the present case as a telecentric imaging optical unit, into a detection region of the device where a multielement detector 6 is arranged. In the present case, the imaging optical unit 5 comprises optical lenses $5a$ and $5b$ and an optical stop $5c$ for the telecentric embodiment.

In the present case, the multielement detector 6 is designed as a CCD camera and has a CCD sensor, which is embodied as an area sensor 6a with 1024×1024 sensor elements, which, as a sensor array, are arranged on the crossing points of a square grid. Each sensor element represents a detector element of the multielement detector 6.

Approximately 50% of the light produced by the light source 2 passes through the semi-transparent mirror 4 as reference light and reaches a reference mirror 8 via an optical filter 7. The reference light reflected at the reference mirror 8 once again passes through the optical filter 7 and is partly deflected by the semi-transparent mirror 4 in order likewise to be imaged into the detection region by means of the imaging optical unit 5. Consequently, an interference pattern is generated in the detection region by superposition of measuring light and reference light and can be evaluated by means of the multielement detector 6. In this case, the filter 7 serves to attenuate the luminous intensity of the reference light in order to obtain approximately the same luminous intensities of measuring light and reference light in the detection region.

The distance of the device from the measurement object 1, and hence the optical path length difference OPD between the measuring light and the reference light, can be changed by means of an adjustment unit 9. In the present exemplary embodiment, the optical path length of the measuring light is consequently changed to this end.

Consequently, the luminous intensities $I^p(z_i)$ of the interference pattern on the detector elements of the multielement detector 6 in the detection region can be captured for at least two optical path length differences OPD which have been changed by different amounts $z_i$ by means of the multielement detector 6.

The device consequently comprises an interferometer optical unit for bringing together the measuring light and the reference light and for producing the interference pattern in the detection region, wherein the interferometer optical unit in the present case comprises the elements of condenser 3, semi-transparent mirror 4, imaging optical unit 5, optical filter 7 and reference mirror 8.

The device furthermore comprises an evaluation unit 10, which is designed as a commercially available computer, presently in the form of a laptop, with a processor, data memory, visual display unit and a keyboard as an input unit. The evaluation unit 10 is connected to the multielement detector 6 and the adjustment unit 9 such that measuring signals from the detector elements of the multielement detector can be read by means of the evaluation unit and the optical path length difference OPD can be changed by means of control signals by way of the adjustment unit 9.

The evaluation unit is designed to determine the amount $z^p$ for the change in the optical path length difference for a multiplicity of detector elements p of the multielement detector 6, for which amount the optical path length difference between the measuring light and the reference light reaches an explicitly and/or implicitly specified value, 0 in the present case, in order to ascertain the surface topography of the measurement surface 1a of the measurement object 1 therefrom.

What is essential is that the evaluation unit is designed to also use the luminous intensities $I^q(z_i)$ of at least one other detector element q of the multielement detector in addition to the luminous intensities $I^p(z_i)$ in order to determine the value $z^p$ assigned to the detector element p, as explained in more detail below using an exemplary embodiment of the method according to the invention:

The first exemplary embodiment of a method according to the invention is configured as scanning white-light interferometry (WLI).

Initially, the device is displaced into a reference state by means of the adjustment unit 9. The virtual reference surface 11, which corresponds to an optical path length difference OPD=0 in the reference state, is labeled by a dash-dotted line in FIG. 1 and is perpendicular to the plane of the drawing of FIG. 1. The precise relative position of this reference surface 11 is unimportant to the measurement. Thus, the reference surface 11 can pass through the object like in the present example. However, it is likewise possible for the reference surface to be located above the object, for example. What is essential is that height information $h^p$ is ascertained for a multiplicity of measurement points p such that it is possible to calculate the relative height difference of the measurement points from one another and therefore a surface topography of the measurement surface 1a is obtained.

Proceeding from the above-described reference state, the adjustment unit 9 is now controlled by means of the evaluation unit 10 in such a way that the device is removed from the measurement object 1 by way of equidistantly specified steps, i.e., moved upward in the representation as per FIG. 1. This increases the optical path length of the measuring light while the optical path length of the reference light however remains unchanged such that, as a result, there is a change in the OPD. In the present case, measurement values for all detector elements p of the multielement detector 6 are captured in each case at 64 positions of the device. A measurement point p on the measurement surface 1a of the measurement object is assigned to each of the 1024×1024 (=1 048 576) detector elements p of the multielement detector 6 in the device illustrated in FIG. 1.

Consequently, the associated intensities $I^p(z_1)$, $I^p(z_2), \ldots, I^p(z_n)$ are recorded in interferograms by means of the evaluation unit for a total of 64 OPDs that have been changed in relation to the reference state by $z_1, z_2$, (n=64), and so the associated correlogram $c^p = (c^p(1), c^p(2), \ldots, c^p(n))$ is obtained for each measurement point p, with the measured luminous intensity of the i-th point of the correlogram being $c^p(i) = I^p(z_i)$ in each case.

In this case, the $z_i$ values are specified equidistantly, that is to say—at least according to the stipulation—the specified distance $\Delta z$ between two successive $z_i$ values is constant.

Consequently a correlogram with 64 measurement values is available for each detector element p after this measurement is carried out.

FIG. 2A illustrates an example of such a correlogram of a detector element p. The specified z values are plotted along the x-axis in [μm] and the luminous intensity is plotted along the y-axis in arbitrary units, in this case advantageously normalized to the luminous intensity outside of the interference region of the correlogram, that is to say normalized to the offset of the correlogram. This also applies to the further correlograms illustrated in the figures provided nothing else is stated.

In principle, it is now possible—as explained at the outset in the description of the prior art—to determine an envelope for the correlogram as per FIG. 2A and determine the value for $z^p$ which corresponds to the maximum of the envelope (approximately at a z-position of 5 μm in the present case). For this measurement point, $h^p$ would consequently be determined as half of the determined z value, i.e., 2.5 μm.

However, if disturbances occur, for example in the form of tremors during the measurement, the measurements are not implemented exactly at the specified z values. Rather, the z values of the actual measurements are shifted to the right or left in the correlogram representation, depending on the effect of the vibrations.

FIG. 2B illustrates a disturbance-afflicted correlogram in exemplary fashion. In principle, the measurement conditions are identical to the measurement conditions as per FIG. 2A; however, disturbances were introduced herein, as described above, leading to displacements of the $z_i$ values so that these are no longer exactly equidistant.

Figure 3A:
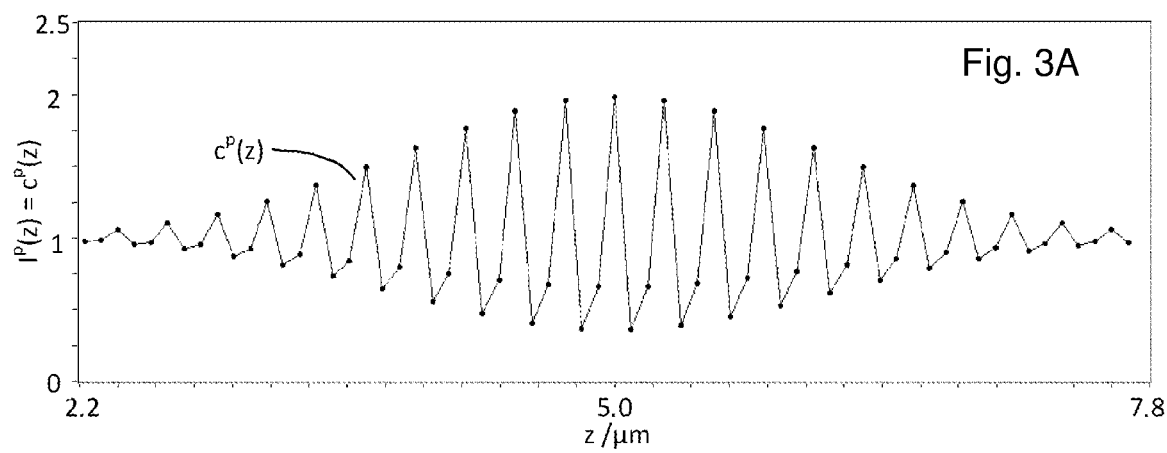
Figure 3B:
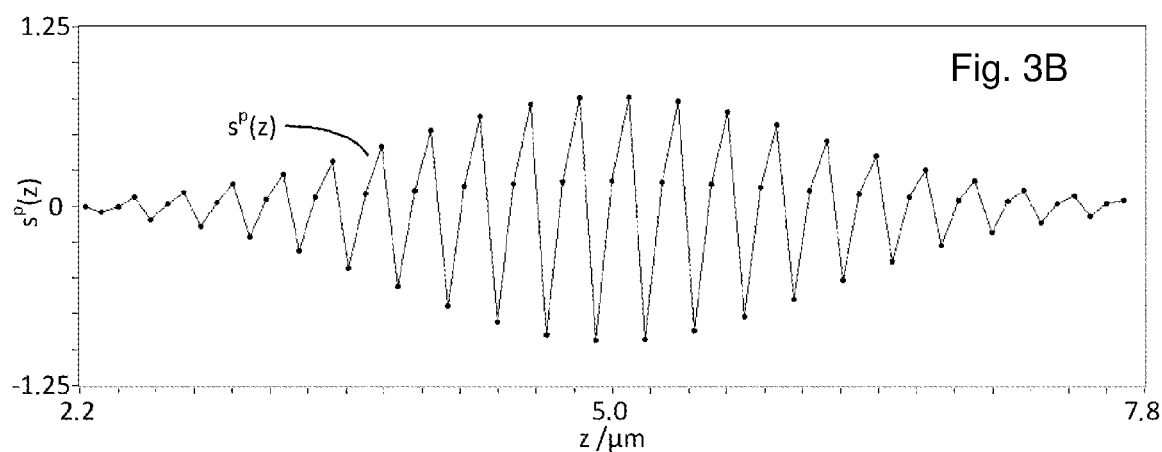
Figure 3C:
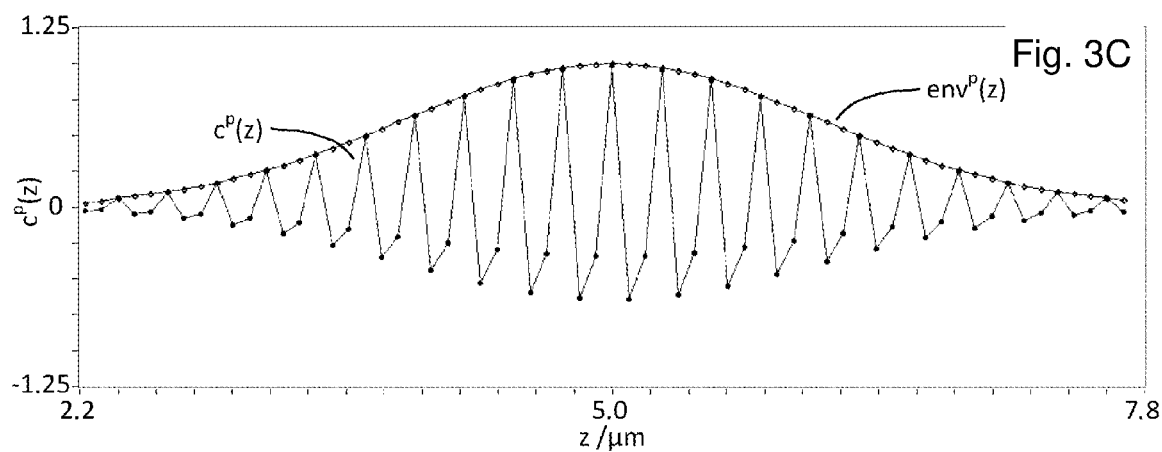

Initially, the effect of such disturbances in the evaluation according to the prior art should be described below:

FIGS. 3A-3C illustrate an evaluation according to the prior art in the undisturbed case, that is to say with equidistant $z_i$ values:

FIG. 3A shows the undisturbed correlogram from FIG. 2A.

The synthetic correlogram $s^p(z)$ illustrated in FIG. 3B is produced by means of a Hilbert transform. As described at the outset, the envelope $env^p(z)$ as per FIG. 3C can be obtained from the original correlogram $c^p(z)$ and the synthetic correlogram $s^p(z)$ which was obtained by way of the Hilbert transform.

Determining the z value of the maximum of this envelope in the undisturbed case already facilitates, to a good approximation, a determination of the sought-after value for $z^p$ and hence twice a value of $h^p$ at this measurement point p (approximately 5 μm)

Reference should additionally be made to the fact that the offset was removed from the original correlogram $c^p(z)$ during the evaluation such that the values of $c^p(z)$, as also illustrated in FIG. 3C, are now distributed around the zero value.

The correlogram as per FIG. 4A corresponds to the correlogram as per FIG. 2B with the non-equidistant $z_i$ values on account of the introduced disturbance of the measurement as a result of tremors.

If the Hilbert transform is now applied to this correlogram as per FIG. 4A, this yields the correlogram $s^p(z)$ as per FIG. 4B. On account of the disturbances, the envelope $env^p(z)$, which is plotted in FIG. 4C together with the original (FIG. 4A) correlogram $c^p(z)$ but without the offset and which was determined in the same way as previously, has a non-uniform curve. In particular, it is not possible to determine a unique maximum. Consequently, using the evaluation process as per the prior art, the sought-after value of 5 μm for $z^p$ cannot be ascertained or can only be ascertained very inaccurately in the case of such a disturbance.

The peculiarity of the method according to the invention which facilitates an evaluation with great accuracy despite the presence of such disturbances is explained with reference to the first exemplary embodiment and further embodiments of the method according to the invention on the basis of FIGS. 5, 6A-6C, 7A-7D, 8A, 8B, 9A, 9B, 10A-10C and 11 below.

Figure 5:
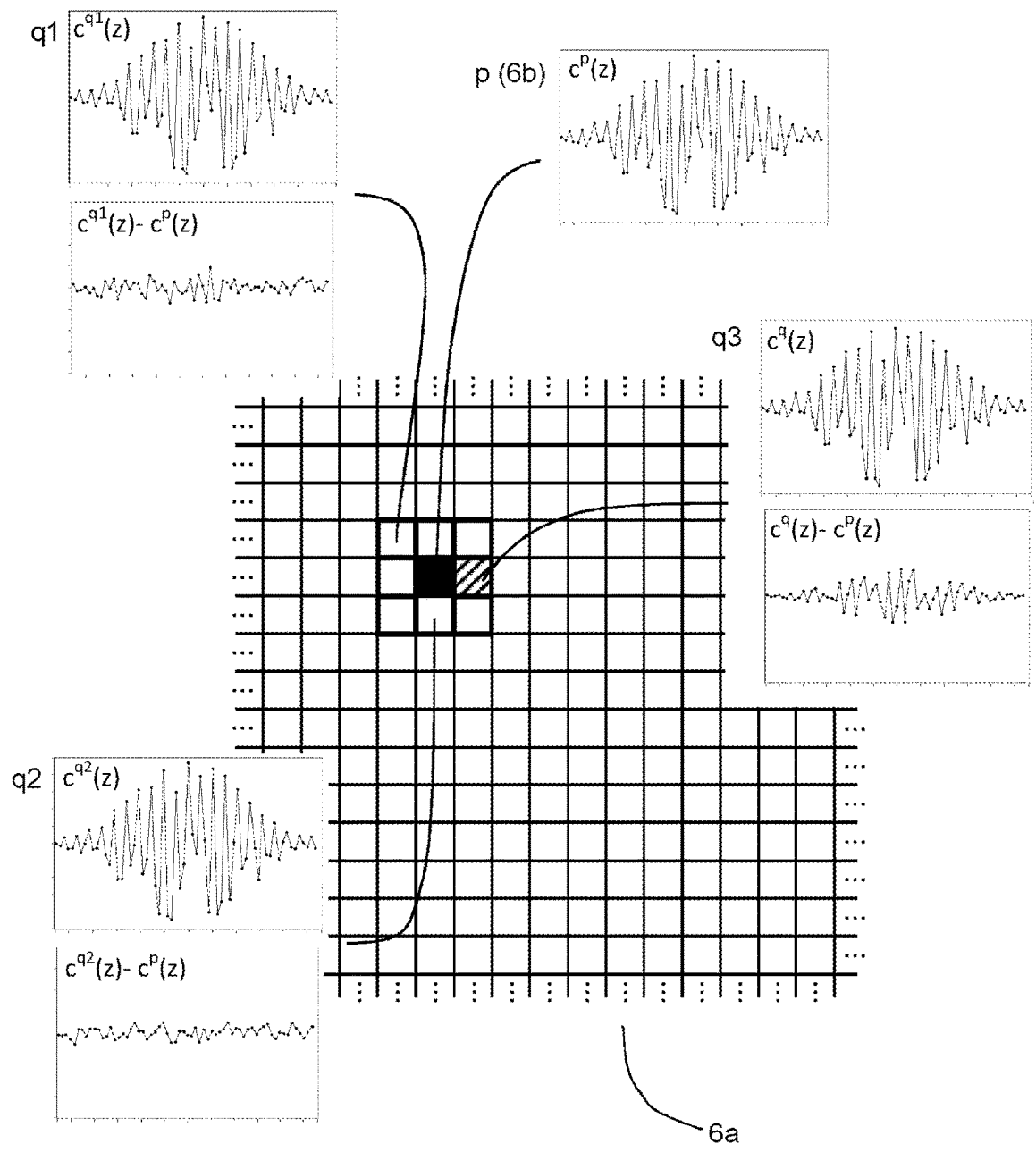

FIG. 5 schematically shows a section of the area sensor 6a of the multielement detector 6. As already described, the CCD chip has 1024×1024 detector elements, wherein one detector element p with reference sign 6b is marked in exemplary fashion by way of being filled-in in black. What is essential is that in order to determine the value $z_p$ assigned to the detector element p the luminous intensities $I^q(z_i)$ of at least one other detector element q of the multielement detector are also used in addition to the luminous intensities $I^p(z_i)$.

To this end, the neighboring elements are considered in a square of 3×3 pixels in the present exemplary embodiment: the detector element 6b has eight neighboring elements $q_j$, which are highlighted in FIG. 5 by a thick black edge. Now, one neighboring element is selected from these eight neighboring elements as follows:

The difference between the correlogram of the neighboring element and the correlogram of the detector element p is formed for each neighboring element. In exemplary fashion for the neighboring elements $q_1$, $q_2$ and $q_3$, the correlogram of this neighboring point is represented in an upper diagram in each case and the difference between the correlogram of this neighboring point and the correlogram of the detector element p (6b) is represented in a lower diagram in each case.

A measure is assigned to each difference correlogram, which consequently represents the difference vector $c^{qj}-c^p$, by means of a vector norm. In the present case, the measure is determined on the basis of the standard deviation formed from the elements $c^{qj}(i)-c^p(i)$ of the difference vector. If the correlograms of a neighboring element $q_j$ and of the detector element p only have a minor deviation according to this measure, the correlograms of these two detector elements are very similar and this, in the present case, is disadvantageous for the evaluation as per the present exemplary embodiment since signal noise possibly makes an exact subtraction very difficult. In principle, a relatively large deviation as per the above-described measure may also be disadvantageous since a linear approximation as described below is no longer admissible in that case. However, in the present measurement situation, a relatively large deviation is unlikely because only nearest neighbors are considered, in the case of which the correlograms only differ slightly as a rule.

Consequently, in the present exemplary embodiment of the method according to the invention, the neighboring element of the eight neighboring elements $q_j$ where the difference vector as per the above-described measure has the greatest value is selected. This is the detector element $q_3$ in the example as per FIG. 5.

Figure 6A:
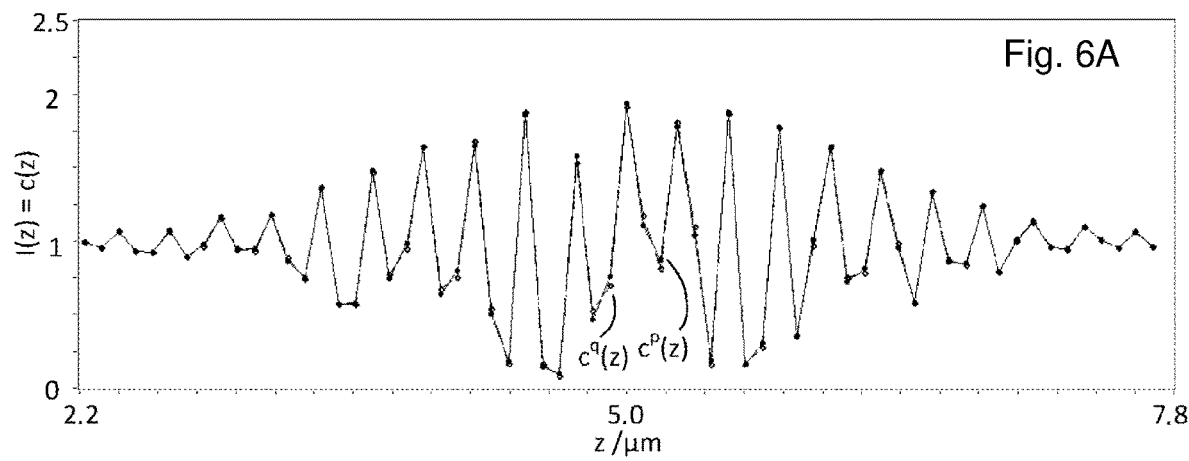

Consequently, to determine the value $z^p$ assigned to the multielement detector p, use is also made of the luminous intensities of the detector element $q_3$ in the present case, as will be explained in more detail below:

FIG. 6A shows the correlograms of the detector elements p and $q=q_3$ where disturbances have been introduced into the measurements like in the case of FIG. 2B as well. Since the neighboring detector elements p and q are assigned to spatially neighboring measurement points p and q on the measurement surface 1a of the measurement object 1, there are only minor differences in the correlograms.

Figure 6B:
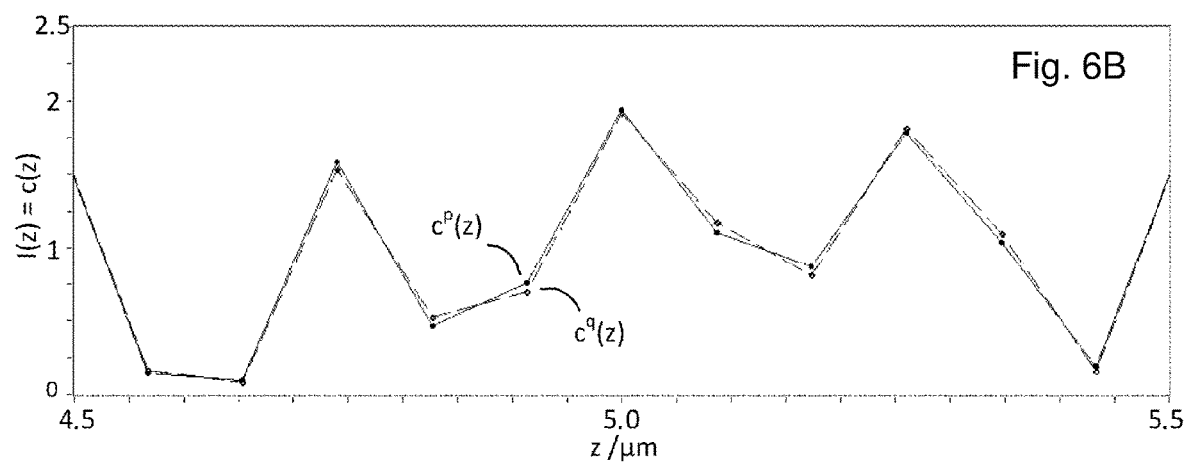
Figure 6C:
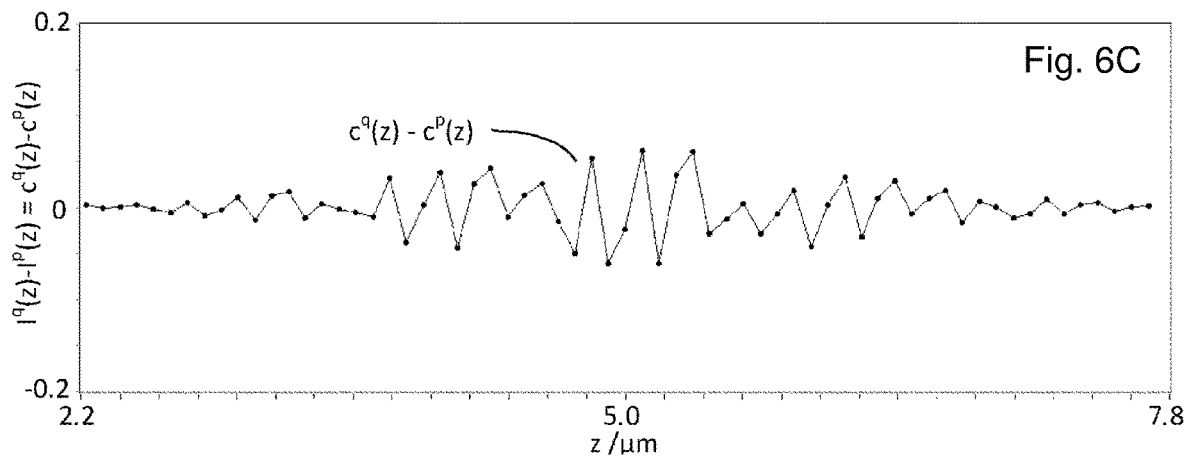

FIG. 6B therefore illustrates an enlarged excerpt around the z value of 5 μm. FIG. 6C shows the difference correlogram $c^q(z)-c^p(z)$. Accordingly, this difference correlogram can also be considered to be a 64-dimensional difference vector. In the present exemplary embodiment, the further evaluation is carried out in 64 dimensions, that is to say the measurement points of all $z_i$ values are used.

The scope of the invention also includes the use of a subset, that is to say lower-dimensional difference vector, for instance a selection of points which, e.g., are arranged approximately symmetrically around a maximum of the correlogram $c^p$, for example ±16 points, that is to say a total of 33 points. In an alternative configuration, a symmetric selection of points is implemented around the point at which the modulation is strongest. The latter is evident as a result of the fact that the amount of the difference of two successive points is greatest there. In a further development of the exemplary embodiment, there is a sine fit to the correlograms, and the value the maximum amplitude of this fit is determined as a central value for a symmetric selection of a subset of points for the subsequent evaluation.

FIG. 7A plots the correlogram of the detector element p and the difference correlogram as per FIG. 6C. As explained previously, the difference correlogram $Q^p$ as per FIG. 6C can be considered to be a synthetic correlogram $s^p=f*Q^p$ with a scaling factor of f=1.

However, to determine the correlogram envelope, there is a need for a synthetic correlogram $s^p$ which was scaled by the scaling factor f in such a way that it has the same amplitude as the original correlogram $c^p$.

As illustrated in FIG. 7B and FIG. 7D, the determination of the correlogram envelope $env^p(z_i)$ by taking the square root of $(c^p(z_i))^2+(s^p(z_i))^2$ without correct scaling of the $s^p(z_i)$ would lead to a wavy result for the envelope $env^p(z_i)$, which would not allow the determination of a maximum or would at least lead to a significant risk of error. In this case, FIG. 7B shows the case where, as per FIG. 7A, scaling was carried out with a factor f that was too small.

By contrast, if as per FIG. 7C scaling is carried out with a factor f that is too large, this likewise yields a wavy envelope that is not evaluable or only evaluable with a significant risk of error, as shown in FIG. 7D.

In the present exemplary embodiment, the correct scaling factor f is determined by virtue of the fact that, by ascertaining the maximum of the correlogram $c^p$, an approximate value $i_m$ is initially determined for the index i at which the envelope maximum is located. Then, to determine the scaling factor f, use is made of 21 points of the offset-free original correlogram $c^p$, which are located symmetrically around the index $i_m$, and of the synthetic correlogram $s^p=f*Q^p$ scaled by the factor f. For these points, the standard deviation $\sigma(f)$ of the 21 values of $(c^p(z_i))^2+(s^p(z_i))^2$ with $i=i_m-10, \ldots, i=i_m-9, \ldots, i=i_m+10$ can be specified for each possible value of f. Now, the value for f at which the specified standard deviation becomes minimal is determined with the aid of a gradient method. With the aid of this value for f, the correctly scaled synthetic correlogram $s^p=f*Q^p$ is now ascertained for the further evaluation.

Figure 8:
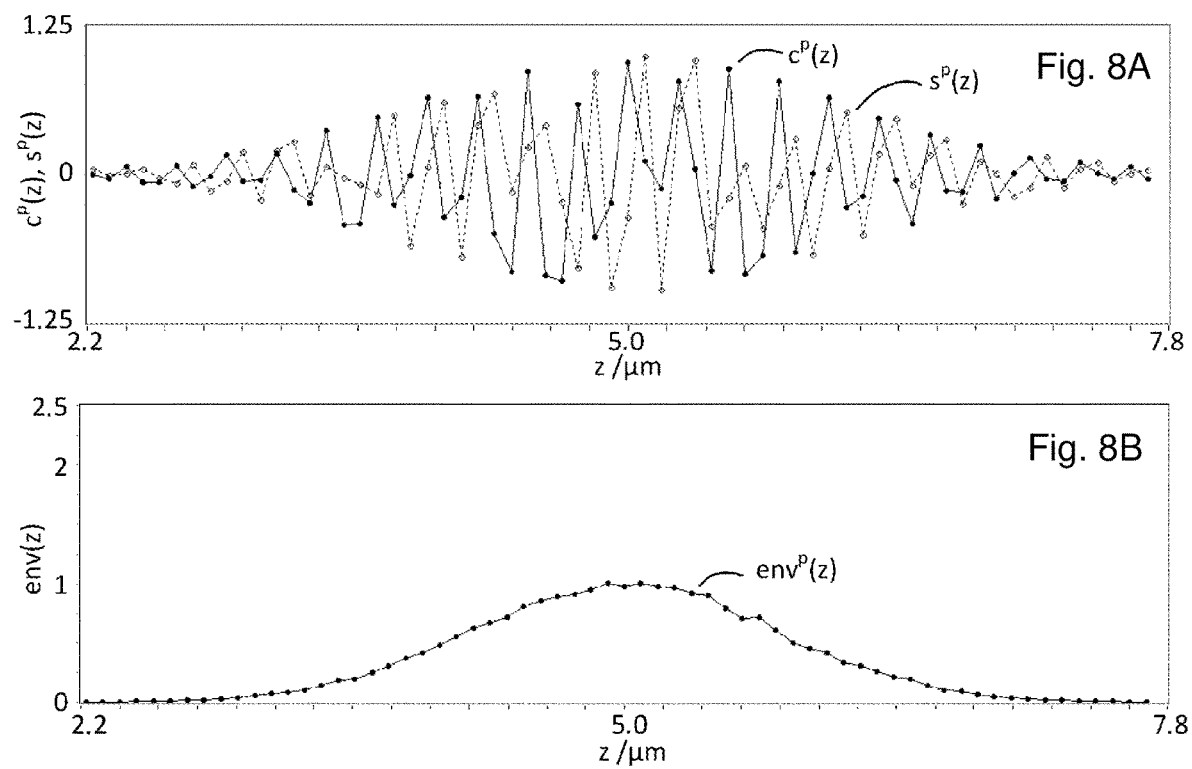

FIG. 8A now shows the correlogram $c^p(z_i)$ from FIG. 6A or FIG. 2B together with the correctly scaled synthetic correlogram $s^p(z_i)=f*Q^p(z_i)$ determined as described above. It is possible to recognize that the amplitude of the synthetic correlogram $s^p(z_i)$ scaled by this factor f corresponds to that of the original correlogram $c^p(z_i)$.

FIG. 8B illustrates the envelope $env^p(z)$ which arises from the correlogram $c^p$ and the correctly scaled synthetic correlogram $s^p$ determined as described above. In this case, the envelope $env^p(z_i)$ was ascertained by taking the square root of $(c^p(z_i))^2+(s^p(z_i))^2$ as described.

As a summary, FIGS. 9A-9C in partial image a show the correlogram of the detector element p which has been afflicted by disturbances in the z values. Partial image b shows the synthetic correlogram $s^p$ which was scaled with the ascertained correct factor f as described above. This synthetic correlogram was consequently determined with additional use being made of the correlogram of the detector element $q_3$.

Partial image 9C shows the correlogram $c^p$ as per partial image a together with the envelope $env^p$ which was obtained as described above. A comparison of this envelope ascertained using the method according to the invention and the envelope from FIG. 4C, which was determined with the aid of one of the methods as per the prior art, impressively shows that a significant robustness in relation to disturbances, such as tremors for example, that lead to non-equidistant $z_i$ values was obtained.

Now, the maximum of the envelope $env^p$ as per FIG. 9C is determined in order to ascertain the $z^p$ value for the detector element p and, accordingly, the measurement point p. In the specific case, this is implemented by way of a parabolic fit to the envelope $env^p(z_i)$ at the previously selected 21 points $z_i$.

However, the measurement data allow a further increase in the accuracy when determining the $z^p$ value, as explained below on the basis of FIG. 10 in an advantageous development of the described exemplary embodiment.

FIG. 10A shows the correlogram $c^p$ and the envelope obtained by means of the synthetic correlogram as per the illustration from FIG. 9C.

FIG. 10B shows, in the direction of the abscissa z, a magnified excerpt around the previously determined maximum of the envelope $env^p(z)$. However, the coordinate axis now does not plot the intensity against the associated z value but a phase $\varphi^p(z)$ which is assigned to the z value. As described above, an associated point $s^p(i)$ is respectively ascertained for each correlogram point $c^p(i)$ by way of the synthetic correlogram, wherein the synthetic correlogram $s^p$ can be considered to be a correlogram that has been shifted through 90° in terms of the carrier frequency in relation to the correlogram $c^p$. Therefore, a phase can be determined for each position $z_i$ from the two correlograms, for example by virtue of forming the extended arctan arctan $2(s^p(z_i), c^p(z_i))$ at the corresponding indices i for each point $z_i$ and carrying out phase unwrapping.

As described at the outset, the reference state was chosen by comparison of the optical path lengths (OPD=0) in this exemplary embodiment. The specified value for the optical path length difference is consequently 0 in this exemplary embodiment. Accordingly, the specified phase value for determining the amount $z^p$ is also 0° in the present case. As illustrated in FIG. 10b, a straight line is fitted by means of a linear regression and the z value for $z^p$ at which the phase value corresponds to the specified value (0° in the present case) is determined.

This two-stage method, in which an approximate value $z^p$ was initially obtained by determining the maximum of the envelope and the $z_p$ value with a phase of 0° was subsequently determined by means of the straight regression line, facilitates a significant improvement in the measurement accuracy or a yet again increased robustness in relation to disturbances such as tremors, for example.

FIG. 10C finally illustrates how the method according to the invention can in principle also be used to obtain the information regarding the amount $\Delta z$ with which a z value $z_i$ was changed on account of the disturbance: in the ideal, disturbance-free case, the values $z_i$ in the illustration as per FIG. 10B or FIG. 10C are located on the regression straight line plotted in dotted fashion. Consequently, a value $\Delta z_i$ can be determined for each value $z_i$ by virtue of, for each value $z_i$, subtracting the value $z_i$ from the z value which corresponds to the assigned phase value on the regression straight line. These correction values $\Delta z$ are elucidated by horizontal arrows in FIG. 10c for the $z_i$ values with $i=30, 31, \ldots, 37$.

Thus, the scope of the invention in principle also contains undertaking a correction of the $z_i$ values by way of the correction values $\Delta z_i$ obtained as per FIG. 10C and carrying out an evaluation, in particular in a manner known per se, by means of the corrected $z_i$ values.

Moreover, a more accurate correction of the $z_i$ value can be obtained by virtue of, for each $z_i$, an averaging of the correction value being implemented for all detector elements or a selection of detector elements. This is because to a good approximation and for a fixed value of i, which corresponds to a measurement time in accordance with the present exemplary embodiment, the disturbance $\Delta z_i$ is the same for all measurement points and hence also for all detector elements. Therefore, a correction value $\Delta z_i$ is advantageously determined for a subset, preferably for all detector elements, and the correction value $\Delta z_i$ for carrying out a correction of all $z_i$ values is calculated by averaging the correction value over the subset of measurement points, preferably over all measurement points, in particular by way of weighted averaging.

Figure 11:
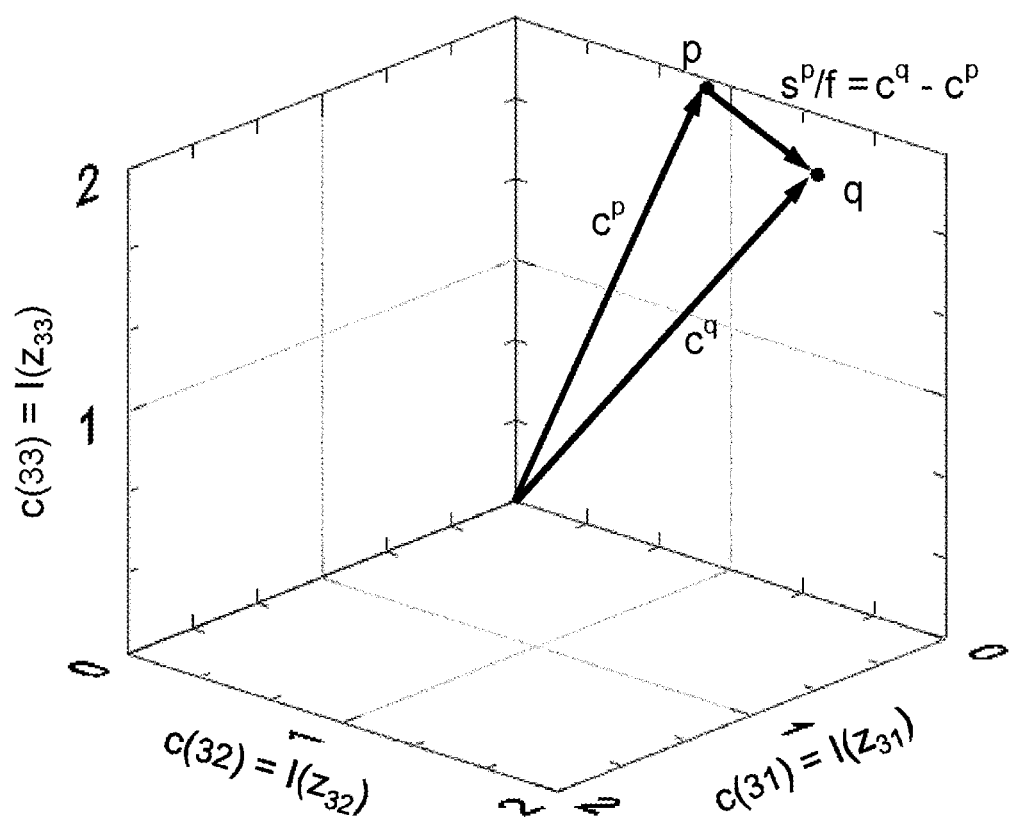

FIG. 11 schematically illustrates that, in the present exemplary embodiment, the non-scaled synthetic correlogram $Q^p=s^p/f$ can be considered to be the difference vector of the correlograms $c^q-c^p$ and consequently represents a direction vector in the n-dimensional vector space, which approximates the point distribution given by the n-dimensional luminous intensity vectors $(c^p(1), c^p(2), \ldots, c^p(n))= (I^p(z_1), I^p(z_2), \ldots, I^p(z_n))$ and
  $(c^q(1), c^q(2), \ldots, c^p(n))=(I^q(z_1), I^q(z_2), \ldots, I^q(z_n))$, said point distribution however only consisting of two points in this exemplary embodiment.

For practical reasons, only three dimensions rather than the actual 64 dimensions present were selected for illustrative purposes in the illustration: only dimensions 31, 32 and 33 of the 64-dimensional vector space are shown in the illustration as per FIG. 11.

In particular, a restriction to a subset of $z_i$ values, presently 21 of the possible 64 $z_i$ values as described above in relation to FIG. 6, in the vector space corresponds to a projection onto a subspace, the dimension of which corresponds to the number of selected $z_i$ values. Consequently, an evaluation by means of the method according to the invention can also be implemented using such vectors that emerged by projection and/or transformation.

An example of such a further transformation is that the offset is initially subtracted from each correlogram by virtue of the offset being, e.g., ascertained on the basis of the correlogram points outside of the interference region or determined by averaging the correlogram values and said offset then being subtracted. Likewise, scaling or any other change due to normalization of the correlogram represents such a transformation. Rotations and other transformations can likewise be undertaken.

The measuring device as per the first exemplary embodiment and the method as per the first exemplary embodiment can also be used for measurement objects which partly reflect the measuring light at a plurality of planes:

In the case of such a measurement object with a plurality of partly reflecting surfaces for measurement by means of the device as per FIG. 1, the measurement surface $1a$ of the measurement object 1 on the side facing the device can be, e.g., a coated glass surface which only partly reflects the measuring light, in an alternative to the preceding description of the measurement object 1. Furthermore, in the volume of the measurement object, the measurement object has a further boundary with a metal coating at the back side (the side facing away from the device, the bottom side in FIG. 1), at which the component of the measuring light that penetrates into the measurement object is reflected within the measurement object. By means of the methods known from the prior art and by means of the method according to the invention, it is consequently possible to assign two or more values $z^p$ to one spatial point p since there is a (partial) reflection of measurement light at two or more height positions $h^p$. If the difference of the various heights $h^p$ is greater than the coherence length of the detected measuring light and reference light, the interferences belonging to the various reflecting layers do not overlap in the correlograms, and so the partial correlograms belonging to the various layers can be separated within the measurement data and can consequently be evaluated separately, and it is possible to ascertain the various $z^p$ values separately from one another. However, the method according to the invention can also be used particularly advantageously if the various partial correlograms of the points $z^p$ overlap since the synthetic correlograms can even be determined correctly by means of the method according to the invention in this case. As a result, it is firstly possible to use the known methods to evaluate overlapping correlograms; then again, additional advantageous evaluation possibilities are provided since, for example, the common envelope and the common phase of the various partial correlograms can be determined very easily in accordance with the described procedure.

Figure 12:
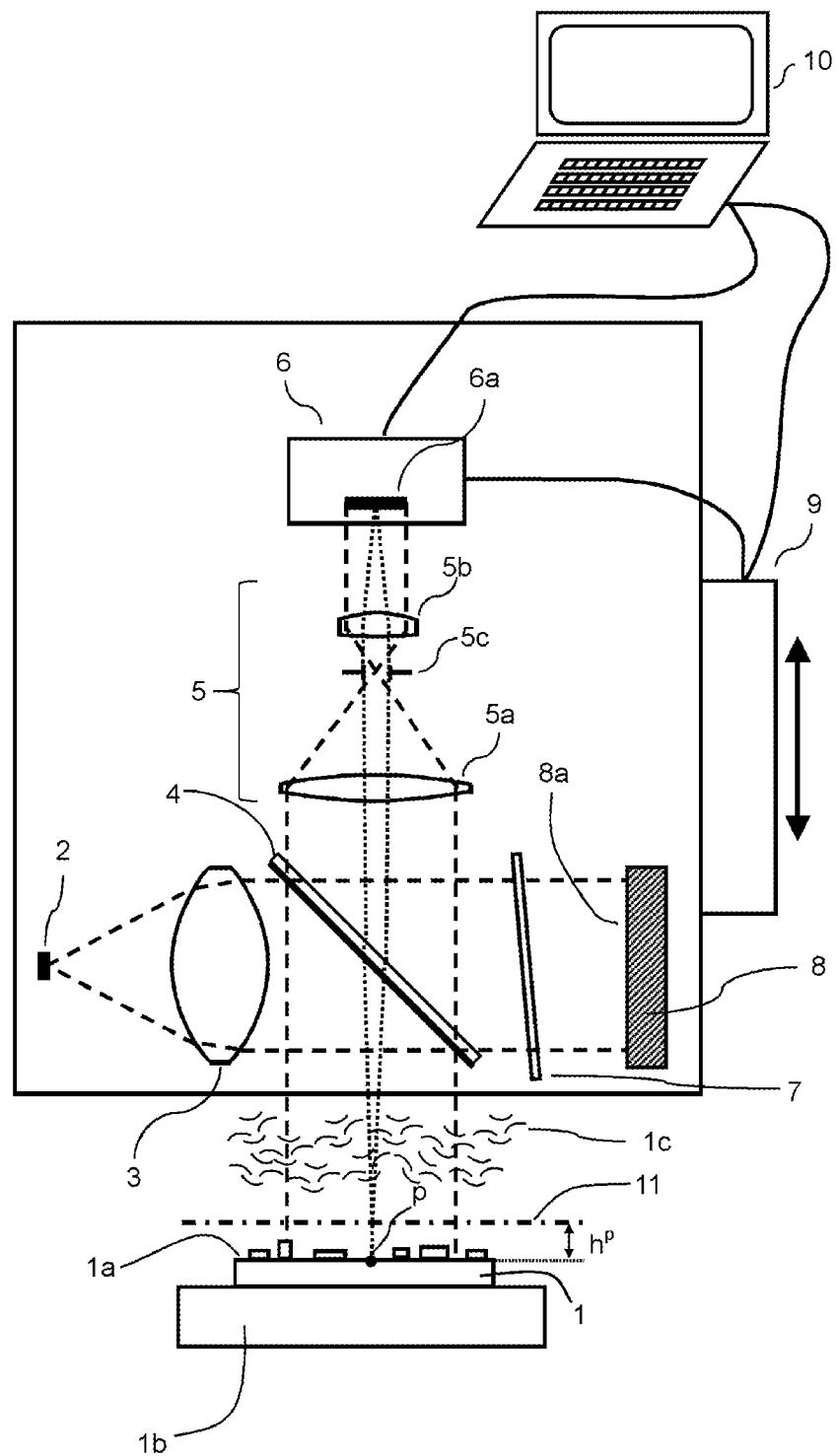
FIG. 12 shows a second exemplary embodiment of a device according to the invention with a Michelson interferometer.

FIG. 12 schematically illustrates a second exemplary embodiment of a device according to the invention.

This construction is also based on the principle of the Michelson interferometer. To avoid repetition, only the essential differences between the second exemplary embodiment illustrated in FIG. 12 and the first exemplary embodiment illustrated in FIG. 1 are discussed below:

In the present case, the measurement object 1 should be measured at a given elevated temperature, and so it is arranged on a hot plate $1b$. By way of example, this is relevant if a curvature of the measurement surface $1a$ on account of the action of heat should be examined in the case of electronic components.

What is problematic in this case is that air turbulence $1c$ arises between the measurement surface $1a$ and the device in the beam path of the measuring light on account of the heating by the hot plate $1b$. Such air turbulence leads to density changes and, accordingly, to an inhomogeneous refractive index. Variations in the refractive index of the air on account of the density variation caused by the heating can already lead to significant measurement errors. This is even the case if no additional disturbances, for example as a result of tremors, are present.

The arrangement of the optical components of the device is identical to that in the device as per the first exemplary embodiment shown in FIG. 1.

In the present case, the evaluation unit 10 is connected to the multielement detector 6 as described above. The multielement detector 6, which is embodied here as a CMOS camera, is connected to the adjustment unit 9 by way of a trigger line. This should schematically elucidate that equidistant $z_i$ values are specified in the adjustment unit in the case of the second exemplary embodiment and the adjustment unit 9 transmits a trigger signal to the multielement detector 6 every time a specified $z_i$ value is reached so that a camera image is recorded.

The reference surface 11 which reproduces the reference state OPD=0 is illustrated above the measurement object 1. In this exemplary embodiment, the reference surface 11 is therefore located above the measurement object such that negative height values $h^p$ arise for measurement points p on the measurement surface $1a$ of the measurement object 1.

Figure 13:
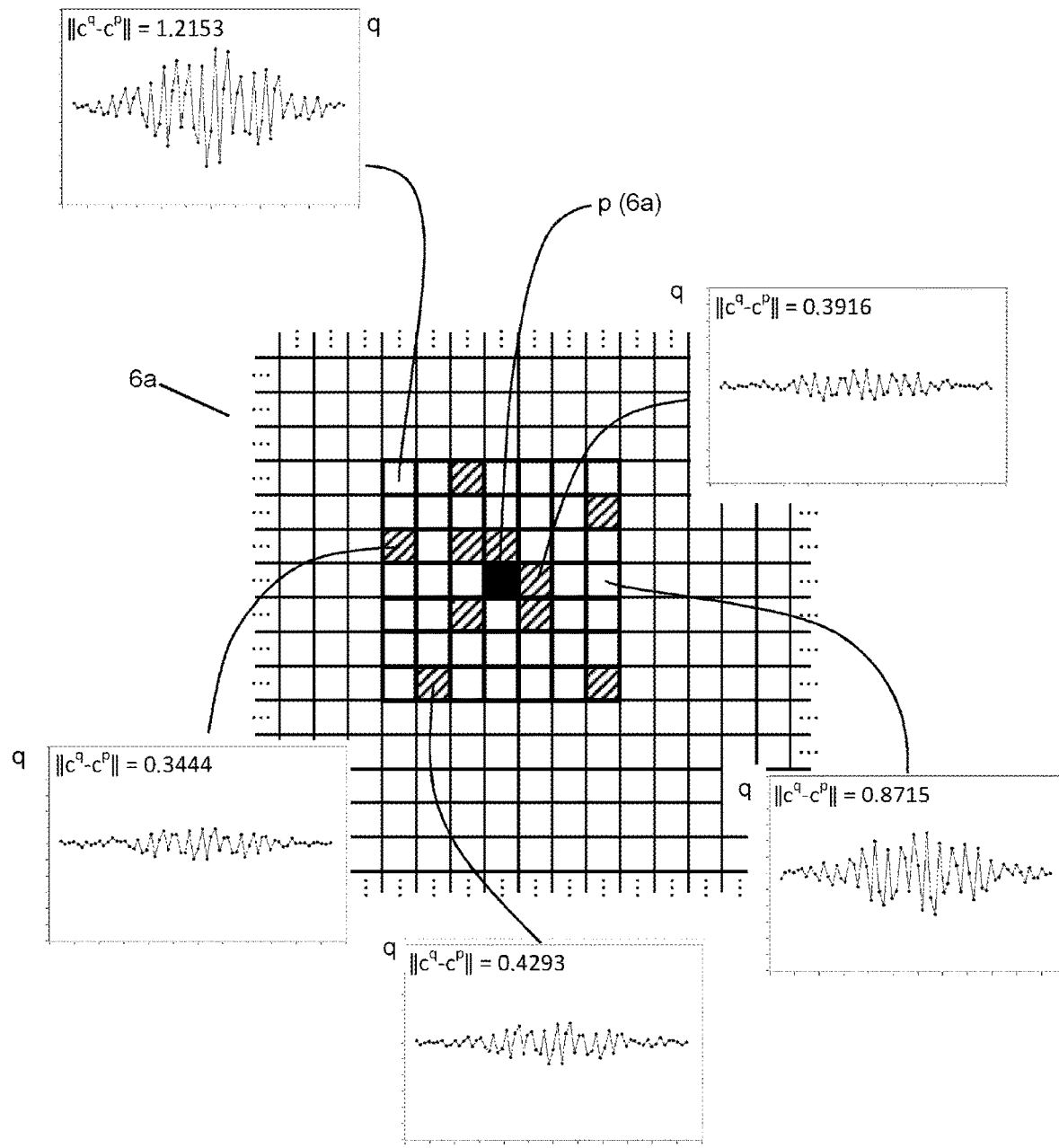
FIGS. 13 and 14 show illustrations for explaining exemplary embodiments of methods according to the invention to be carried out by means of the device as per FIG. 12.

The evaluation unit 10 is embodied to carry out an evaluation as per a second exemplary embodiment of the method according to the invention. This substantially corresponds to the first exemplary embodiment, and so likewise only the essential differences are discussed below in order to avoid repetition:

FIG. 13 in turn schematically illustrates the area sensor $6a$ of the multielement detector 6. A comparison between FIGS.

13 and 5 shows that a larger number of detector elements are used in this second exemplary embodiment of the method according to the invention.

A detector element p with the reference sign 6a is also labeled by being filled-in in black in the illustration as per FIG. 13. The considered neighboring detector elements are labeled by thick black edges: in the present case, the 48 neighboring elements $q_j$ of the detector element p (6a), located within a square of 7×7 detector elements, are used for the evaluation. In this case, too, desired neighborhood properties are defined in order to assess the suitability of a neighboring element for the evaluation. As a measure for assessing the neighborhood properties, the length norm of the difference vector $c^q - c^p$ is formed for the detector element q as a metric. Consequently, a value is available for each of the 48 neighboring elements, illustrated in exemplary fashion in FIG. 13 for five neighboring elements q by way of a corresponding difference correlogram $c^q - c^p$ and by way of the numerical value which arises from the length norm metric for this difference correlogram. In the present case, the selection is made such that the ten neighboring elements which have the most similar correlograms are selected from the 48 neighboring elements. Consequently, values corresponding to the length norm metric of the difference vector are calculated for all 48 neighboring elements and the ten neighboring elements with the ten smallest values are determined. This is expedient in the present measurement situation since the assumption can be made that a difference in the correlograms will be decisively caused by the air turbulence and consequently neighboring elements with only small differences in respect of the length norm metric of the difference vector will have similar measurement conditions.

In the exemplary illustration as per FIG. 13, the detector elements with the length norm of the difference vector of 1.2153 and 0.8715 are not in the group of detector elements with the ten lowest values. By contrast, the detector elements with the values of 0.4293, 0.3916 and 0.3444 are contained in this group and are used accordingly for the evaluation (together with seven further detector elements not illustrated in detail).

Consequently, the second exemplary embodiment differs from the first exemplary embodiment by virtue of, in particular, using more neighboring detector elements $q_j$ (ten in the present case) for determining the value $z^p$ assigned to the detector element p by virtue of also using the luminous intensities $I^{qj}(z_i)$ of the 10 neighboring elements $q_1, \ldots, q_{10}$, determined as described above, in addition to the luminous intensities $I^p(z_i)$.

In alternative embodiments of the second exemplary embodiment, it is not a fixed number of detector elements, for example in the spatial vicinity of the detector element p, that is chosen but instead all detector elements that have certain specified neighborhood properties are selected from a certain preselection of detector elements. By way of example, it may be advantageous to select all those detector elements $q_j$ for which the correlogram $c^{qj}$ deviates from the correlogram $c^p$ of the detector element p by a suitable measure, for example such that the standard deviation of the values $c^{qj}(i) - c^p(i)$ ascertained from the difference vectors corresponds to approximately twice the quantization and camera noise. In this case, an upper and lower bound is advantageously defined for the values ascertained using the corresponding metric, on the basis of which the detector elements to be used are selected. This takes account of the fact that the correlograms $c^{qj}$ and $c^p(i)$ should firstly not be too different because otherwise a linear approximation causes difficulties but that they should not be too similar either because otherwise the difference correlogram can be very small and can be disturbed or even dominated by possible noise.

Figure 14:
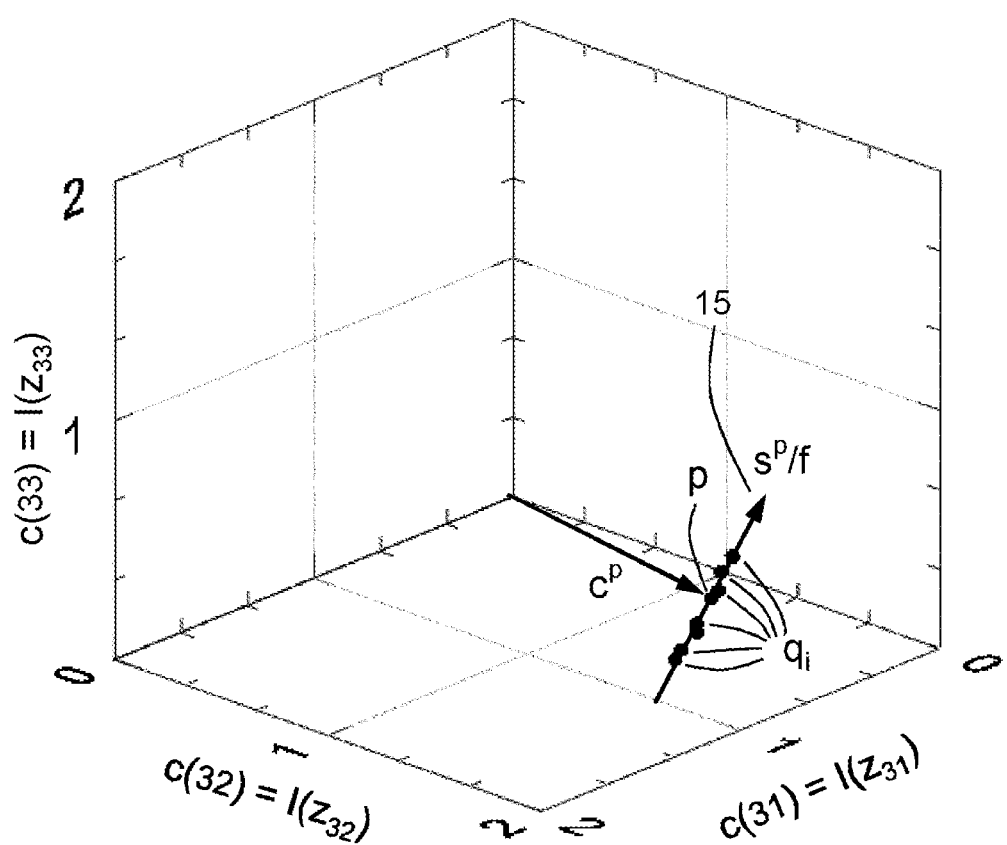

FIG. 14 schematically illustrates how the value $z^p$ assigned to the detector element p is determined on the basis of the plurality of neighboring elements $q_j$:

For reasons of presentability, there is a projection on a three-dimensional subspace for the illustration by virtue of only dimensions 31, 32 and 33 of the 64-dimensional vector space being illustrated in FIG. 14, in a manner analogous to FIG. 11. As described above, ten neighboring elements were selected in this exemplary embodiment, and so ten correlogram vectors $c^q$ for the neighboring elements q are present accordingly in the 64-dimensional vector space in addition to the correlogram vector $c^p$ belonging to the detector element p, said correlogram vectors $c^q$ only being represented by their endpoints, labeled as points, for reasons of simplicity.

In contrast to the illustration as per FIG. 11 and the formation of a difference vector described in this respect, the direction vector in the 64-dimensional space is not determined directly in this case by ascertaining a difference vector between two correlograms $c^q$ and $c^p$. Instead, the direction vector 15 is determined; it belongs to that straight line which approximates the point cloud given by the endpoints (likewise denoted $q_j$ and p here for reasons of simplicity) of the correlogram vectors $c^{qj}$ and $c^p$ to the best possible extent, and moreover extends through the endpoint p of the correlogram vector $c^p$, likewise denoted by p. This direction vector can be determined with the aid of a straight-line fit and subsequent ascertainment of the direction vector present therefrom in the 64-dimensional vector space. In an alternative exemplary embodiment, a principal component analysis (PCA) is carried out on the point cloud given by the vector endpoints $q_j$ and p in the 64-dimensional vector space, wherein the eigenvector belonging to the largest eigenvalue of the covariance matrix likewise is the sought-after direction vector. Since the largest eigenvalue of the covariance matrix and the associated eigenvector are determined first in many PCA algorithms, it is particularly advantageously possible to terminate the principal component analysis once the corresponding eigenvector is present, and so the complete principal component analysis can be dispensed with in the specific exemplary embodiment and only a partial principal component has to be carried out.

Once again, the direction vector found corresponds to the non-scaled synthetic correlogram $Q^p(z_i) = s^p/f$, as described in the first exemplary embodiment, and is therefore also denoted as $s^p/f$ in FIG. 14.

Consequently, according to this second exemplary embodiment, a non-scaled synthetic correlogram $Q^p = s^p/f$ is determined on the basis of a plurality of detector elements q. The further evaluation is carried out as described in relation to the first exemplary embodiment: the scaling factor f for scaling the synthetic correlogram is once again determined using one of the described procedures. Subsequently, the envelope is determined from the correlogram $c^p$ and the associated, correctly scaled synthetic correlogram $s^p$ and the z value of the maximum of this envelope is determined as the value for the sought-after $z^p$. If necessary, it is also possible once again to carry out a phase evaluation in addition to the envelope evaluation and all results emerging therefrom can be used as described or in accordance with the known options.

Figure 15:
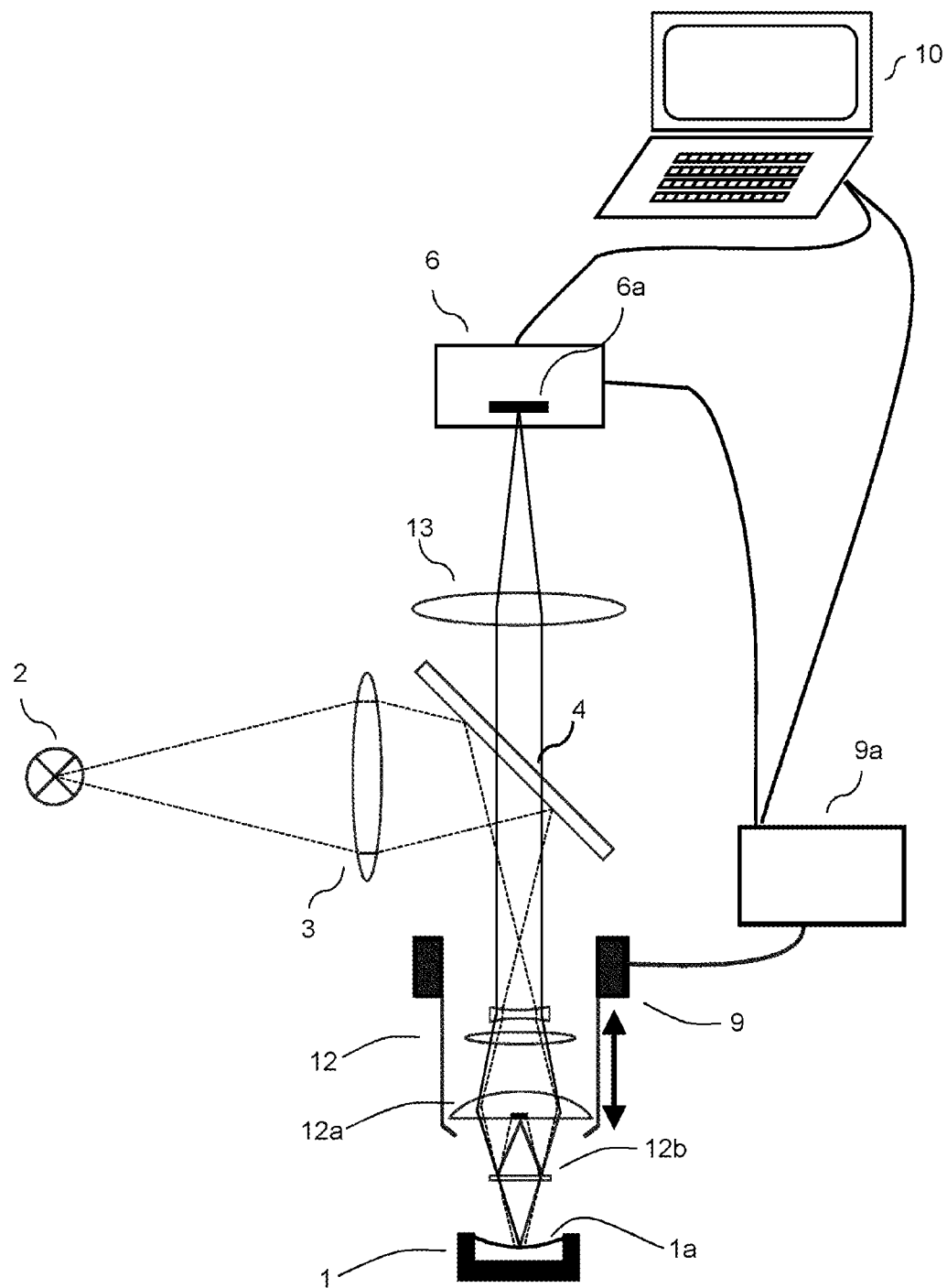
FIG. 15 shows a third exemplary embodiment of a device according to the invention with a Mirau objective.

FIG. 15 shows a third exemplary embodiment of a device according to the invention:

In this exemplary embodiment the interference pattern is produced by means of a Mirau interferometer: illumination light which reaches a semi-transparent mirror 4 via a condenser lens 3 is produced by means of the light source 2. Consequently, the illumination light is partly reflected downward in the illustration as per FIG. 15 and is incident there on a Mirau objective, which is constructed in a manner known per se. In particular, the Mirau objective 12 comprises a front lens 12a with a central reference mirror, and a beam splitter 12b.

The measuring light emerging from the Mirau objective in the direction of the measurement object 1 is at least partly reflected by the measurement surface 1a of the measurement object and enters the beam path of the Mirau objective 12 again. At the same time, reference light is split from the illumination light by the beam splitter 12b of the Mirau objective and steered in the direction of the central reference mirror. There, this reference light is reflected and cast back to the beam splitter 12b. Some of the reference light is reflected again at the beam splitter 12b such that it is superposed on measuring light reflected by the measurement object, at least partly passed together with said measuring light through the semi-transparent mirror 4 and imaged by means of a tube lens 13 on the multielement detector 6 constructed as a CMOS camera in the present case. As an area sensor 6a, the multielement detector 6 accordingly comprises a CMOS image sensor, presently an array of 512×512 detectors, that is to say a total of 262 144 detectors.

In this exemplary embodiment, the adjustment unit 9 is designed as a piezo adjuster with a piezo controller 9a. By means of the piezo controller 9a, the adjustment unit 9 which is designed as a piezo adjuster can be controlled in such a way that the Mirau objective can be moved toward the measurement object 1 and can be moved away from the latter in accordance with the double-head arrow illustrated in FIG. 15.

By contrast, the remainder of the device is not moved by the adjustment unit 9.

In this case, too, the device comprises an evaluation unit 10 designed as a laptop, which is connected to the multielement detector 6. In a manner analogous to FIG. 12 and the second exemplary embodiment, the adjustment unit 9, the piezo controller 9a in the present case, is connected to the multielement detector 6 via a trigger line in this third exemplary embodiment.

Consequently, the interferometer optical unit in the present case comprises the condenser lens 3, the beam splitter 4, the Mirau objective 12 and the tube lens 13.

In the present case, the measurement object 1 is a MEMS element, which has an easily movable, pressure-sensitive membrane as a measurement surface 1a.

In principle, the measurement procedure is implemented in a manner analogous to the measurement procedure of the second exemplary embodiment described in FIG. 12: the Mirau objective is displaced continuously at an approximately constant speed by means of piezo controller 9a and adjustment unit 9. A trigger signal is provided via the trigger line to the multielement detector 6 at equidistant time intervals for the purposes of recording a camera image. Storage and evaluation of the camera images is implemented by means of the evaluation unit 10, like in the exemplary embodiments described previously.

The evaluation is implemented in accordance with a third exemplary embodiment of a method according to the invention, which has a similar configuration to the second exemplary embodiment described above in relation to FIG. 14.

However, a great number of detector elements q are used in the third exemplary embodiment to determine the value $z^p$ assigned to the detector element p:

In the present case, the detector elements $q_j$ are selected by virtue of using all 48 neighboring elements of the detector element p, located in a 7×7 field, for the evaluation. For reasons of presentability, FIG. 16 once again merely shows a view of dimensions 31, 32 and 33 of the n-dimensional vector space of the correlogram vectors. As is evident from FIG. 16, the point cloud represented by the correlograms of detector elements $q_1$ to $q_{48}$ can be approximated better using a curve than a straight line. In this third exemplary embodiment, a curve 15a, an ellipse segment in the present case or a parabolic piece in an alternative embodiment, is fitted to the point cloud. Consequently, there is an approximation by fitting a low dimensional differentiable submanifold to the point distribution, a one-dimensional differentiable submanifold in the present case. In the present case, the approximation is implemented by virtue of determining a mean square and optimizing the free parameters of the curve using one of the conventional mathematical methods such that the mean square is minimized.

Figure 16:
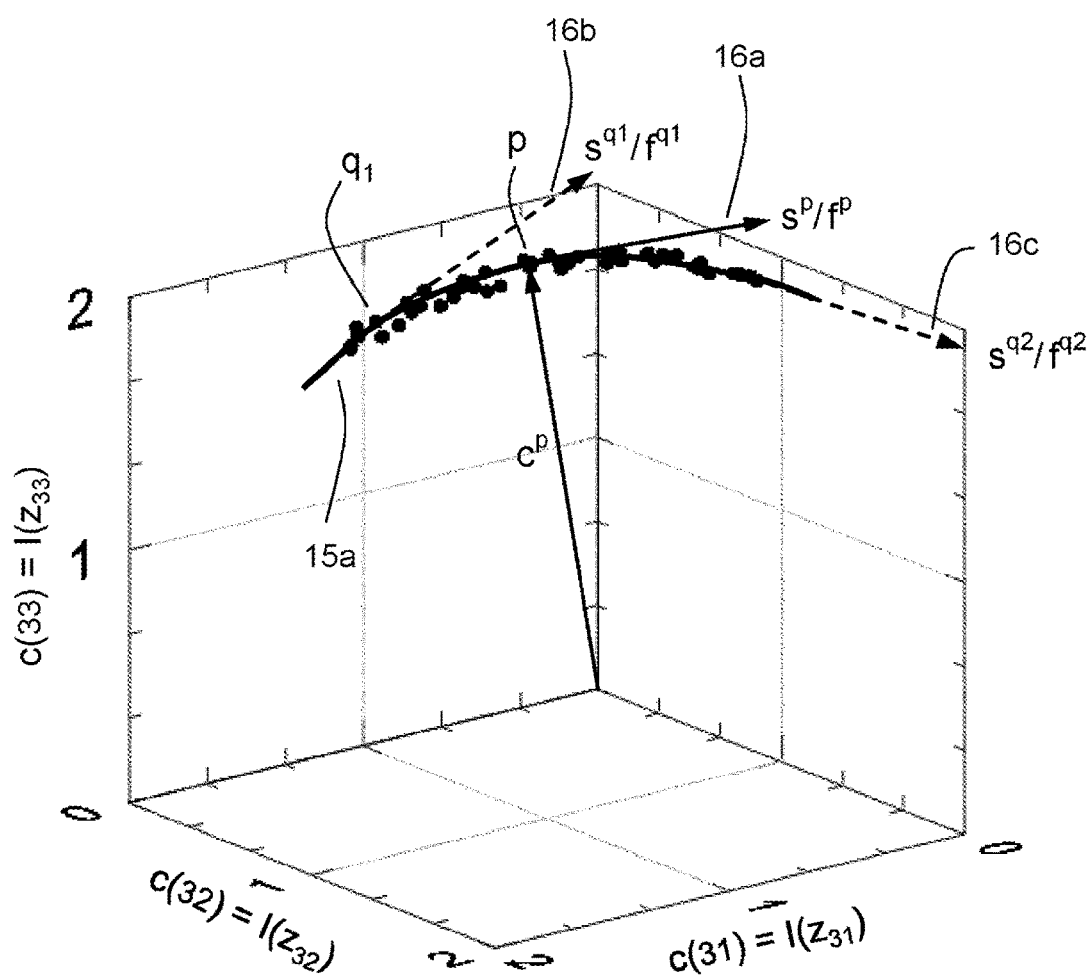
FIG. 16 shows an illustration for explaining an exemplary embodiment of a method according to the invention to be carried out by means of the device as per FIG. 15.

As evident from FIG. 16, the non-scaled synthetic correlogram $Q^p = s^p/f^p$ can be determined as a tangential vector 16a to the curve at the point p after the curve 15a for the correlogram $c^p$ has been determined.

The further evaluation is now carried out as described above, by virtue of initially determining the scaling factor $f^p$ for the synthetic correlogram at the point p and by virtue of determining the value $z^p$ on the basis of the correlogram $c^p$ and the correctly scaled synthetic correlogram $s^p$.

However, what is advantageous in this third exemplary embodiment is that the determined curve can be used not only to determine the tangential vector 16a at the point p but also to determine tangential vectors at the points $q_j$ (see tangential vector 16b for point $q_1$ and tangential vector 16c for point $q_2$ in exemplary fashion). A one-time determination of the curve consequently allows the determination of not only the value $z^p$ for the point p but also the corresponding values $z^q$ for all or at least a multiplicity of points $q_j$ (j=1, . . . , 48).

Figure 17:
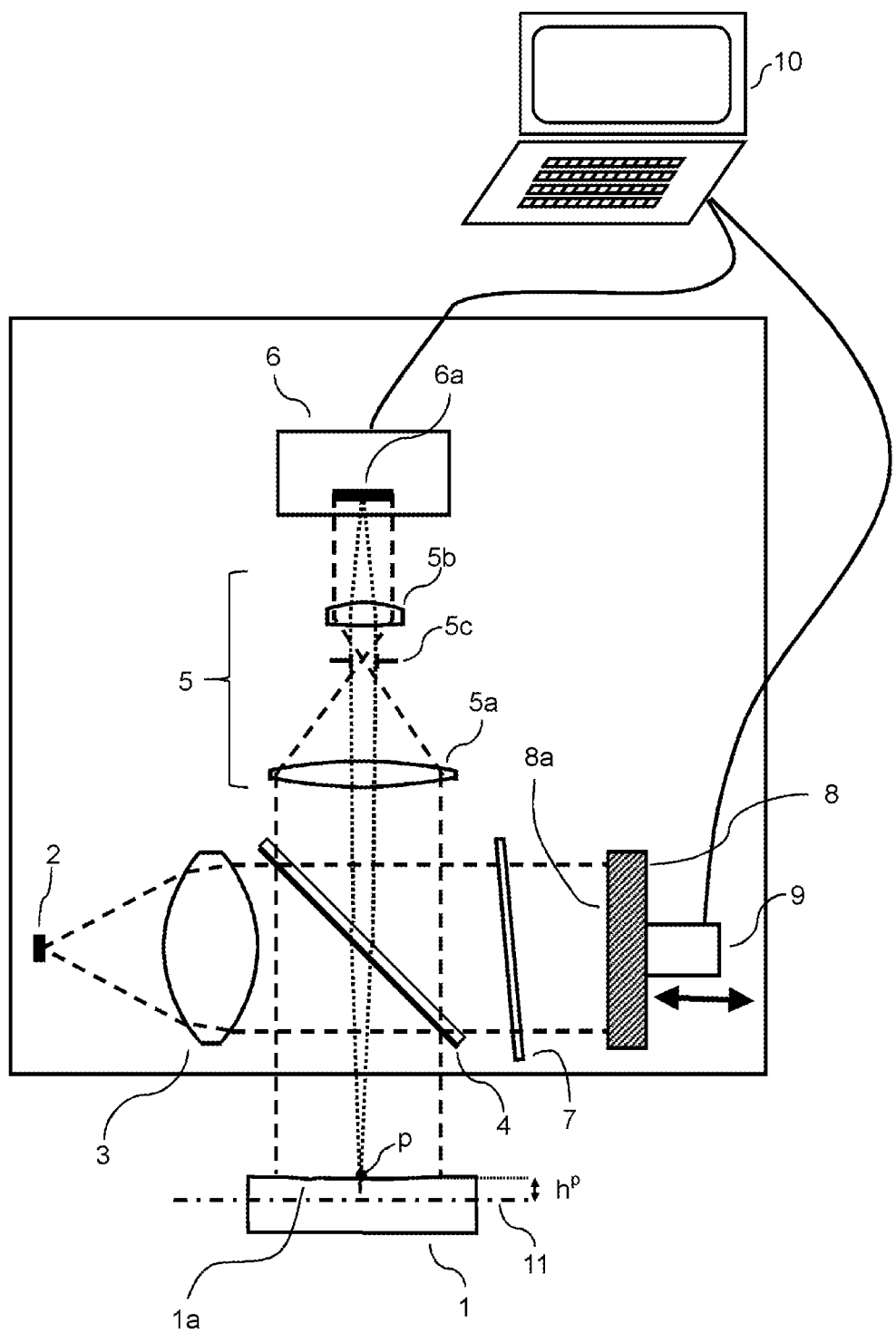
FIG. 17 shows a fourth exemplary embodiment of a device according to the invention with a Michelson interferometer.

FIG. 17 illustrates a fourth exemplary embodiment of a device according to the invention. The latter largely corresponds to the first exemplary embodiment as per FIG. 1. However, the adjustment unit 9 is arranged at the reference mirror 8 in the fourth exemplary embodiment in order to move said reference mirror toward the light source or away from the latter, in the direction of the double-headed arrow. Consequently, the light path of the reference light is influenced by means of the adjustment unit 9. By contrast, the position of the device relative to the measurement object 1 and, in particular, to the measurement surface 1a remains constant, that is to say the optical path length of the measuring light also remains unchanged.

However, apart from this, the functionality is the same as that of the first exemplary embodiment. In particular, the method described in relation to the first exemplary embodiment can also be carried out using the device as per FIG. 17.

A fourth exemplary embodiment of the method according to the invention is presented below on the basis of the fourth exemplary embodiment of a device according to the invention illustrated in FIG. 17:

To this end, the device as per FIG. 17 is constructed in one modification to carry out a PSI measurement. In this case, the light source 2 is designed as a monochromatic laser with a wavelength of 520 nm.

In this exemplary embodiment, the phase difference $z_i$ between the measuring light and the reference light is varied by means of the adjustment unit 9.

Consequently, the luminous intensities $I^p(z_i)$ are recorded depending on the respective amount $z_i$ of the phase difference, which has been changed in relation to the reference state of the interferometer, and said luminous intensities once again yield the correlograms $c^p=(c^p(1), c^p(2), \ldots, c^p(n))=(I^p(z_1), I^p(z_2), \ldots, I^p(z_n))$, wherein the $z_i$ are phase differences, for example measured in degrees or radians.

In the specific exemplary embodiment present, the measurements are carried out at 6 different values for $z_i$. The correlogram vectors $c^p$ are consequently given as vectors in the six-dimensional vector space and the same observations can be made as in the preceding exemplary embodiments, only the values of $z_i$ are given here not as OPD differences but as phase differences.

In this fourth exemplary embodiment of a method according to the invention present all detector elements are now used for evaluation purposes. This is illustrated schematically in FIG. 18 in a reduction to dimensions 3, 4 and 4: as is evident in FIG. 18, the point cloud yields an ellipse in n-dimensional space, in 6-dimensional space in the present case, only three dimensions of which are illustrated here. As mentioned at the outset, in respect of the correlograms phase-shifting interferometry can be considered to be a special case of white-light interferometry, in which a constant envelope env(OPD)=const is present.

As presented in more detail above, the point cloud can be described as a closed ellipse in the case of PSI. Below, the case of white-light interferometry is also treated in FIG. 21.

Figure 18:
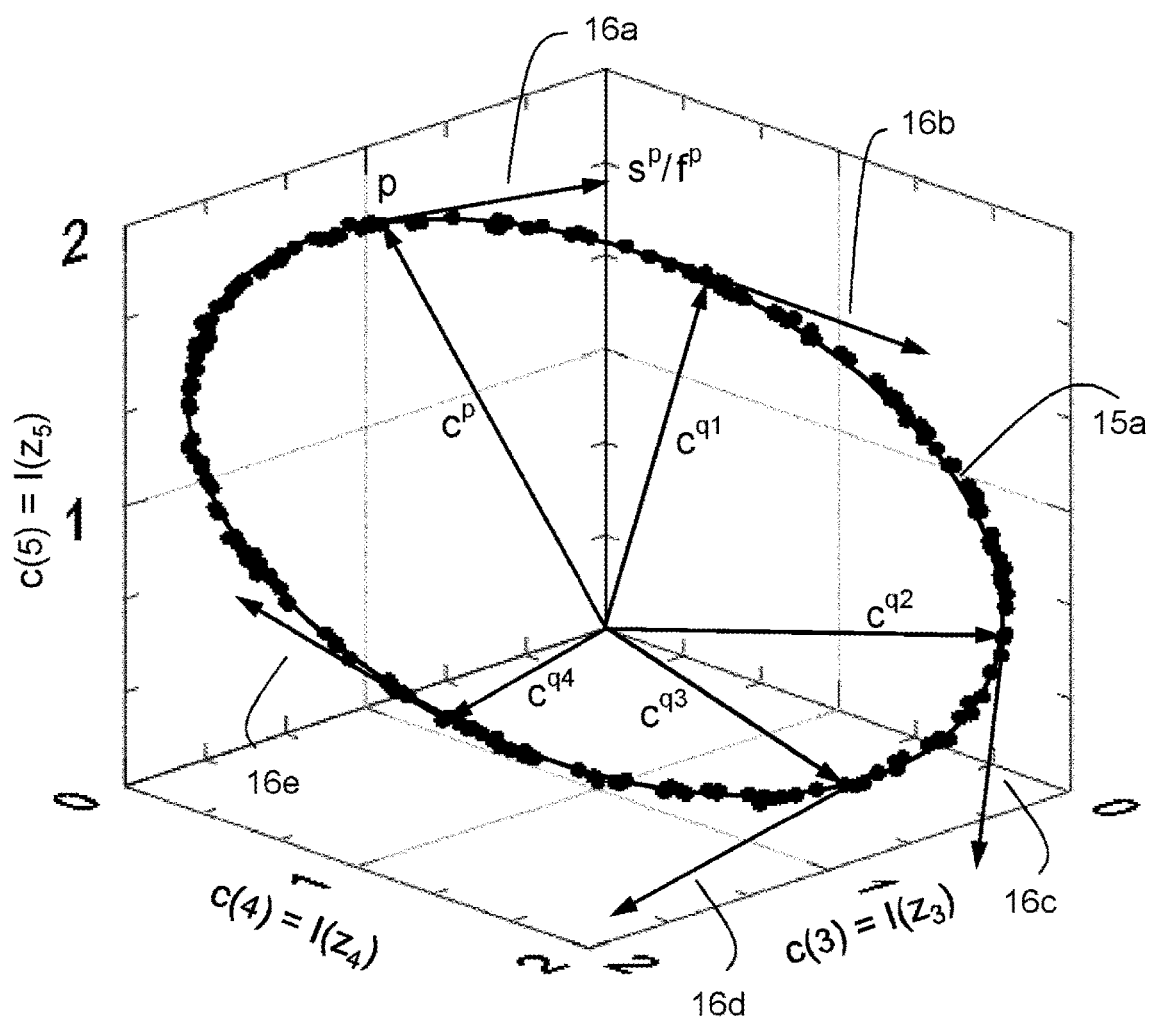
FIGS. 18, 19, 20A, 20B, 21, 22A and 22B show illustrations for explaining exemplary embodiments of methods according to the invention to be carried out by means of the device as per FIG. 17.

A disturbance which influences the $z_i$ values, i.e., which leads to non-equidistant $z_i$ in particular, changes the relative position in space of the ellipse sketched out in FIG. 18 but the ellipse shape is maintained. An evaluation that is based on parameters of the ellipse shape is consequently not influenced or only hardly influenced by the above-described disturbances of the $z_i$ values.

According to the fourth exemplary embodiment of the method according to the invention, an ellipse 15a is fitted to the point cloud illustrated in FIG. 18. To this end, the ellipse is parameterized in the n-dimensional space, in 6-dimensional space in the present case, with the aid of n+5 free parameters, 11 free parameters in the present case, specifically using n parameters for defining the normal vector of the plane in which the ellipse is located, including the distance of this plane from the coordinate origin, 2 parameters for defining the displacement of the ellipse in the plane relative to the point of incidence of the normal vector on this plane, and 3 parameters to define the length and rotation of the principal axes of the ellipse. Now, a distance from the ellipse parameterized thus can be provided as a function of these parameters for each correlogram vector $c^p$ and $c^q$, wherein the sum of the mean squares over all correlogram vectors $c^p$ and $c^q$ is minimized using a mathematical minimization method known to this end and, as a result, the corresponding parameters that define the ellipse are obtained. The synthetic (non-scaled) correlogram $Q^p=s^p/f^p$ is determined for a point $c^p$ of the detector element p by virtue of determining the tangential vector 16a to the ellipse at the point p, which is now easily possible as a result of the ellipse being present in parameterized form as a one-dimensional differentiable manifold and the tangential vector being able to be determined by differentiation. Subsequently, as described above, the scaling factor $f^p$ is determined and the associated $z^p$ value is determined from the correlogram $c^p$ and the associated synthetic correlogram $s^p$. As is immediately evident from FIG. 18, the determination of the ellipse facilitates the evaluation not only in respect of the detector element p but also in respect of all other detector elements, for example the illustrated detector elements $q_2$, $q_2$, $q_3$ and $q_4$ with assigned correlograms $c^{q1}$, $c^{q2}$, $c^{q3}$ and $c^{q4}$, wherein the respectively associated tangential vectors 16b, 16c, 16d, 16e are likewise illustrated. With the aid of these tangential vectors $Q^{qj}=s^{qj}/f^{qj}$, it is consequently immediately also possible, as described above, to determine the associated scaling factors $f^{qj}$, the associated correctly scaled synthetic correlograms $s^{qj}$ and the associated values $z^{qj}$, as a result of which it is possible to save very much computational outlay in relation to respective individual determination of the values $z^p$ and $z^{qj}$.

In a modification of the fourth exemplary embodiment a principal component analysis is carried out first and the plane in which the ellipse is located is determined as a result. For the points to be evaluated, for example $c^p$, there is a projection of the point into this plane, in order to minimize, inter alia, noise or disturbances, that is to say there is a displacement of the point $c^p$ perpendicular to the plane such that the point is located within the plane. After all points have been projected into the plane determined in advance, the ellipse is determined subsequently. Greater accuracy is obtained as a result thereof.

Figure 19:
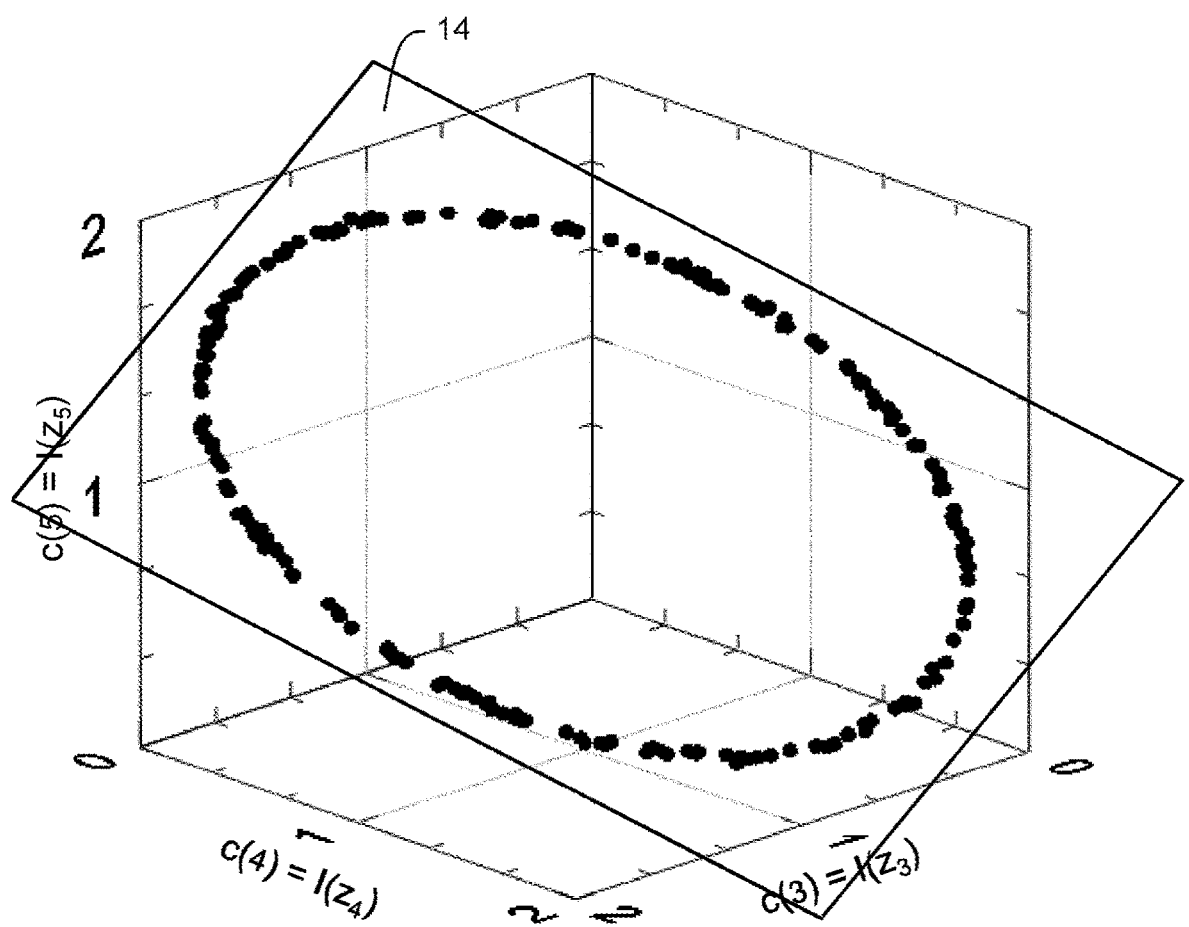

FIG. 19 schematically illustrates—once again for the representation by projection into a three-dimensional subspace of the six-dimensional vector space given by the luminous intensities measured at $z_3$, $z_4$ and $z_5$—the point cloud obtained by determining the plane 14 by means of PCA and projecting the individual points into this plane. It should be noted in this case that the shown plane regularly is not a plane in the three-dimensional space spanned by the three illustrated spatial directions. Although the plane is, by all means, a two-dimensional plane in n-dimensional space, it is, however, as a rule, not a plane located in the three-dimensional vector space spanned by the illustrated axes. Accordingly, the representation as per FIG. 19 should be considered to be simplified elucidation for a better understanding.

For the further evaluation as per this exemplary embodiment of the method according to the invention, all that is considered below is the plane with the projected points shown in FIG. 19:

In partial image a, FIG. 20 shows the plane 14 as per FIG. 19. As described, the latter was determined by principal component analysis for determining the two largest eigenvalues and associated eigenvectors of the covariance matrix. A partial principal component analysis is likewise possible, the latter being carried out until the specified values are determined.

The two eigenvectors 17a, 17b span the plan in which the ellipse is located. Now, the points given by the correlogram vectors are projected into this plane.

Figure 20A:
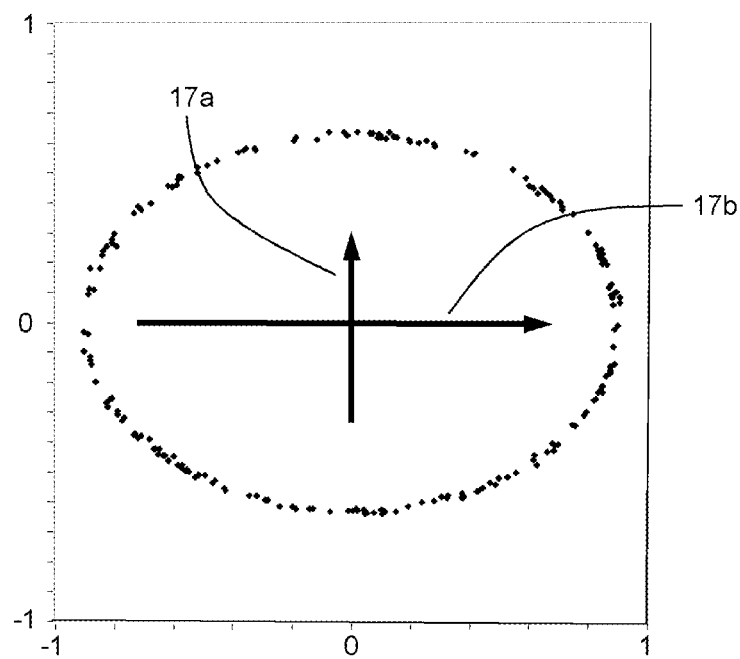

In FIG. 20A, the alignment of the plane is chosen for the sake of simplicity such that the x-axis of the plane is determined by the eigenvector 17b for the largest eigenvalue and the y-axis is determined by the eigenvector 17a for the second largest eigenvalue. The length of the semi axes of the ellipse is proportional to the two eigenvalues. Therefore, it is possible to carry out an affine mapping which converts the ellipse into a circle, for example by stretching the y-axis using the ratio of the two eigenvalues.

Figure 20B:
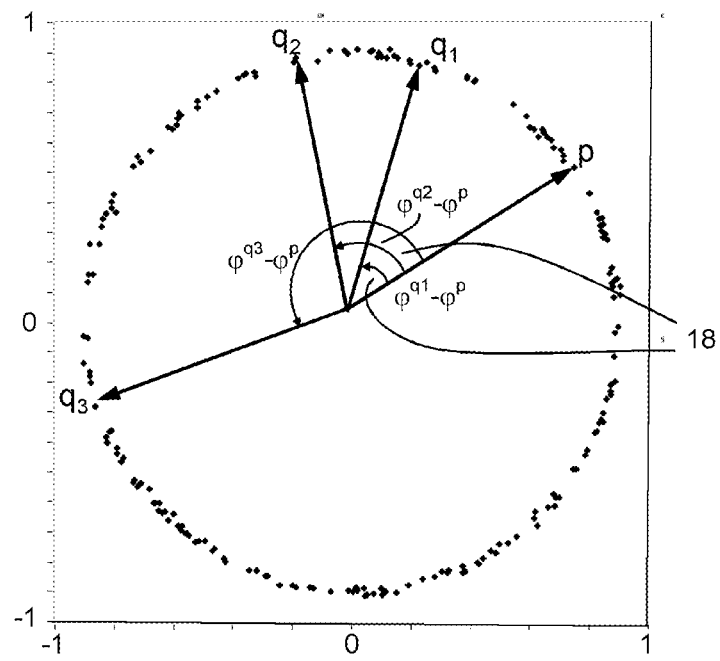

The result is illustrated in FIG. 20B. In the circle now present here, it is possible to determine or read the relative phase angles 18, which are sought after for the evaluation, in a simple manner. By means of the phase angles 18, it is possible to ascertain the $z^p$ values or $z^{qj}$ values for the individual detector elements and hence the individual measurement points in a manner known per se.

The process explained in relation to FIG. 18 can likewise be used for white-light interferometry (WLI). Therefore, a further exemplary embodiment of a method according to the invention is presented below, in which WLI is carried out by means of the fourth exemplary embodiment of a device according to the invention as illustrated in FIG. 17, with the light source 2 being a broadband light source, for example an LED or super luminescent diode, instead of a laser in this case. The method for recording the intensity values for different $z_i$ is implemented in this case in a manner analogous to the exemplary embodiment as described in relation to FIG. 1. However, it is not the optical path length of the measuring light that changes in the present case. The change in the OPD is obtained by virtue of the optical path length of the reference light being changed by shifting the reference surface 8a of the reference mirror 8 by means of the adjustment unit 9. In the present case, too, intensities for each detector element p of the multidetector element 6 are respectively recorded for 64 $z_i$ values such that a correlogram, which once again can be represented as a point in the 64-dimensional space, is available for each detector element.

Figure 21:
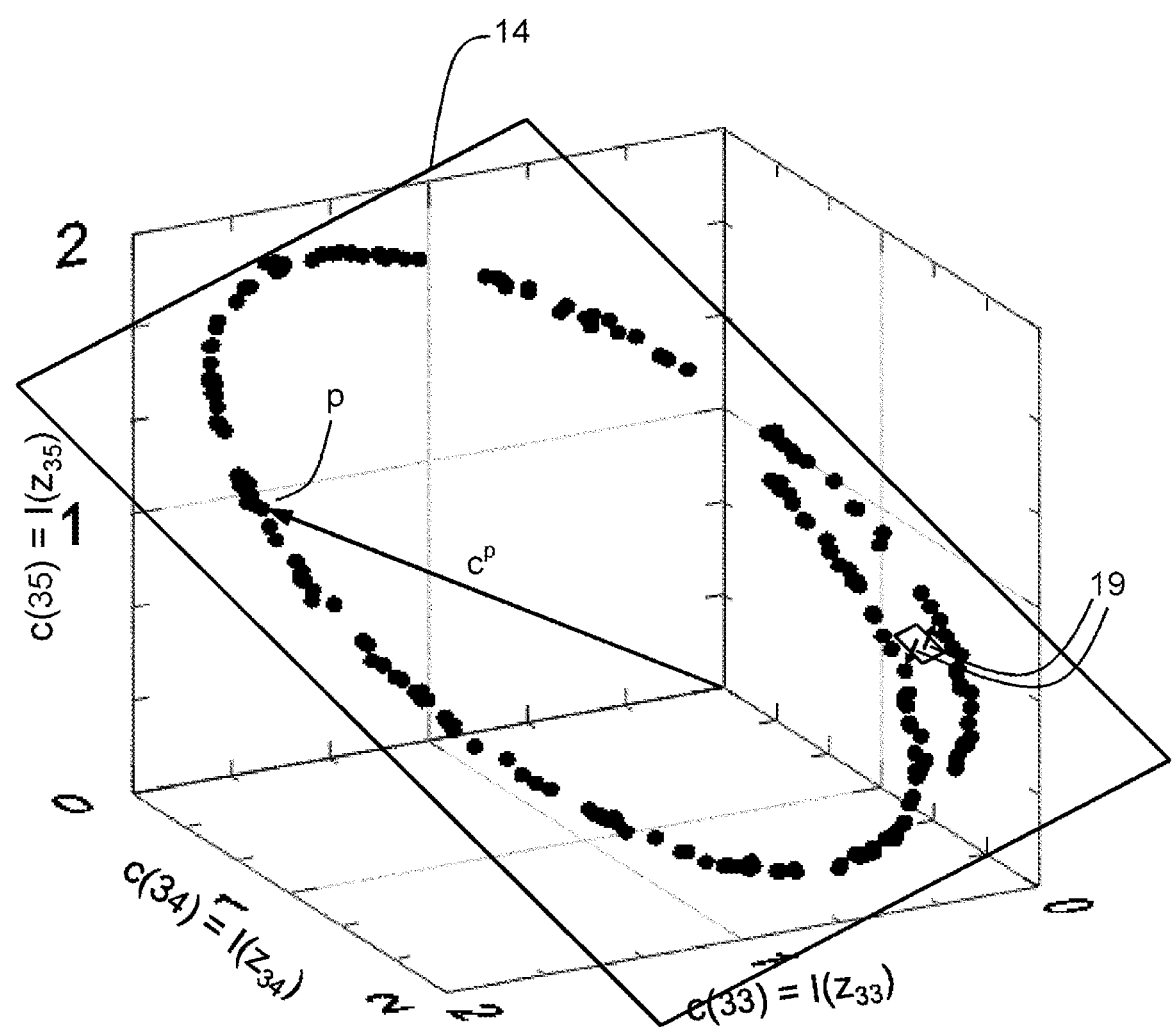

FIG. 21 shows the schematic representation of the point cloud in the 64-dimensional space in a manner analogous to FIG. 19, with once again only three dimensions of this space being illustrated here for practical reasons. Here, too, an approximate elliptical profile is exhibited but the latter no longer forms a closed ellipse. Rather, the curve is more like a helix around a cylinder with an elliptical cross-sectional area. The fact that no closed ellipse is formed here is due to the maximum of the envelope having moved on after one revolution in each case, whereas the envelope, as described previously, can be described as a constant function in the case of the PSI process.

Nevertheless, even if no closed ellipse is present, it is possible to again determine, by principal component analysis in the present case, a two-dimensional plane in the n-dimensional space in which the points are approximately located, as illustrated schematically by the plane 14 in FIG. 21.

For an improved elucidation, points (and hence detector elements) whose correlograms $c^{qj}$ are displaced by at most slightly more than half a period in relation to the correlogram $c^p$ on the detector element p were selected for the illustration in FIG. 21. As a result, this makes the fact that the ellipse is not closed most clearly visible.

In the real application of this exemplary embodiment of the method according to the invention, correlograms $c^{qj}$ with approximately ±2 periods shift in relation to the correlogram $c^p$ belonging to the detector element p are admitted in the present case, wherein it is sufficient to determine the corresponding shift using one of the known methods according to the prior art, which are not as insensitive to disturbances as the method according to the invention, with, as a result, a metric likewise being used to determine neighborhood properties. Likewise, in alternative configurations, it is possible to select points by other values and/or in combination with a spatial distance metric of the detector elements.

Now, the distance vector to the determined plane is ascertained for each point p or $q_j$ (see exemplary labeled distance vectors 19 in FIG. 21). Points that belong to a correlogram that has been shifted by one or more periods have distance vectors of different lengths relative to this plane. At the respective locations belonging to the same projected point, these distances adopt relatively discrete values since the ellipse winds out of the plane and comes up "one floor higher" after each revolution.

Therefore, the number of periods through which the correlogram has been shifted can be ascertained by the length of the distance vectors. The length of the distance vector consequently yields a comparable result to the envelope evaluation in the case of the convention correlogram evaluation. The phase evaluation is implemented as described in the preceding figures.

The combination of this phase evaluation with the information obtained from the distance vector in relation to the shift of the correlogram envelope allows a relatively precise determination (independent of disturbances such as vibrations) of the shift of the individual correlograms, without the shift only being given modulo one period or 360° as in the case of the phase shifting interferometry; instead, the shift is given in full in the present case.

Using the described procedure it is possible to carry out the evaluation for very many points at once, saving a lot of calculation time. The topography of the measurement object is determined from the determined correlogram shifts.

If, in a modification of the exemplary embodiment, the evaluation is only undertaken for some of the points (e.g., for correlograms shifted by no more than ±2 periods in relation to $c^p$ as described), the method is preferably carried out for a plurality of preferably overlapping point sets such that the ascertained results can be merged.

A further modification of the exemplary embodiment is based on the fact that knowledge of the above-described distance vector means that the relative position of the envelope maximum is also known. Instead of, as described above, simply projecting the point into the determined plane 14, it is only the envelope of the correlogram that is shifted if the functional curve of the envelope is known, for example by virtue of the correlogram at the point $q_j$ being divided by the functional envelope at the point $q_j$ and being multiplied by the functional envelope at the point p such that, as a result thereof, the point $q_j$ is mapped into the same plane as the point p. If this mapping is carried out, preferably iteratively, for all points, a closed ellipse is obtained again, like in the previous figures, and this can also be evaluated accordingly. This can increase the quality of the evaluation results and the topography determined therefrom.

In the practical application, WLI and PSI also typically differ in the fact that the measurements are only carried out at significantly fewer locations in the case of phase-shifting interferometry, and so the number of the $z_i$ is typically smaller than in the case of WLI measurements. In the case of PSI measurements, the $z_i$ phase differences are in relation to the reference state of the interferometer, in contrast to WLI measurements where the $z_i$ are OPD differences in relation to the reference state of the interferometer. However, as a rule, phase and OPD are proportional, that is to say they can be converted with the aid of a conversion factor $2\pi/\lambda$ (in radians) or $360°/\lambda$ (in degrees) as per phase=$360°/\lambda$*OPD, where $\lambda$ is the effective light wavelength.

In the above-described exemplary embodiments, the WLI measurements were performed at 64 locations ($z_1, z_2, z_{64}$) such that each correlogram accordingly has 64 values and the complete vector space is 64 dimensional. By contrast, already 3 or 4 locations may be sufficient in the case of PSI measurements, and so, accordingly, only three or four measurement values are available at the three or four z points $z_1$, $z_2$, $z_3$ or $z_1$, $z_2$, $z_3$, $z_4$ for each detector element.

Figure 22A:
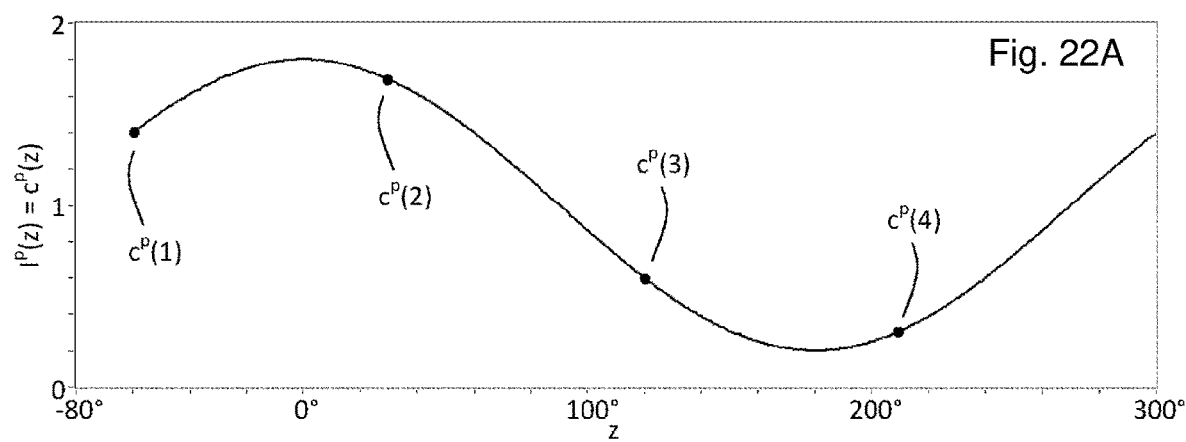
Figure 22B:
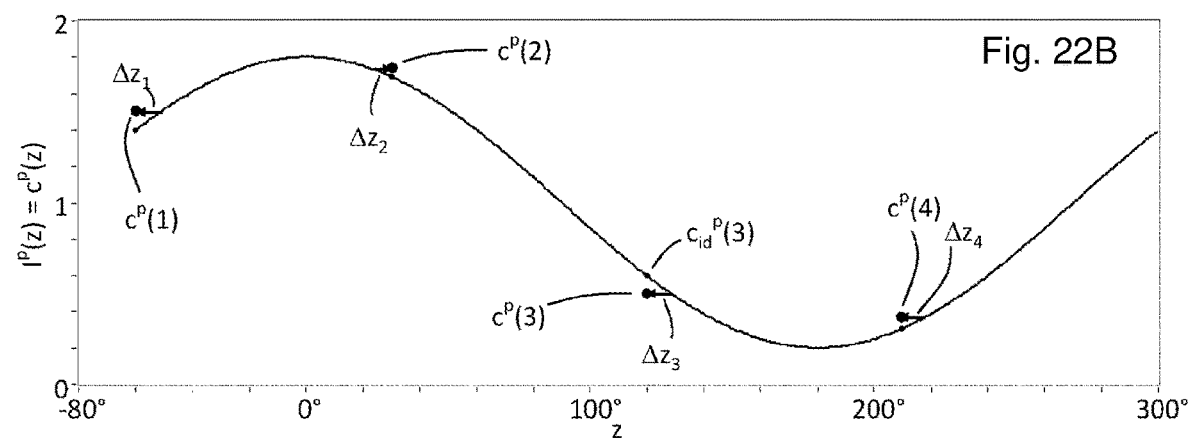

Only 4 values are used in a modification of the above-described PSI method. Below, FIG. 22 is used to elucidate the influence of disturbances in the case of such a method and a procedure in the implementation of the method according to the invention, and the advantage thereof:

In partial image a), FIG. 22 shows an ideal, undisturbed signal curve as a solid line with four measurement values $c^p(1)$ to $c^p(4)$, which are phase-shifted by 90° in each case. In partial image b), the ideal, undisturbed signal curve is once again illustrated as a solid line, but the measurement values have simulated disturbances which lead to a displacement in the abscissa direction z such that the phase shift between the measurement values is no longer exactly 90°. The deviations from the ideal values (which are not known in the real measurement operation of the present exemplary embodiment) are elucidated by the differences $\Delta z_1$ to $\Delta z_4$. For the value $c^p(3)$, the ideal, undisturbed value $c_{id}^p(3)$ has additionally been labeled, the latter consequently corresponding to the value $c^p(3)$ in partial image a).

Consequently, four values of $z_i$ are used in this modification of the exemplary embodiment, which values are each phase-shifted through 90° in the ideal, disturbance-free case. Then, the following applies:

$$c^p(i) = c(OPD) = A + B^* \cos(\psi + z_i)$$

In this case, it is the value $\psi$ which is sought after and which corresponds to the sought-after $z^p$, where the offset A and the amplitude B are constants with unknown values.

In the conventional evaluation according to the prior art, the sought-after $\psi$ is determined from the $c^p(i)$ of the associated correlogram, which is susceptible to errors in the case of disturbances. By way of example, in the case of four $z_i$ values shifted through 90°, this is implemented by:

$$\psi = \arctan2(c^p(4) - c^p(2), c^p(1), c^p(3))$$

$$= \arctan2(\cos(\psi + z_4) - \cos(\psi + z_2), \cos(\psi + z_1) - \cos(\psi + z_3))$$

If in fact $z_2=z_1+90°$, $z_3=z_1+180°$, $z_4=z_1+270°$, then $$\psi = \arctan2(\sin(\psi), \cos(\psi)) = \psi,$$

where phase unwrapping optionally needs to be carried out.

However, if the $z_i$ are afflicted by disturbances such an evaluation becomes incorrect and no longer allows an undisturbed determination of $\psi$.

The procedure according to the invention preferably determines the associated synthetic correlogram $s^p$ (in this case $s^p=(s^p(1), s^p(2), s^p(3), s^p(4))$) for the correlogram $c^p$ (in this case $c^p=(c^p(1), c^p(2), c^p(3), c^p(4))$) in accordance with the procedures described in the description and the preceding exemplary embodiments, wherein, as previously, the information from other, optionally suitably chosen correlograms $c^{qj}$ of other detector elements $q_j$ is used.

To this end, the direction vector $Q^p(z_i)=1/f^p * s^p(i)$ is initially ascertained by subtraction, approximation, fit, principal component analysis, etc., as described above, and then the scaling factor $f^p$ is determined with the aid of one of the described methods.

What is particularly advantageous for phase-shifting interferometry is that for all i in this case $(c^p(i))^2+(s^p(i))^2$ must yield the same constant value $w^p$, wherein the $c^p(i)$ in this case are the luminous intensities $I^p(z_i)$ of the correlograms which have been corrected for the offset $o^p$, that is to say $c^p(i)=I^p(z_i)-o^p$. By way of example, the offset $o^p$ can be determined (a) by averaging the $I^p(z_i)$ for suitable $z_i$ (e.g., for four $z_i$ shifted through 90°) or else (b), particularly advantageously, by virtue of ascertaining the offset $o^p$ at the same time as the ascertainment of the scaling factor f, by virtue of determining $f^p$ and $o^p$ such that $$(I^p(z_i) - o^p)^2 + (f^p * Q^p(z_i))^2$$

is constant.

In the procedure (a) $o^p$ is already available as described, and all that still needs to be done is to determine the factor $f^p$ for which $(I^p(z_i)-o^p)^2+(f^p)^2*(Q^p(z_i))^2=w^p$ yields the constant value $w^p$ for all i; this preferably being implemented by means of a linear regression of the type $$m * x_i + b = y_i,$$

with $x_i=(Q^p(z_i))^2$, $y_i=-(I^p(z_i)-o^p)^2$, wherein the sought-after value for $f^p$ can be gathered immediately from the gradient $m=(f^p)^2$.

In the procedure (b), $f^p$ and $o^p$ must be determined in such a way that the following always holds true:

$$(I^p(z_i) - o^p)^2 + (f * Q^p(z_i))^2 = w^p,$$

which once again leads to a minimization problem—in this case, it is necessary to determine e.g. $f^p$, $o^p$ and $w^p$ in such a way that the sum $$((I^p(z_i) - o^p)^2 + (f^p * Q^p(z_i))^2 - w^p)^2$$

becomes minimal. This minimization problem can be solved by the relevant known mathematical methods and yields the sought-after values for $f^p$ and $o^p$.

In any case, the synthetic correlogram $s^p$ (in this case $s^p=(s^p(1), s^p(2), s^p(3), s^p(4))$) and the original diagram without the offset $c^p(z_i)=I^p(z_i)-o^p$ (in this case $c^p=(c^p(1), c^p(2), c^p(3), c^p(4))$) are obtained.

As soon as the synthetic correlogram $s^p$ has been ascertained, it is possible to correctly determine the phase angle at each location $z_i$ therefrom in combination with the offset-corrected original diagram $c^p$, without having to use the other $z_i$ to this end:

$$\psi(z_i) = \arctan2(s^p(i), c^p(i)),$$

with phase unwrapping being optionally carried out again.

Since only the differences of the phase angles at different points $p_j$ are relevant for the purposes of determining the topography in the case of phase-shifting interferometry, the corresponding phase differences $\psi^{p2} - \psi^{p1}$ can subsequently be determined for any desired value for i, that is to say:

$$\psi^{p2} - \psi^{p1} = \arctan2(s^{p2}(i), c^{p2}(i)) - \arctan2(s^{p1}(i), c^{p1}(i)),$$

wherein optionally a value which is suitably averaged for the final result is determined for different or all i.

It should be observed that disturbances of the $z_i$, for example as a result of vibrations, once again have hardly any influence on the results of the evaluation in the case of the evaluation according to the invention, as a result of which the method according to the invention, as a rule, supplies significantly better results than the conventional methods according to the prior art if disturbances are present.

LIST OF REFERENCE SIGNS

1 Measurement object
1*a* Measurement surface
1*b* Hot plate
1*c* Air turbulence
2 Light source
3 Condenser
4 Semi-transparent mirror
5 Imaging optical unit
5*a*, 5*b* Optical lenses
5*c* Optical stop
6 Multielement detector
6*a* Area sensor
6*b* Detector element
7 Optical filter
8 Reference mirror
8*a* Reference surface
9 Adjustment unit
9*a* Piezo controller
10 Evaluation unit
11 Reference surface
12 Mirau objective
12*a* Front lens
12*b* Beam splitter
13 Tube lens
14 PCA-determined plane
15 Direction vector
15*a* Curve
16*a* Tangential vector at p
16*b* Tangential vector at $q_1$
16*c* Tangential vector at $q_2$
16*d* Tangential vector at $q_3$
16*e* Tangential vector at $q_4$
17*a*, 17*b* Eigenvectors
18 Relative phase angle
19 Distance vectors

The invention claimed is:

1. A method for determining a surface topography of a measurement object by interferometry, comprising the steps of:
producing illumination light and reference light by at least one light source and illuminating the measurement object with the illumination light,
bringing together the illumination light which has been reflected by the measurement object as measuring light and the reference light, and producing an interference pattern in a detection region,
changing at least one of an optical path length difference or a phase difference between the measuring light and the reference light,
capturing luminous intensities of the interference pattern on a multiplicity of detector elements of a multielement detector in the detection region for at least two optical path length differences or the phase differences which have been changed by different amounts,
determining an amount for the change in the optical path length difference or the phase difference for the multiplicity of detector elements of the multielement detector, for which amount the at least one of the optical path length difference or the phase difference between the measuring light and the reference light in each case reaches at least one specified value for the detector elements, and
ascertaining the surface topography of the measurement object from the amounts determined for the various elements of the multielement detector, and
in order to determine the value assigned to the detector element, using luminous intensities of at least one other detector element of the multielement detector in addition to the luminous intensities,
and ascertaining the value assigned to the detector element using an approximation to at least some of n-dimensional luminous intensity vectors given by the luminous intensities or the vectors that emerged therefrom by at least one of the projection or transformation.

2. The method as claimed in claim 1, wherein information about at least one of an envelope or a phase angle of the function that is dependent on the change in the at least one of the optical path length difference or the phase difference between the measuring light and the reference light is ascertained in order to determine the value assigned to the multielement detector element, by also using the luminous intensities of at least one other detector element of the multielement detector in addition to the luminous intensities for ascertaining this information.

3. The method as claimed in claim 1, wherein the at least one other detector element, whose luminous intensities are used to determine the value assigned to the detector element, is chosen having specified neighborhood properties in relation to the detector element.

4. The method as claimed in claim 3, wherein the neighborhood properties are defined at least in part with a metric, wherein the metric comprises at least one of a spatial distance between the detector elements or a spatial distance between points assigned thereto on at least one of the measurement object or an optical surface conjugate to the multielement detector.

5. The method as claimed in claim 4, wherein the metric for determining the neighborhood of detector elements comprises a metric in the vector space of the n-dimensional luminous intensity vectors given by luminous intensities or a metric in a vector space of the vectors that emerged therefrom by the at least one of projection or transformation.

6. The method as claimed in claim 1, wherein the approximation comprises a fit of a differentiable submanifold to a point distribution from points in an n-dimensional vector space or in the vector space of the vectors that emerged therefrom by the at least one of projection or transformation.

7. The method as claimed in claim 6, wherein the differentiable submanifold is at most a three-dimensional submanifold of an associated vector space.

8. The method as claimed in claim 7, wherein the approximation to the n-dimensional luminous intensity vectors or the vectors that emerged therefrom by the at least one of the projection or transformation is described by a one-dimensionally parameterized curve in the associated vector space.

9. The method as claimed in claim 8, wherein the approximation to the luminous intensity vectors or the vectors that emerged therefrom by the at least one of the projection or transformation is, at least locally, a linear approximation.

10. The method as claimed in claim 9, wherein the approximation used when determining the value assigned to the detector element comprises a determination of a direction vector which at least locally in a neighborhood of the luminous intensity vector or the vector that emerged therefrom by the at least one of the projection or transformation approximates a principal direction of the point distribution given by way of the luminous intensity vectors or the vectors that emerged therefrom by the at least one of the projection or transformation.

11. The method as claimed in claim 10, wherein the determination of the direction vector comprises a principal component analysis or parts thereof, an eigenvalue determination, a linear regression or any other optimization method for minimizing a deviation of a straight line defined by at least one of the direction vector or a foot suitable therefor to point distribution given the luminous intensity vectors or the vectors that emerged therefrom by the at least one of the projection or transformation.

12. The method as claimed in claim 11, wherein a tangential vector to the differentiable manifold is determined by differentiating the latter.

13. The method as claimed in claim 12, wherein the determined direction or tangential vector is used to determine a phase-shifted signal for the light intensities or to determine a corresponding associated phase-shifted signal for vectors that emerged from the light intensities by the at least one of the projection or transformation.

14. The method as claimed in claim 13, wherein at least two detector elements of the multielement detector are used to determine the approximation.

15. The method as claimed in claim 14, wherein the light intensities together with the phase-shifted signals are used to ascertain at least one of an envelope or a phase angle of the signal curve given by the light intensities or to carry out a corresponding action for vectors that emerged from the light intensities by the at least one of the projection or transformation and for the associated phase-shifted signals.

16. The method as claimed in claim 15, wherein the at least one of the determined phase angle or envelope is used to determine, for the element of the multielement detector, the amount for the change in the optical path length difference or phase difference for which the optical path length difference or the phase difference between the measuring light and the reference light reaches the at least one of the explicitly or implicitly specified value.

17. The method as claimed in claim 16, wherein the amount for the change in the optical path length difference or phase difference for which the optical path length difference or the phase difference between the measuring light and the reference light reaches the at least one of the explicitly or implicitly specified value, as determined for the element of the multielement detector, is used to obtain information about the relative spatial position of a surface point of the measurement object assigned to the detector element in order to ascertain the surface topography of the measurement object.

18. The method as claimed in claim 17, wherein the method is configured to determine the surface topography of measurement objects when at least one of the following interferences is present:
   (i) vibrations or movements which influence a length of at least one of a measuring or reference arm of an interferometer during the measurements,
   (ii) changes in at least one of a density or a refractive index of at least one of a media through which the light passes in the at least one of the measuring or reference arm,
   (iii) at least one of inaccuracies or errors when determining the amount z of the change in the at least one of the optical path length difference or the phase difference between the measuring light and the reference light by the adjustment unit.

19. A device for determining a surface topography of a measurement object by interferometry,
   comprising
   at least one light source configured for illuminating the measurement object and for producing reference light,
   an interferometer optical unit configured for bringing together illumination light reflected by the measurement object as measuring light and reference light, with an interference pattern being produced in a detection region,
   at least one adjustment unit for changing at least one of an optical path length difference or a phase difference between the measuring light and the reference light by an amount,
   a multielement detector having a multiplicity of detector elements which are configured to capture luminous intensities of the interference pattern on the detector elements in a detection region for at least two optical path length differences or phase differences which have been changed by different amounts,
   an evaluation unit which is connected to the multielement detector and which is configured to determine, for a multiplicity of detector elements of the multielement detector, an amount for the change in the optical path length difference or phase difference for which the optical path length difference or phase difference between the measuring light and the reference light reaches at least one of an explicitly or implicitly specified value for this detector element, and to ascertain the surface topography of the measurement object therefrom, and
   the evaluation unit is configured to also use the luminous intensities of at least one other detector element of the multielement detector in addition to the light intensities in order to determine the value assigned to the detector element, and to ascertain the value assigned to the detector element using an approximation to at least some of n-dimensional luminous intensity vectors given by the luminous intensities or the vectors that emerged therefrom by at least one of the projection or transformation.

* * * * *